(12) United States Patent
Shaer

(10) Patent No.: US 7,881,979 B2
(45) Date of Patent: Feb. 1, 2011

(54) INTERACTIVE EVENT PLANNING AND PAYMENT METHOD AND SYSTEM

(75) Inventor: Ari Shaer, Long Beach, NY (US)

(73) Assignee: Omnigen Corp., Long Beach, NY (US)

( * ) Notice: Subject to any disclaimer, the term of this patent is extended or adjusted under 35 U.S.C. 154(b) by 76 days.

(21) Appl. No.: 12/466,971

(22) Filed: May 15, 2009

(65) Prior Publication Data

US 2009/0222352 A1    Sep. 3, 2009

Related U.S. Application Data

(63) Continuation of application No. 10/014,720, filed on Dec. 11, 2001, now abandoned.

(60) Provisional application No. 60/254,566, filed on Dec. 11, 2000, provisional application No. 60/254,854, filed on Dec. 12, 2000, provisional application No. 60/265,425, filed on Jan. 31, 2001.

(51) Int. Cl.
    *G06Q 30/00*    (2006.01)
(52) U.S. Cl. ....................................................... 705/26
(58) Field of Classification Search .................. 705/26, 705/27
    See application file for complete search history.

(56) References Cited

U.S. PATENT DOCUMENTS

| | | | |
|---|---|---|---|
| 5,375,055 A | 12/1994 | Togher et al. | |
| 5,845,265 A | 12/1998 | Woolston | |
| 5,852,809 A | 12/1998 | Abel et al. | |
| 5,898,594 A | 4/1999 | Leason et al. | |
| 6,029,141 A | 2/2000 | Bezos et al. | |
| 6,138,106 A * | 10/2000 | Walker et al. | 705/14.1 |
| 6,202,051 B1 * | 3/2001 | Woolston | 705/27 |
| 6,249,772 B1 * | 6/2001 | Walker et al. | 705/26 |
| 6,477,509 B1 | 11/2002 | Hammons et al. | |
| 6,609,106 B1 * | 8/2003 | Robertson | 705/26 |
| 7,013,292 B1 * | 3/2006 | Hsu et al. | 705/37 |

* cited by examiner

*Primary Examiner*—Adam Levine
(74) *Attorney, Agent, or Firm*—Brian Roffe

(57) ABSTRACT

Method for an event organizer to arrange receipt of gifts and services rendered in conjunction with the event in which an on-line database of gifts and services is created, and each gift and service is associated with a first price representing its cost to the organizer. Gift givers access the database, view the gifts and services with a second price that is greater than the first price, and can select gifts and services for purchase on behalf of the organizer. Then, the organizer receives funds from each gift giver equal to the second price for the selected gifts and services and directs gift and service providers to provide the selected gift or perform the selected service at the event. A difference between the first and second prices is determined and the organizer can use at least part of this difference to purchase gifts and services prior to the event.

15 Claims, 37 Drawing Sheets

FIGURE 1A

Traditional Breakdown of Wedding Expenses

| ITEM | PAID BY |
|---|---|
| Wedding Gown/Headpiece/Accessories | The Bride's Family |
| Wedding Trousseau | The Bride's Family |
| Wedding Ring for Bride | The Groom |
| Wedding Ring for Groom | The Bride |
| Wedding Gift for Groom | The Bride |
| Wedding Gift for Bride | The Groom |
| Bridesmaid Gifts | The Bride |
| Groomsmen/Usher Gifts | The Groom |
| Bride's Bouquet | The Groom |
| Bridesmaid Bouquets | The Bride's Family |
| Mother's Corsages | The Groom |
| Grandmother Corsages | The Bride's Family |
| Groom's Boutonniere | The Groom |
| Groomsmen Boutonnieres | The Groom |
| Usher's Boutonnieres | The Groom |
| Ceremony/Reception Flowers | The Bride's Family |
| Alter Baskets/Arches | The Bride's Family |
| Canopy/Carpet | The Bride's Family |
| Kneeling Bench/Candelabras | The Bride's Family |
| Rented Items for Wedding | The Bride's Family |
| Rented Items for Reception | The Bride's Family |
| Invitations/Announcements | The Bride's Family |
| Wedding Programs | The Bride's Family |
| Napkins/Matches/Printed Items | The Bride's Family |
| Marriage License | The Groom |
| Medical Visit for Bride | The Bride |
| Medical Visit for Groom | The Groom |
| Church Fee | The Bride's Family |
| Clergyman/Officiant Fee | The Groom |
| Musician/Soloist | The Bride's Family |
| Church Janitor | The Bride's Family |

FIGURE 1B

| ITEM | PAID BY |
|---|---|
| Reception Hall Fee | The Bride's Family |
| Catered Reception/Professional Services | The Bride's Family |
| Wedding Photography | The Bride's Family |
| Video Photography | The Bride's Family |
| Orchestra/Band/DJ | The Bride's Family |
| Wedding Favors | The Bride's Family |
| Groom's Cake | The Groom's Family |
| Rice Bags | The Bride's Family |
| Rehearsal Dinner | The Grooms Family |
| Bridesmaid Luncheon | The Bride |
| Bachelor Party | Best Man/Groom's Attendants |
| Wedding Breakfast | The Bride's Family |
| Bridal Brunch | The Bride's Family |
| Bridesmaid's Gowns | Bridesmaid's |
| Maid of Honor Gown | Maid of Honor |
| Matron of Honor Gown | Matron of Honor |
| Best Man Formal Wear | Best Man |
| Usher's Formal Wear | Ushers |
| Groomsmen's Formal Wear | Groomsmen |
| Gloves/Ties/Ascots for Attendants | The Groom |
| Father of Bride Formal Wear | Bride's Family |
| Father of Groom Formal Wear | Groom's Family |
| Children's Formal Wear | The Children's Parents |
| Limousine Service | The Groom |
| Honeymoon Arrangements | The Groom |
| Travel Expenses to the Wedding | The Out-of-town Attendant or Family Member |
| Accommodations for out-of town Guests | The Bride |
| Gifts for the Couple | Guest, Attendants and Family |

FIGURE 1C
Wedding Planning Checklist

Four Months Prior:
- Select date and time of the wedding
- Reserve the wedding and reception sites
- Choose members of the wedding party
- Decide the color scheme
- Set a firm budget
- Meet with the parents of the groom
- Make an appointment with your clergyman
- Start the guest list
- Began planning the reception
- Decide on the theme

Three Months Prior:
- Finalize plans for the reception
- Complete guest lists
- Order invitations
- Order the wedding cake
- Select the photographer
- Select the videographer
- Select the caterer
- Select a for the ceremony and reception floral plan
- Select a music plan
- Select the food plan

Two Months Prior:
- Select decorations
- Order thank-you notes
- Order napkins
- Order wedding cake
- Plan the ceremony
- Complete the guest list
- Reserve the rental of a men's wedding attire
- Schedule blood tests
- Confirm reception plans
- Begin addressing invitations

One Months Prior:
- Purchase small items such as the ring pillow, garters, guest book, etc.
- Began writing thank-you notes for any shower or engagement tips received to date
- Specify music for the ceremony and reception
- Make up a list of required photo shots
- Make up a list of required video shots

FIGURE 1D

| Two Weeks Prior: | One Week Prior: |
|---|---|
| • Send announcement to local newspaper<br>• Mail all the invitations<br>• Coordinate the rehearsal dinner<br>• Arrange a meeting with the florist<br>• Arrange a meeting with the caterer<br>• Arrange a meeting with the photographer<br>• Arrange a meeting with the videographer<br>• Arrange a meeting with the musicians or dj<br>• Arrange a meeting with the other vendors<br>• Arrange accommodations for out of town guests | • Confirm reception guest list and inform caterer<br>• Hire nursery workers if necessary<br>• Arrange for transport of your gifts to your home on the wedding day<br>• Make out a seating plan<br>• Place cards for the rehearsal dinner and reception<br>• Make up and mail a time schedule to all participants<br>• Confirm rehearsal plans with clergy<br>• Confirm with florist, caterer, photographer, videographer, musicians and others<br>• Pack boxes of supplies for the rehearsal<br>• Pack boxes of supplies for the wedding reception |
| Last Minute Arrangements: | Last Minute Arrangements: |
| • Confirm arrangements with Church/Minister<br>• Confirm arrangements with photographer<br>• Confirm arrangements with videographer<br>• Confirm arrangements with florist<br>• Confirm arrangements with caterer<br>• Confirm arrangements with dj<br>• Confirm arrangements with band<br>• Confirm arrangements with lodging<br>• Confirm arrangements with make-up artist<br>• Confirm arrangements with hair stylist | • Bring maps to reception<br>• Take guest book and pen<br>• Take cake cutting utensils<br>• Take a copy of vows and readings<br>• Bring the ring (for the Groom) |

FIGURE 1E

Result for Wedding Template Search

We found the following wedding templates that meet your search criteria:

| # | Style | Capacity | Price | Distance | Food | Location | Viewing Options |
|---|-------|----------|-------|----------|------|----------|-----------------|
| 1 | Scottish | 300 | $23,500 | 150 miles | Vegetarian | Lake Shore | Videos |
| 2 | Scottish | 175 | $19,850 | 239 miles | Vegetarian | Hall | DVD, CD, Cable |
| 3 | Scottish | 250 | $37,000 | 36 miles | Vegetarian | Hotel | Streaming Media |

FIGURE 1F

An Example of a Knowledge Template (e-Home Service Knowledge Template)

We found the following e-Home service template that meets your personal profile criteria for e-Home (electronic home) services:

| # | Service | Inter-active | Monthly fee | Coverage | Content | Delivery | Service Provider |
|---|---|---|---|---|---|---|---|
| 1 | Christian | yes | $5.00 | World Wide | Religious | Cable | A-1 |
| 2 | Conservative | yes | Free | National and local | Politics | DVD, CD, Cable | B-1 |
| 3 | Science | no | $3.00 | World Wide | Information | Streaming Video, Cable | Y-23 |
| 4 | Nature | no | $3.50 | World Wide | Information | Streaming Video, Cable | Y-37 |
| 5 | Children (ages 6-10) | yes | $7.00 | National | Education - entertainment | DVD, Cable, Streaming Video | C-14 |
| 6 | Children (ages 10-14) | yes | $7.00 | National | Education - entertainment | DVD, Cable, Streaming Video | C-17 |
| 7 | Children (all ages) | yes | $3.60 | Local | Education – activities | Cable, Streaming Video | L-15 |
| 8 | Classical Music | yes | $2.99 | World Wide | Music | Streaming Audio, wireless | M-3 |
| 9 | Stock Scan | yes | $12.00 | National and World Wide | Smart Information Delivery | Streaming Video, Cable, Wireless | S-120 |
| 10 | X – Rated Filter Option | yes | Free | World Wide | Smart Filter | Streaming Audio, Streaming Video, Cable, Wireless, Internet | X-1 |

The above service recommendations are based on your service preferences as submitted to us. You may delete any item from the above list prior to proceeding.

The total cost per month for all of the above services A-1, B-1, Y-23, Y-37, C-14, C-17, L-15, M-3, S-120 and X-1, representing a total of 10 services from 8 independent vendors is $39.70. When ordered as an integrated package, the cost to you will be $19.75.

FIGURE 1G

An Example of a Knowledge Template (Charitable Services Template)

We found the following charitable organization template that meets your personal profile criteria for local, national and international charitable services:

| # | Charity | Deductible? | Monthly Contribution | Coverage | Services |
|---|---|---|---|---|---|
| 1 | Red Cross | yes | $100.00 | World Wide | Health Services |
| 2 | United Way | yes | $100.00 | National and local | Community Services |
| 3 | March of Dimes | no | Variable | National | Medical Research |
| 4 | Sierra Club | yes | $15.00 | World Wide | Environmental Protection Programs |
| 5 | Harvard University | yes | Variable | National | Educational Institution |
| 6 | Save the Children | yes | $100.00 | World Wide | Health Services |
| 7 | Police Benevolent Association | yes | $10.00 | Local | Support Services |
| 8 | Philharmonic Hall | yes | Variable | Local | Musical Performances |
| 9 | Firemen Fund | yes | $10.00 | Local | Support Services |
| 10 | M.L.K Youth Center | yes | $20.00 | Local | Community Services |

FIGURE 1H

List of Vendors and Pricing for Kitchen Renovation Template

| Task | Name | Phone | Price | Evaluation |
|---|---|---|---|---|
| Cabinets | Kitchen Designs etc. | 874-318-9295 | $2,599 (delivered to door) | Courteous customer service. Kitchen cabinets arrived on time in good condition. |
| Painter 1* | Mario Lubiecki | 874-379-0201 | $350 per room | Arrived late and asked for entire sum up front. |
| Painter 2 | Don McCluskey | 874-380-7205 | $325 per room | Arrived on time and did a superb job |
| Tiles | Tile Man store | 874-327-9275 | $1,950 for kitchen floor | Highly recommended! |
| Plumbing | David Baring | 874-336-8344 | $550 for sink and repairs | Good plumbing job and reasonable price. |
| Electrician | Mike Sherman | 874-834-3416 | $480 for new electrical line installation and new outlets in kitchen | Had to drill extensively to get new electrical line down form the basement. Although it took longer than expected, charged the same price agreed on. |
| Carpenter | John Lansing | 874-932-8365 | $1,575 to install cabinets and new pantry | John does good work and is highly reliable. |

\* Note –

In subsequent uses of this template Painter 1 (or any other entry) may be replaced with another, more suitable, vendor. In this manner there is a gradual evolutionary improvement in each subsequent use of an event-related template.

FIGURE 1I

List of Vendors and Pricing for Kitchen Renovation Template

| Task | Name | Phone | Price | Evaluation |
|---|---|---|---|---|
| Cabinets | Kitchen Designs etc. | 874-318-9295 | $2,599 (delivered) | Courteous customer service. Kitchen cabinets arrived on time in good condition. |
| Painter 1* | Mario Lubiecki | 874-379-0201 | $350 per room | Arrived late and asked for entire sum up front. |
| Painter 2 | Don McCluskey | 874-380-7205 | $325 per room | Arrived on time and did a superb job |
| Tiles | Tile Man Store | 874-327-9275 | $1,950 for kitchen floor | Highly recommended! |
| Plumbing | David Baring | 874-336-8344 | $550 for sink and repairs | Good plumbing job and reasonable price. |
| Electrician | Mike Sherman | 874-834-3416 | $480 for new electrical line installation and new outlets in kitchen | Had to drill extensively to get new electrical line down form the basement. Although it took longer than expected, charged the same price agreed on. |
| Carpenter | John Lansing | 874-932-8365 | $1,575 for new pantry and cabinets | John does good work and is highly reliable. |

* Note – In subsequent uses of this template Painter 1 (or any other suitable entry) may be replaced with another, more suitable, vendor. In this manner there is a gradual evolutionary improvement in each subsequent use of an event-related template.

FIGURE 1J
Cabinet Costs for Kitchen Renovation Template

| Quantity | Item | Price |
|---|---|---|
| 1 | 15 inches base white | $65.88 |
| 1 | 30 Inches Base White | $100.98 |
| 1 | 33 Inches Base White | $104.22 |
| 1 | 36 Inches Diagonal Sink Base White | $63.18 |
| 1 | Pack UB Classic | $75.60 |
| 3 | Pack C Classic | $95.58 |
| 1 | Pack X Classic / Diagonal Sink | $32.94 |
| 1 | 30 Inch Filler | $25.92 |
| 2 | 8 Feet Melamine Toe Kick White / Medium | $29.16 |
| 1 | 15 X 42 Wall Cabinet White | $57.78 |
| 2 | 27 X 42 Wall Cabinet White | $137.16 |
| 1 | 30 X 24 Wall Cabinet White | $39.42 |
| 1 | 33 X 24 Wall Cabinet White | $45.90 |
| 1 | 33 X 42 Wall Cabinet White | $76.68 |
| 1 | Base Cabinet White | $59.94 |
| 1 | Classic Door Pack AB | $27.00 |
| 1 | Classic Door Pack GG | $43.20 |
| 2 | Classic Door Pack II | $91.80 |
| 1 | Classic Door Pack JJ | $46.44 |
| 1 | Classic Door Pack KK | $51.84 |
| 2 | Classic Door Pack WC | $168.48 |
| 1 | Blind Corner Overlay | $34.56 |
| 3 | Crown Molding | $113.40 |
| 1 | End Shelf | $70.20 |
| 1 | Rollout Tray | $35.10 |
| 1 | Formica Countertop - Summer Foliage | $416.89 |
| 1 | Formica Sheet 5' X 11' - Summer Foliage | $156.20 |
| 1 | Shipping | $130.00 |
|  | Order Total | $2,395.45 |
|  | Sales Tax | $203.61 |
|  | Balance Due | $2,599.06 |

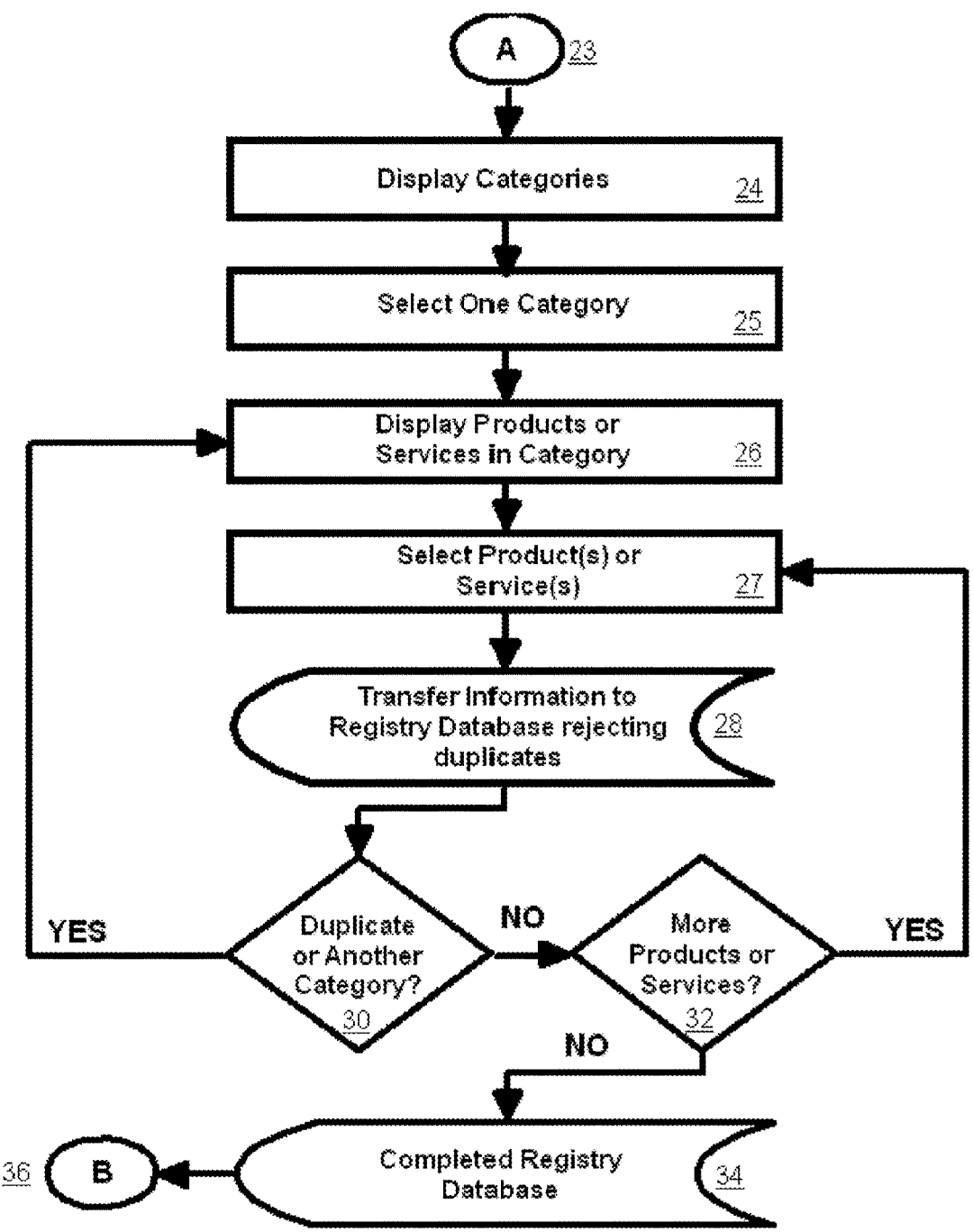

INTERACTIVE EVENT PLANNING AND PAYMENT METHOD AND SYSTEM

CROSS-REFERENCE TO RELATED APPLICATIONS

This application is a continuation of U.S. patent application Ser. No. 10/014,720 filed Dec. 11, 2001 now abandoned which claims priority under 35 U.S.C. §119(e) of U.S. provisional patent application Ser. No. 60/254,566 filed Dec. 11, 2000, now expired, U.S. provisional patent application Ser. No. 60/254,854 filed Dec. 12, 2000, now expired, and U.S. provisional patent application Ser. No. 60/265,425 filed Jan. 31, 2001, now expired, all of which are incorporated by reference herein.

FIELD OF THE INVENTION

The present invention relates to an interactive event coordination method which enables event organizers to integrate all event-related activities, including contracting for services to be performed at the event and gifts to be received in connection with the event, into a single revenue management system.

More particularly, the present invention relates to an interactive registry system, such as a bridal registry system, which creates an on-line marketplace concept matching buyers and sellers while providing incentives to both parties for using the registry system.

The present invention in addition relates to a method for an event organizer to arrange the receipt of gifts for the event and services rendered in conjunction with the event.

The present invention also relates to an event planning method and system involving the use of knowledge templates that greatly simplifies the processes of event planning and service ordering.

The present invention relates as well to an event planning method and system constituting an information catalyst that transforms data into new and more effective formats.

BACKGROUND OF THE INVENTION

Although the invention described below is useful for any type of event, it would be particularly useful in connection with a wedding. Therefore, background of the manner in which gifts are given to a wedding couple through the use of a bridal registry system will initially be described.

In a traditional registry system such as a bridal registry system, the bride and groom 'register' or sign up with a specific retailer, for example, a chinaware vendor or multipurpose retailer, and then the couples select which items the retailer carries that they are potentially interested in receiving. Such a traditional registry system is set forth as a flow chart in FIG. 2A. In step 2, the event organizer, the bride and groom, register with one or more retailers and choose the items for a list. The couple then notifies their guests of their selected retailer(s) (step 4). Guests are then urged to visit the retailers and purchase their gifts for the bride and groom at these retailers (step 6) for two reasons: 1) to ensure that their gift is what the bride and groom need and desire, and 2) to ensure there are no gift duplicates, e.g., five guests who all bring toasters. Additionally, some retailers offer discounts if the value of the purchased products exceeds a certain amount. Once the event has passed, the event organizer visits the retailer(s) to collect the items purchased by the guests (step 8).

There are several problems inherent with this traditional registry system. First, the traditional registry locks the bride, groom and guests into a very limited range of gifts, as they must all be chosen from only the selection of the specific retailer(s). Second, the bride, groom and guests are also forced to pay whatever prices are stipulated by the retailer and cannot comparison-shop or 'shop around' to find the best price or value for the item they require. It is often the case that one retailer has certain goods at a lower price than another retailer but other goods are at a higher price and thus, the bride and groom, assuming they want the item and did not want to register at numerous retailers, would be compelled to place the item on the registry list in spite of the higher price. If they do find a better price at another retailer and purchase the gift at that other retailer, then the bride and groom may end up with two of the same gifts, i.e., someone else may purchase the same gift via the bridal registry. Third, the guest may not like the selection of the remaining gifts left for them to 'give' (or the cost of the remaining gifts), and yet there are no other obvious options. From the perspective of retailers, only one retailer, usually an expensive and established brand name with an established presence in the bridal registry market, will receive the revenue for the entire wedding's gift purchases, denying the market opportunity for smaller retailers, niche retailers, discount retailers or regional retailers.

The online wedding marketplace also has yet to reach its true potential in terms of sales and branding. For example, in a recent article by Cate Corcoran called "The Bride Wore Swag", Corcoran notes that the upscale retailer Williams-Sonoma has almost doubled their total registry sales within the first six months' of launching their website. Their e-commerce division, which totals forty people and in other industries normally takes years to turn a profit, expects to turn a profit by the end of the first year. Although Williams-Sonoma's online registry follows a traditional registry format, the as-yet nascent potential of online wedding sales is aptly demonstrated through their sites' early success.

Arranging for gifts is an important part of the event. However, more important, is arranging the services to be performed at the event, e.g., the entertainment, and the goods to be delivered in connection with the event, e.g., the food and flowers. There is much room for improvement in the manner in which an event such as a wedding is financed.

At present, there is a total lack of integrated financial planning options in the current event planning and wedding planning markets. The domain of e-commerce is the perfect arena for such a marketplace to function because it can contain unlimited resources of information, options and opportunities. The Internet also offers efficiency and ease in organizing and coordinating the potentially very complex and multifaceted event planning and financing process.

Typical lists for wedding financing are quite complex. Consider a typical list, set forth in FIGS. 1A, 1B and 1c.

It would be desirable to attempt to automate the process of allocating, distributing and paying for the various items listed in FIGS. 1A, 1B and 1C thereby leaving the bride and groom and their respective family and friends with more time and energy available for things more important than worrying about who exactly pays for what at any given time.

Traditionally, in preparation for an event such as a wedding, often as early as one or two years in advance of the "big day", the bride and/or groom create an wedding plan, describing their wedding location (for example, a beach wedding or a hotel-based wedding) as well as their budget. Their preliminary "Event Plan" is finished with a preliminary choice for the location, budget and other important details regarding their wedding. Such a traditional event planning system is set forth as a flow chart in FIG. 2B. In step 10, the event organizer, the bride and groom, create their event plan, i.e., a list of desires for the event vis-a-vis entertainment, food, location, timing, etc. The couple then searches for vendors who are able to bring their plan to reality (step 12). The couple interviews the potential vendors in order to find the best fit between their plans and the vendors' capabilities (step 14). The couple then usually selects finalists for closer scrutiny. Finally, vendors are selected (step 16) and a contract is negotiated (step 18), signed and a deposit is paid (step 20). Once the event has passed, the event organizer pays any remaining obligation to the each vendor (step 22), it being assumed that a downpayment is usually made to the vendor in advance of the event.

There are several problems with this type of event payment system. First, the traditional planning and payment method requires the bride and groom as well as their respective family members and guests to keep track of a wide range of intricate payment obligations as indicated in FIGS. 1A and 1B. This makes payments for events in general, and weddings in particular, subject to potential complications as well as possible conflict. The system as currently implemented does not offer event planners a systematic way to organize and collect payments and gifts, nor does it allow for new sources of revenue. Furthermore, the current system offers both event planners as well as vendors few informal options of recourse when obligations are not fully met (aside from proceeding with expensive and time consuming legal procedures.)

The event or service planning method and system is an invention in the arena of business methods or processes as applied to the realm of e-commerce, or Internet commerce.

As yet, there is a total lack of integrated event planning options in the current event planning and wedding planning markets. The currently available services seem to transfer highly inefficient offline or "real world" planning processes and translate them to an equally inefficient online version. The domain of e-commerce is the perfect arena for such a marketplace to function because it can contain unlimited resources of information, options and opportunities.

The Internet offers efficiency and ease in organizing and coordinating potentially highly complex and multifaceted event planning processes. For example, the potential efficiencies of e-commerce may be obtained by uniting all event planning processes and vendors into an integrated vertical supply chain. This arrangement would more fully utilize the potential of the Internet for this sector by combining the many vendors and services into one event planning "supermarket." This has not yet happened. As discussed in detail below, it is the intent of the present invention to facilitate and catalyze such an opportunity.

Among the advantages of computers and the Internet is the quality of perfect memory. Unlike most humans, computers have perfect recall. Humans, on the other hand, have the ability to generate useful information regarding personal events that computers, even supercomputers, remain incapable of. So while properly programmed computers can generate interesting as well as useful economic or weather models, for example, humans are still much more adept at planning events like a perfect wedding, a beautiful home renovation an ideal vacation, or other service options tailor made to suit their own individual lifestyles.

Similarly, in businesses or other organizations where individuals process information or knowledge as part of their job, the information that they gather is typically collected from multiple sources and further processed in order to generate value for the organization. Much effort is required to insure that when the knowledge that these individuals have acquired is fully utilized within the organization. Otherwise, when they leave the organization, much of their carefully acquired information is lost.

The information and knowledge requirements that hold true for a business or other organization hold true for society at large as well. Individuals spend much time and effort in planning and executing events, yet much of the knowledge that is accumulated in the course of preparing for those events are lost once the event is over. Moreover, providing incentives to individuals or institutions to share information with others is also important. Existing systems for collecting and managing event related information are inadequate because they do not provide for effective submitting, accessing, updating, evaluating, and rewarding processes associated with event related information and knowledge.

Much of the time, effort and intense planning that goes into planning unique events and operations such as weddings, affairs, parties, vacations, renovations, marketing, advertising campaigns, and other complex human activities are lost since little or no effort is made to capture that information and knowledge for use by others outside their immediate company or organization. Each event may treated as a unique and custom occurrence, never to be replicated again, when in fact, much of the same time and effort to perform the same or similar activity is often needlessly replicated over and over again.

According to the present invention the disadvantages and problems associated with managing event related information and knowledge have been substantially reduced or eliminated. This is accomplished, in part, by the design of a novel digital tool.

Today's Internet pioneers have created a wide array of business designs from just a few digital tools. Each individual tool may be described as a general purpose strategic subsystem, or alternatively, as a "bit engine." Just as machine tools shape and hone metal bit engines shape and home realtime data. Bit engines expand relationships and create value for customers, suppliers, employees and shareholders.

Among the major types of bit and engines currently in use are, customer productivity engines, e-learning engines, community engines, Internet marketplace agents, recommendation engines, and choiceboards.

Customer productivity engines connect customers to a company's IT applications. Productivity engines, however, often require significant customer sophistication and commitment. Therefore the customer productivity engine generally suits firms that sell high-ticket items to businesses or upscale consumers.

E-learning and engines provide online technical training and get customers quickly up to speed on a company's new products and technologies. Cisco's E-learning Center, which offers a virtual classrooms and on-line libraries, is among the most successful in this category.

Community engines that organize open-ended on-line conversations are among the most dynamic of these basic bit engines. Discussion threads are the prime example of its use in business applications. A discussion thread begins when a user poses a question on a specific technical or business issue and the engine records further conversations as other users respond with solutions and advice.

Internet marketplace agents are bit engines that firms utilize in on-line business-to-business marketplaces and exchanges. Web based markets, such as Chemdex and Plasticnet allow firms to reach more customers a strike better deals. A company would use the marketplace agent to conduct business on these exchanges.

Recommendation engines help customers choose from a variety of existing products and services. GE Plastics, for example, uses a recommendation and to guide manufacturers to the expanding array of products the company and its partners develop. Amazon.com's engine uses reviews by other customers to generate fresh book recommendations.

Choiceboards are best illustrated by Dell's classic "configurator" and may be the most important bit engine to appear on the Web thus far. Choiceboards allow firms to slash inventory and other operating costs while offering customers products that match what they want more precisely. Customer orders set in motion the wheels of procurement, assembly and delivery. Choiceboards also provide realtime high-quality data on customer tastes and behavior that is critical in fast-moving industries. Choiceboards work best for products made from modular components that delivered to smart, flexible supply chain systems. The engine also requires sufficient customer knowledge of the product. Therefore, while choiceboards would seem useful to great many businesses, they would not be a good way to buy many services such event planning.

As discussed in detail below, the service planning method and system as applied to event planning, takes the concepts of recommendation engines and choiceboards and applies them in a new and non-obvious way to the realm of event planning.

In addition, the service planning method and system as applied to the searching for and acquiring of e-services (such as an electronic home or "e-home" services), takes the concepts of recommendation engines and choiceboards and applies them in a new and non-obvious way to the realm of electronic services planning, thereby taking advantage of a key computer quality.

Among the advantages of computers and the Internet is the quality of perfect memory. Unlike most humans, computers have perfect recall. Humans, on the other hand, have the ability to generate useful information regarding personal events that computers, even supercomputers, remain incapable of. So while properly programmed computers can generate interesting as well as useful economic or weather models, for example, humans are still much more adept at planning events like a perfect wedding, a beautiful home renovation an ideal vacation, or other service options tailor made to suit their own individual lifestyles.

In order to understand how the invention functions in a unique manner, it is important to understand how the traditional event planning process works, for example, in the context of a wedding.

Traditionally, tasks are broken down into the goal setting stage (step 310) in which basic questions are asked regarding the type of wedding desired. Once basic questions have been answered in step 310 the process proceeds to the early planning stage (step 312) in which basic style, location, approximate date and time, types of wedding, and wedding budget are formulated. Subsequent steps may occur at approximately 4 months prior (step 314), 3 months prior (step 316), 2 months prior (step 318), 1 months prior (step 320), 3 weeks prior (step 322), 2 weeks prior (step 324), 1 weeks prior (step 326), and last minute preparations (step 328) with typical tasks associated with these times set forth in FIG. 1D.

FIG. 15 shows a flow chart of the manner in which the event organizer plans and organizes an event with emphasis on the process of locating, selecting, negotiating with and paying vendors.

The event organizer creates an event plan (wedding) in accordance with her objectives (step 330). She must then search for appropriate vendors (step 332), interview potential vendors (step 334), select the best vendors that meet her needs (step 336), negotiate with each vendor to arrange for performance, pricing and payment requirements (step 338), sign contract(s) and pay a deposit to the vendor(s) (step 340), and, if all goes well, pay any remaining obligation to the vendor(s) (step 342).

There are several problems inherent with this planning system. First, the traditional planning and payment method requires the bride and groom as well as their respective family members and guests to keep track of a wide range of complex activities as indicated in FIGS. 1D and 16. This makes planning for events in general, and weddings in particular, subject to potential complications as well as possible conflict. The system as currently implemented does not offer event planners a systematic way to collect, organize and integrate planning information, nor does it allow them to copyright and resell event planning information as intellectual property.

Furthermore, the fragmented nature of the wedding creates huge inefficiencies and frustrations for both vendors and couples, because for each wedding, the process of vendor-solicitation must be recreated. Each wedding becomes custom made event in which couples negotiates with between ten and fifteen separate vendors, services and retailers for an average wedding. Meanwhile, vendors are constantly striving to differentiate themselves in the marketplace. With approximately 2.5 million weddings in the US each year, these processes of vendor negotiations and couple searching are reenacted millions of times every year. This amounts to a lot of woman-years and private energy that would be reduced and reclaimed by the present invention.

OBJECTS AND SUMMARY OF THE INVENTION

It is an object of the present invention to provide a new and improved registry system such as a bridal registry system which eliminates the problems discussed above.

It is another object of the present invention to provide a registry system which operates both as an improvement of the traditional online registry system and also an inversion of the traditional registry process.

It is yet another object of the present invention to provide a novel integrated event coordination system (a gift collection and bill payment system for an event) with unique revenue generating options that eliminates the problems discussed above and, in addition, offers the possibility of easy access to new revenue streams for the event planner.

Still another object of the present invention is to provide a revenue management system for an event which operates both as a novel means of collecting cash gifts, donations, admission fees and other income related to specific events as well as a unique venue for paying the bills that arise from the organizing and execution of specific events or parties.

It is an object of the present invention to provide a new and improved service planning method and system which simplifies the processes of service ordering and event planning.

It is another object of the present invention to provide a new and improved service planning method and system in which pre-planned events and services can be repeatedly used and optionally tailored to meet particular requirements of an event organizer or consumer.

It is an object of the present invention to provide a new and improved event planning method and system that simplifies the processes of event planning.

It is another object of the present invention to provide a new and improved event planning method and system in which pre-planned events can be repeatedly used and optionally tailored to meet particular requirements of an event organizer or consumer.

It is yet another object of the present invention to provide a new and improved event planning method and system in which events can be planned and considered property for the purpose of enabling the event planners to be compensated for planning of the event.

In order to achieve these objects and others, the current invention enables an event organizer to save time and money and to derive income in the event planning process. Saving time is made possible by means of: a "Knowledge Template", also referred to as an "Information Template" herein, that integrates event-related elements into a single, all-encompassing event planning template, thereby reducing the time spent selecting and deciding on the inclusion of individual event related elements, and also by means of a "General Fund" that merges all event related income, expenses and loans into one central account, thereby reducing the amount of time needed to supervise and coordinate event-related cash flow. Saving money and deriving income is facilitated by: publishing prices for events which institutes price transparency and comparison shopping in the event planning marketplace, creating a "Knowledge Template" or an "Information Template" market that allows event organizers to obtain income from selling the rights to an event planning template to other event organizers, a "General Fund" that permits an event organizer the ability to generate and collect event-related income from, for example, the sale of advertising or broadcast rights, and, furthermore, facilitates the utilization of event related income (e.g. gifts) to directly offset event expenses.

Accordingly, the event planning method and system proposed herein, also referred to herein as an "event planning engine" or "event engine", allows event planners, in general, and brides and grooms, in particular, the ability to focus on the overall results desired in event planning without becoming entangled in the mechanics of searching for vendors and coordinating their various services in the hope of achieving a desirable outcome. In addition, the event engine allows for new forms of revenue generating services, such as allowing the event planner to copyright and sell event engine rights as well as to receive consulting fees regarding the proper use of their templates.

The event engine transforms the event planning process by creating an online database or datamart that collects, links and coordinates all event-related information needed to accurately and reliably reproduce the event again and again. By listing all event-related vendors, services, products, contracts and charges, another event planner can reproduce the same event over again at the same or similar cost without the need to recreate the entire exhausting event planning and creation process. Alternatively, the event engine is flexible enough to allow event planners to customize or tailor their event, without the need to re-plan and re-create the event from scratch.

Essentially, the event engine provides a means for novel and simplified event planning processes that allows for a wider range of planning flexibility as well as new income sources for event organizers.

BRIEF DESCRIPTION OF THE DRAWINGS

The following drawings are illustrative of embodiments of the invention and are not meant to limit the scope of the invention as encompassed by the claims.

FIGS. 1A, 1B and 1C are lists of goods and services associated with a wedding with an indication of the traditional payor.

FIG. 1D shows wedding planning checklists itemizing goods and services for a wedding with an indication of the time frame for procuring them.

FIG. 1E shows a sample result from a search of wedding templates.

FIGS. 1F, 1G and 1H show sample results from a search of service templates.

FIG. 1I shows a listing of vendors and pricing for a kitchen renovation template.

FIG. 1J is material costs for a kitchen renovation.

FIG. 3 is a flow chart of the manner in which a database of gifts and services is created in the interactive registry system in accordance with the invention.

DETAILED DESCRIPTION OF THE INVENTION

Figure 2A:
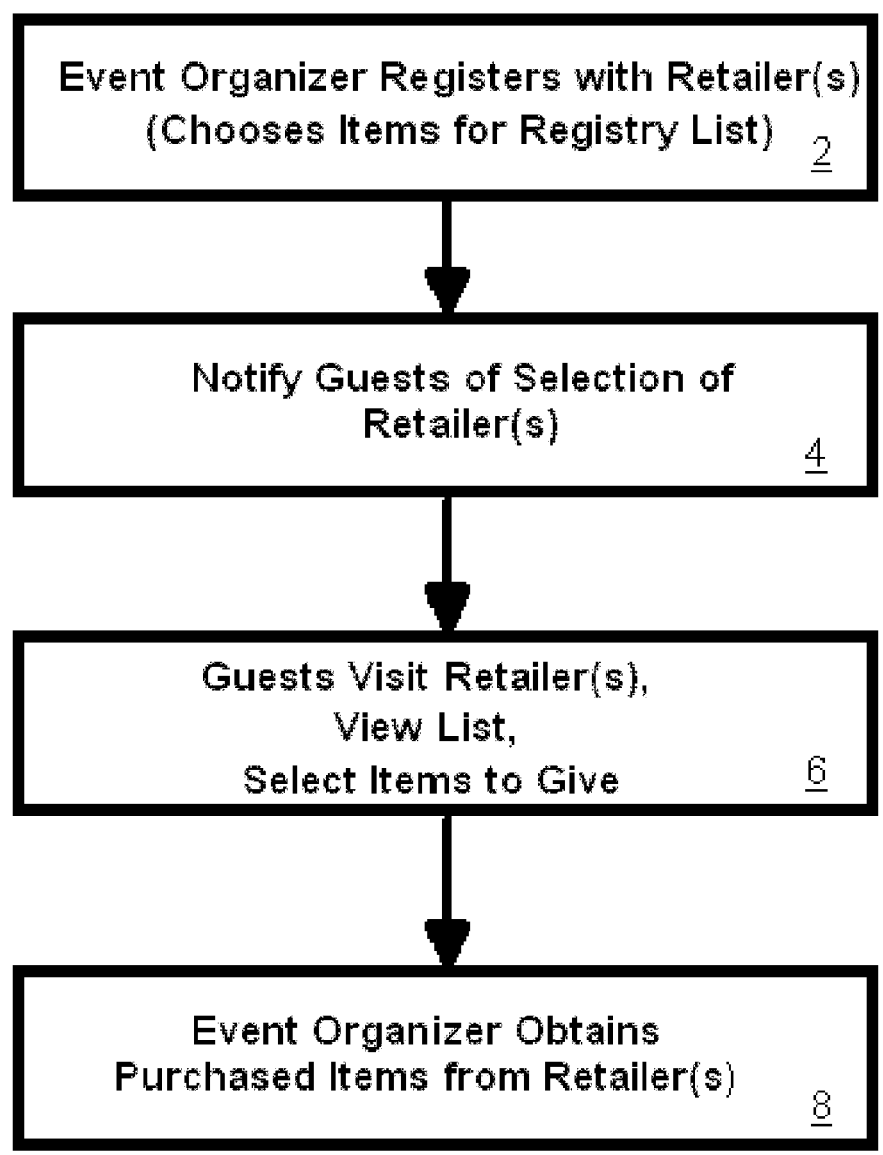
FIG. 2A is a flow chart of a traditional registry system e.g., a bridal registry system.

Referring to the accompanying drawings wherein like reference numerals refer to the same or similar elements, FIG. 3 shows a flow chart of the operation of the manner in which an event organizer creates a database of gifts and services desired for a specific event for use in an interactive registry system in accordance with the invention for use as a bridal registry system.

Initially, couples will visit the cybermediary (a website), sometimes referred to herein as the "WWWed" website (step 23-oval A), and view a display of existing potential categories of products and services listed through the registry's category listings (step 24). Categories may include appliances, music, china, and caterers. Potential products in the categories will include common wedding gifts like toasters and tableware and common wedding services like hall rental or DJ hire.

Thereafter, the couple will select a category (step 25) and a list of the products and services in that category will be displayed (step 26). A couple may be presented with the option of filling in the name of preferred vendors within a specific service category. The couple will then determine which gift(s) or service(s)s from that category they will require (or want) and will create an electronic listing with WWWed that reflects their choices (step 27). Once entered, this information will be transferred to an online registry database (step 28). (In the alternative, the information could be stored in the user's computer and transferred to the online registry database only after the user finishes selecting products and services. Further, the user could be empowered or authorized to download the entire menu of choices and select products and services at their convenience off-line.) This database will automatically reject errors and duplicates. This process will continue to enable the couple to select another category (step 30) or another product or service within a specific category (step 32) and avoid duplicate choices (step 30) until they have selected all desired categories and completed the database (step 34). This listing can be updated by the couple at any time by re-accessing the database and entering a unique registry code and can be as specific or as general in each category as the couple desire. These listings are customizable by the couple, or user, in any number of ways. Couples may choose to limit the kind of purchases or gifts that guests can purchase for them through the registry, such as limiting gift options only to cash gifts or only to consumer-products wish-list gifts. Couples may determine the type of specialized products or services that they want or require to reflect their needs, such as the special requirements of Indian weddings or Islamic weddings or weddings in Alaska or on a tropical island, or within a certain price spectrum. Only luxury gift items, for example, can be listed if the couple so desires.

This electronic listing will be imported into the registry system (step 36-oval B), which will then function as either a product directory, a comparative price-shopper, or an auction-house for each of the products or services specified with relevant wedding vendors. The end result will be a listing of all the relevant wedding vendors for each product or service, typically ranked by price.

Couples will also have the option to allow other couples in their geographical area to view selected information regarding their wedding service preferences. This will allow couples to share in the expense of wedding services in the event that the other couple(s) plan to have their wedding during the same time or on the same day.

When appropriate to the product or service at hand, the registry will function as a simple product directory or catalog. The registry will generate an updated listing of all relevant products or services, their vendors, their product information and prices for the category in question. It is then up to the couple to decide which item is best suited for them.

When appropriate to the product or service at hand, the registry will function as a comparative price-shopper. A computer program known as a 'bot' will search vendor sites on the Internet for the product in question. It will then generate a list for the couple of the products available, their vendors, links to product information and product prices. The listing will be ranked by price. Couples can either choose to manually pick amongst the vendors on the list themselves or have the registry automatically select the product in question from the vendor who lists at the lowest price.

When appropriate to the product or service at hand, the registry will function as an online auction. Vendors will make bids under the relevant product categories to compete for the lowest price. Whichever vendor bids at the lowest price will receive the purchase order from the registry at the time of payment.

For all processes, payment to each vendor will commence either whenever a guest chooses to buy the gift in question or whenever the couple chooses to buy the gift in question. If neither the guest nor the couple end up buying the gift in question, the listings are erased with no compensation given to the vendors.

For all processes, the registry and its operator, e.g., WWWed, will remain an impartial intermediary between the vendors listed and the user, e.g. the couples, the registry will always list vendors for free. The Reverse Registry will not discriminate against certain vendors unless there is a valid and logical reason, such as a record of poor products or service.

Figure 4:
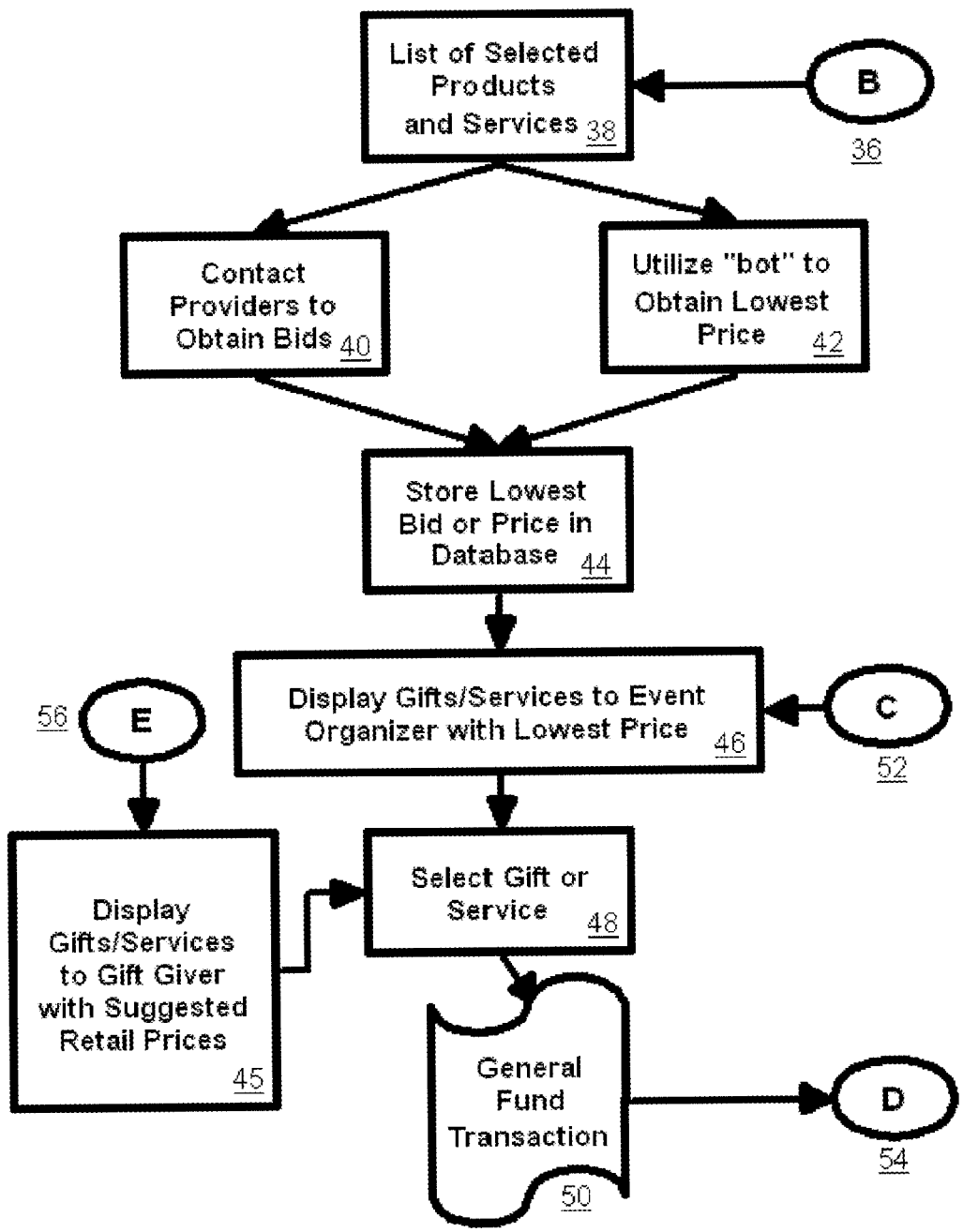
FIG. 4 is a flow chart of the manner in which a gift or service is purchased in the interactive registry system in accordance with the invention.

With reference to FIG. 4, the list of products and services is represented at step 38 and can be viewed by the event organizer whenever desired by visiting the website at which the list is maintained. The cybermediary has several options available to match the listed products and services with providers. As noted above, one option is to contact enlisted providers to obtain bids (step 40), or only specific selected providers as determined by the event organizer. Another option would be to use a "bot" to obtain the identification of an Internet merchant offering the product or service at the lowest price (step 42). The lowest bid or price obtained by the "bot" is then stored in association with the list of products and services (step 44) and can be shown to the event organizer (step 46).

Couples or the event organizer will notify guests of the Internet location of the registry. The registry will provide for differentiated access to registry information to couples, guests and vendors. Using, for example, separate user names and passwords, the registry will provide a custom website containing information appropriate for the individual couple, guest and vendor.

At their leisure, guests will visit the registry and view a list of potential gifts corresponding to the couple's wish-list as well as suggested retail prices of these gifts (step 45). The suggested retail price will invariably be a price greater than the lowest price bid by a provider or obtained through the use of a bot. The suggested retail price may also be a fixed percentage above the lowest price or a fixed amount above the lowest price. If a couple has specified only monetary donations, no gift options will be listed. Otherwise, the gifts listed and their prices will be derived from the average retail price of the gift in question on other bridal and consumer sites.

If a guest chooses to buy one of the gifts listed (step 48), the guest will submit payment to the General Fund (step 50), an interactive financial vehicle for collecting and distributing all funds related to the event. Payment will be made to the General Fund using checks, a credit card, a debit card, or other means, with the exact date of payment determined by the guest. In addition, the payment method may be any currently in use for Internet-based commerce as well as any new payment methods developed for Internet-based commerce.

As soon as a guest chooses one of the gifts listed for purchase, that gift is removed from the registry listing for that couple and options will be made available to the event organizer to confirm or exchange the gift prior to the event or prior to the initiation of contractual obligations, whichever comes first (step 54-oval D, discussed below).

Figure 5:
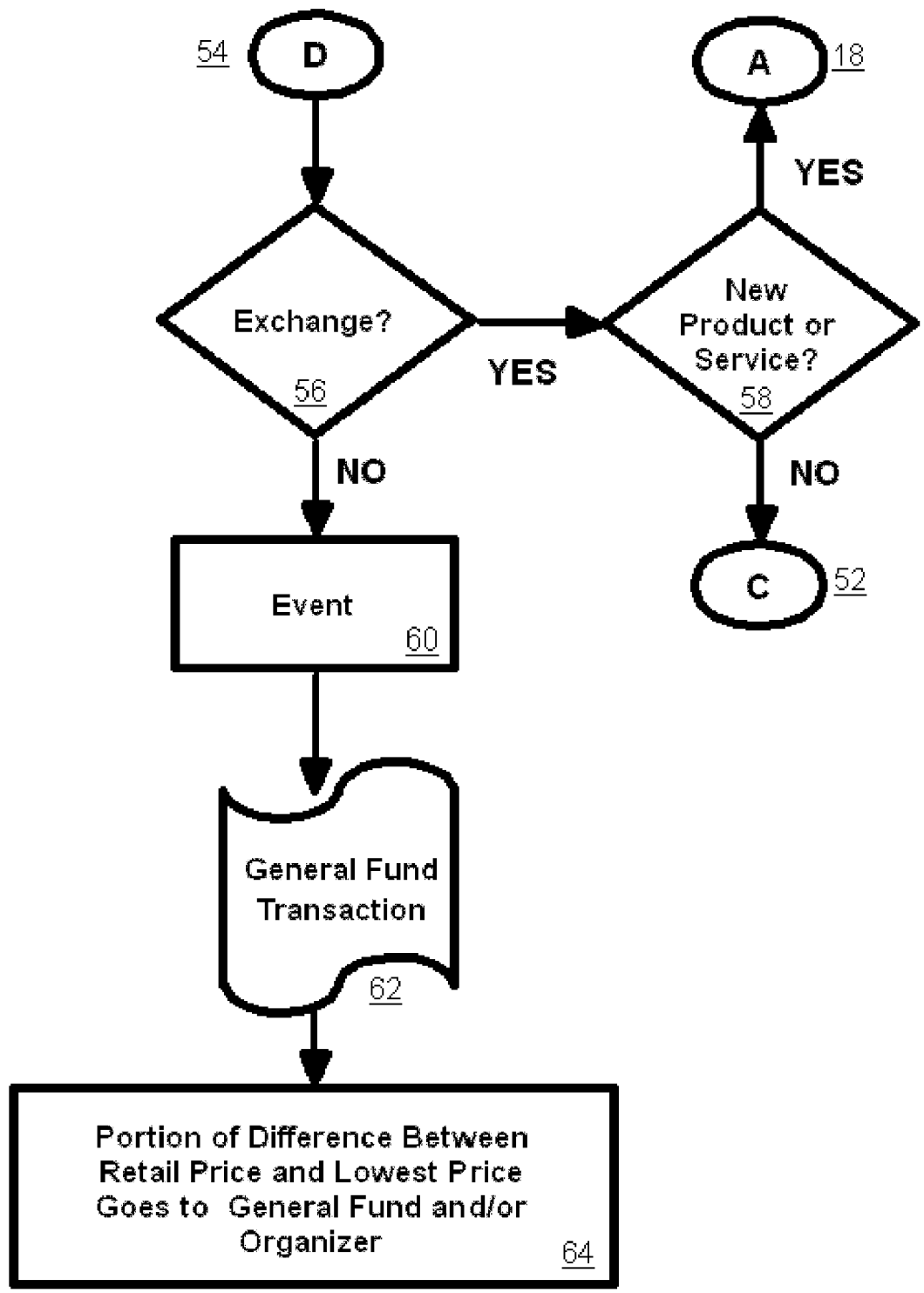
FIG. 5 is a flow chart of the manner in which a gift or service is exchanged in the interactive registry system in accordance with the invention.

FIG. 5 shows a flow chart describing how the event organizer may utilize the General Fund to exchange a gift or service within the registry.

Figure 2B:
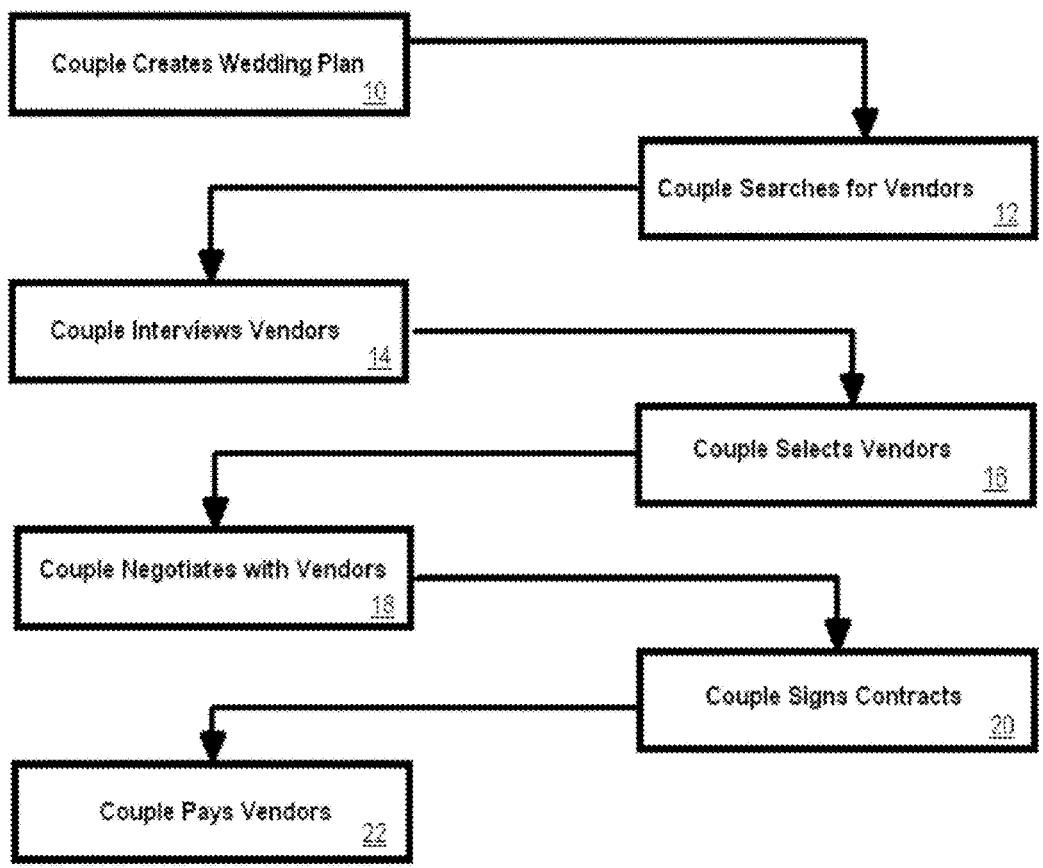
FIG. 2B is a flow chart of a traditional event payment system e.g., a wedding planning/payment system.

If the event organizer decides to exchange the gift or service (step 56), depending on whether the new item is a previously listed product or service (step 58), the event organizer will proceed to either step 52 (for a previously listed item-see FIG. 3) or, alternatively to step 18 for a new product or service (see FIG. 2B). The exchange process redistributes money from the General Fund to the products and services given the highest priority by the event organizer. Since priorities can rapidly change with time, this option allows the event organizer maximum leeway in dealing with both anticipated and unanticipated requirements prior to the actual event (step 60).

On the payment date specified, the funds will be transferred to the General Fund (step 62).

For services, after the General Fund receives payment, a portion of the fund can be paid to the vendor, if required, prior to the event (step 50). The remainder of the funds will be paid on or after the wedding day, as stipulated by contract (step 62).

For gifts, at the time of the gift's delivery, i.e., after the event (step 60), the remainder of the actual price of the gift as listed for the couple will be sent to the vendor (step 62).

After all payments have been made, the differential between the actual prices paid by the General Fund and the listed retail prices as viewed by the guests will be divided between the General Fund and the cybermediary for facilitating the transaction through the registry system (step 64).

Figure 6:
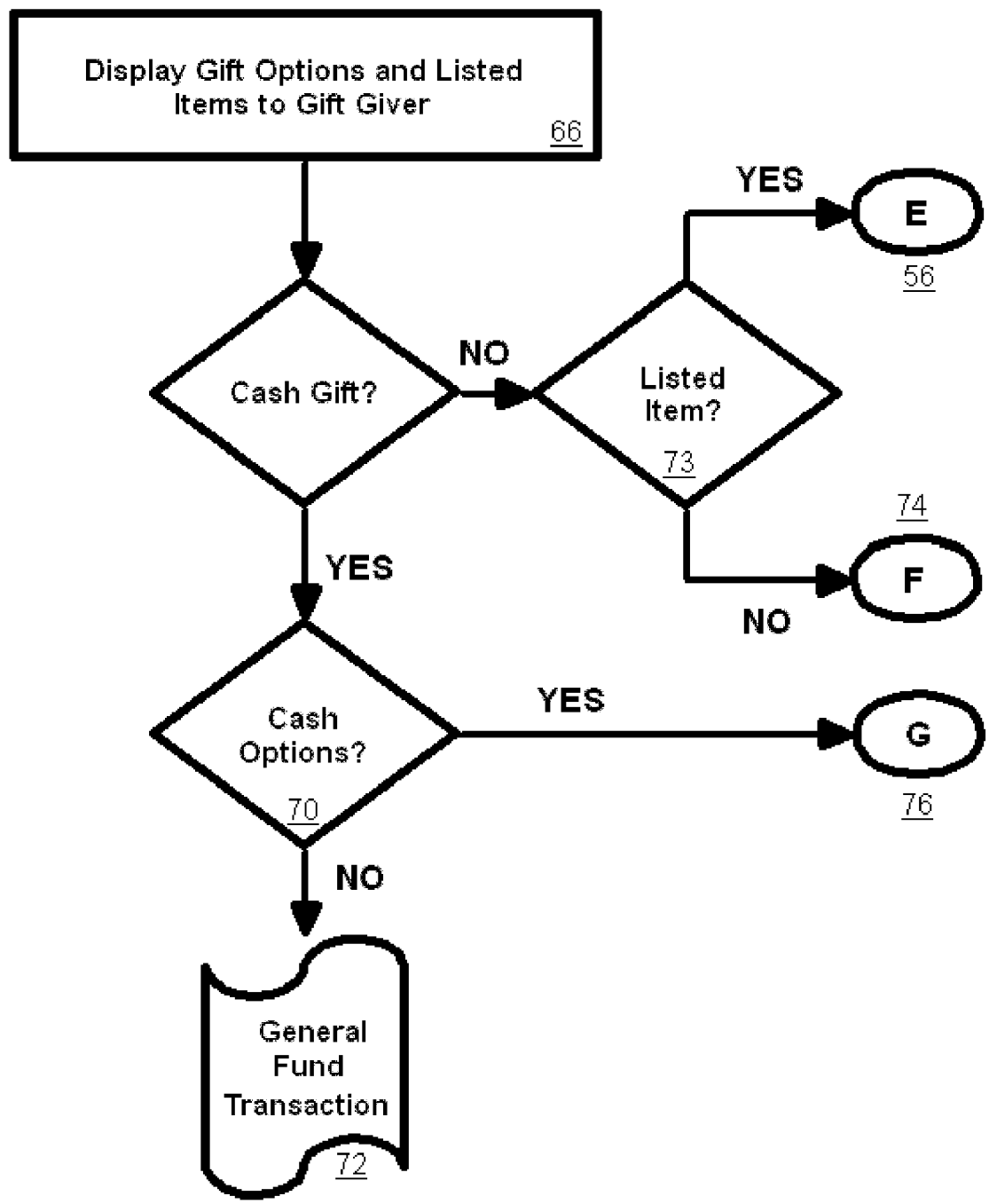
FIG. 6 is a flow chart displaying the various options available to a gift giver in the interactive registry system in accordance with the invention.

FIG. 6 shows a flow chart describing the options available to the gift giver within the registry.

The gift giver has several options in choosing to give a gift (step 66). The gift giver has the option of giving a listed gift (step 56) or unlisted gift (step 74). The gift giver also has the option of choosing to give a cash gift as an alternative or in place of a gift specified by the event organizer (steps 68, 70 and 76). In the event that the gift giver chooses to give a cash gift (steps 68 and 70) money is transferred directly to the General Fund account without stipulation as to the use of those funds. Such funds may be spent simply as the couple sees fit (step 72). If the gift giver chooses to give a gift which is not on the list, i.e., a non-listed gift, then they are directed to the menu of choices for selecting a gift in FIG. 8 discussed below.

Figure 7:
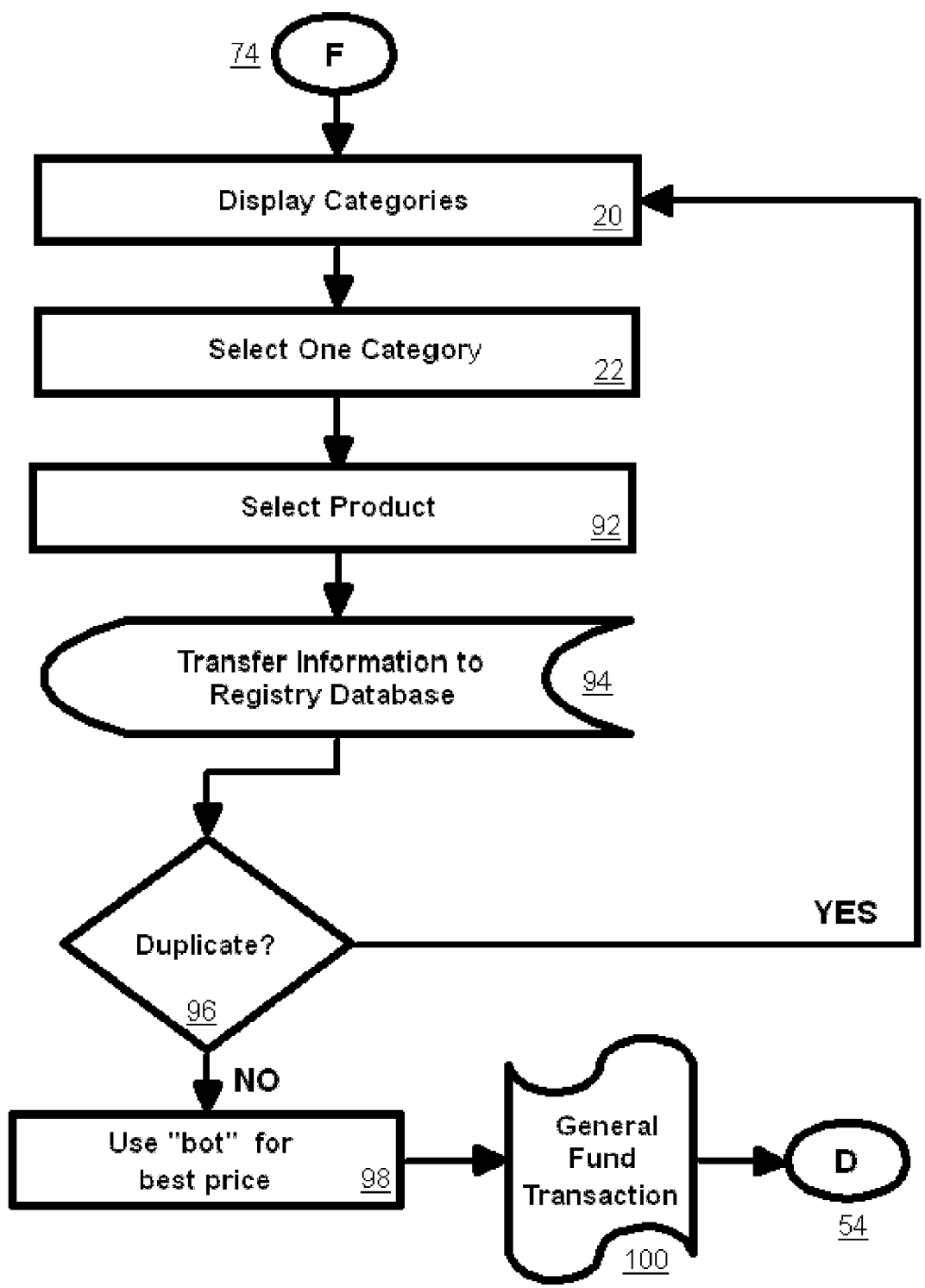
FIG. 7 is a flow chart of the manner in which a gift giver may purchase a non-listed item in the interactive registry system in accordance with the invention.

FIG. 7 is a flow chart describing the options available to a gift giver who submits a cash gift (including a check, credit transaction or e-credit transaction) to the interactive registry system in accordance with the invention.

Alternatively, as described in FIG. 7, a cash gift may be given in a complex fashion in accordance with the specifications of the gift giver, allowing flexibility in the way in which funds are given and in the way in which they are spent. Funds may be given in installments (steps 78 and 80), specified towards certain general expenditures or categories of expenditures (steps 82 and 84), or given with the requirement of other custom stipulations (steps 86 and 88). The gift giver can be notified of the gift(s) or service(s) purchased with their contribution to the General Fund account (step 90). As soon as the gift giver decides upon a cash gift, the guest will pay that amount in accordance with their stipulations to the General Fund account using checks, a credit card, or a debit card with the exact date of payment determined by the gift giver (step 90). The payment method may be any currently in use for Internet-based commerce as well as any new payment methods developed for Internet-based commerce. The event organizer's account will be credited with the gift giver's payment on the payment date specified by the gift giver.

Figure 8:
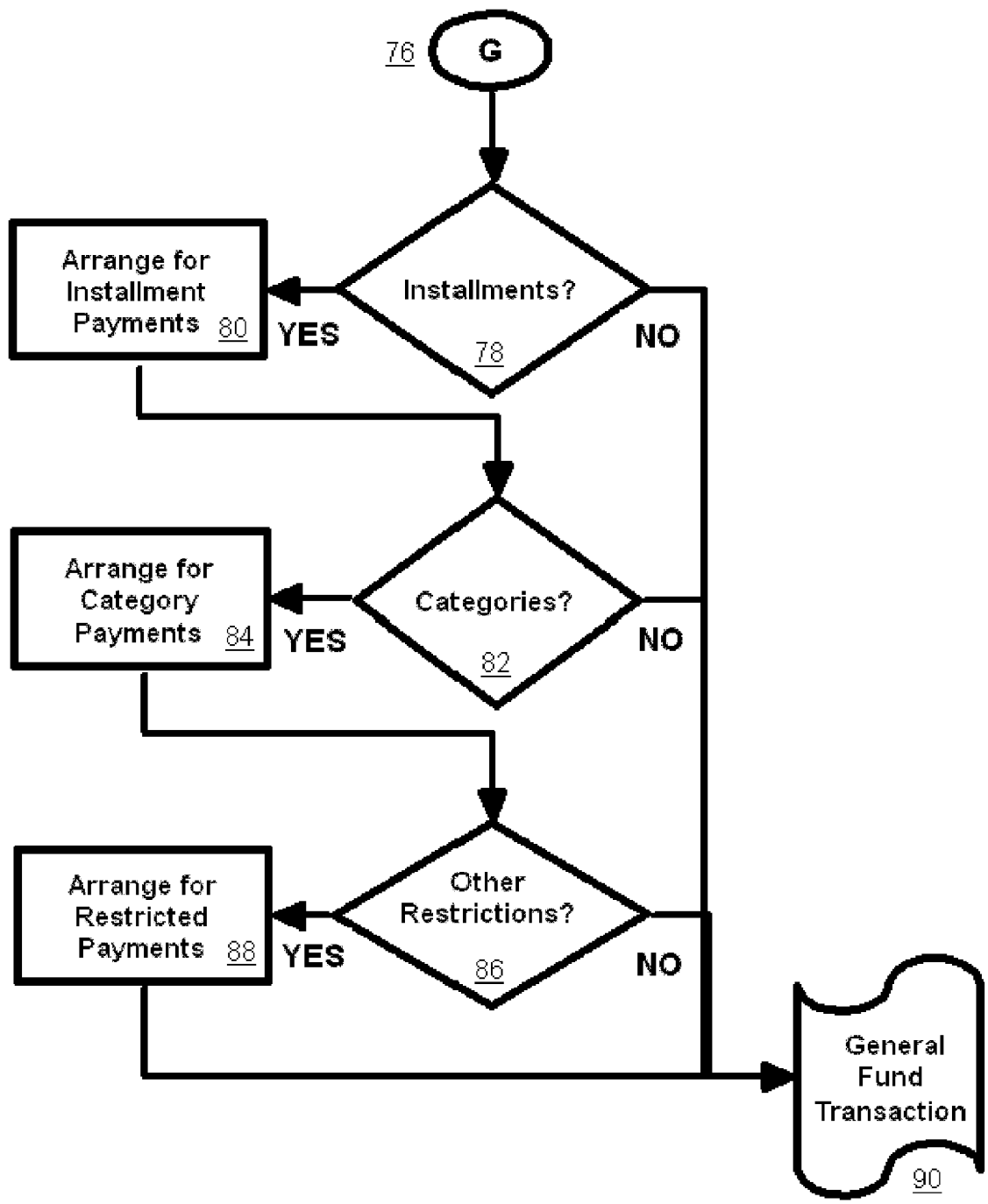
FIG. 8 is a flow chart of the options available to a gift giver who submits a cash gift to the interactive registry system in accordance with the invention.

FIG. 8 is a flow chart describing how a gift giver may select a non-listed item in the interactive registry system in accordance with the invention, i.e., an item which is not on the list presented to the gift giver (from step 74-oval F in FIG. 5).

The interactive registry system, as described in FIG. 7, is also designed to enable the gift giver to choose to give an unlisted gift to the event organizer (steps 73 and 74) (i.e., a gift which the event organizer has not listed). In this case, the guest may browse the product categories of the registry system, i.e., product categories at the cybermediary's website (step 20), and use the registry's comparative-shopping and directory-listing processes (steps 22, 92, 94, 96, 98 and 100) in choosing the gifts, but the actual price of the items in question will be blocked from view. Only the suggested retail prices of such items will be posted. The Reverse Registry will automatically block or warn the guest against purchases that overlap with previously bought gifts on the couple's wish list (step 96). If a guest decides upon an item for purchase, the process would follow the same steps as set forth above.

Behind the scenes, out of view of the guests, the product listings for each item are available for browsing at any time by the wedding couple (step 46-FIG. 4). The wedding couple and/or event organizer has the choice of making very specific product decisions themselves or letting the registry find them the best price for each consumer item. As long as the wish list item in question has not yet been purchased by a guest, the couple may also alter the parameters of any gift listed. The couple may search for non-"wish list" gift registry related items using the registry as well. They may search for and purchase any product or service that relates to weddings in any way. This includes hall rental, musicians, mortgages, travel arrangements for the honeymoon, etc. They may also share this information, on a limited basis, with other couples in their area in order to share expenses.

After all the gift givers have paid for their gifts by transferring funds into the General Fund account, the couple's registry account will have been credited with commissions from several guest purchases and/or cash gifts from certain guests. The couple can then decide to use these funds to buy further items through the registry or, after all obligations to pay for gifts and services have been met, withdraw the funds for use towards non-registry expenses. However, if funds were given to the couple by a guest and stipulated for use towards certain tangible ends that could easily and logically be obtained through the registry, such as a home stereo or toaster, then the couple would be required to spend the designated funds on the designated item through the registry. Incentives for spending the funds using the registry system could be offered. General, non-specific stipulations of the gift giver may be left to the good faith of the event organizer.

The event organizer may continue to use the registry for continued event related items such as wedding-related purchases or for general requirements for as long as required or as long as the General Fund account holds a positive numeric monetary value.

There are numerous advantages of the interactive registry system described above, for all of the parties involved.

With respect to value for the vendors, the registry business process will be useful for vendors by specifically linking them with interested and willing customers. This saves vendors time and money in other operational areas, such as traditional advertising.

The registry described above also saves vendors time, money and frustration in contract negotiations, particularly for services-related vendors. A pre-arranged contract and its clauses can be arranged for any wedding services-supplier, such as a musician or a rented hall, such that these additional clauses do not have to be renegotiated or explained to each new client. A standard contract and arrangement will apply for each client solicited through the registry.

The registry's website also effectively acts as advertising for these vendors within their niche product area. Advertising has traditionally been an expensive and problematic area of operations for most wedding vendors because of the lack of any centralized wedding-related directory. The registry system solves many of wedding vendors' most common problems, e.g., how to easily and inexpensively find new customers, how to easily and inexpensively promote the products or services in question, and how to easily and inexpensively promote the products or services and find new customers in new markets Through the registry system in accordance with the invention, vendors compete through various means for the couple's business. If a vendor were to receive an order through the registry, they would then be required to pay a pre-negotiated percentage-based commission on any revenues they acquire to the cybermediary. If they receive no additional sales, they pay no commissions. Any lessening of profit margins that may result from revenues gained through the registry auction or price-shopping systems and commissions will be offset by increased volume of sales. Furthermore, the registry will allow small local vendors national exposure which will help them attract couples outside the immediate geographical area who may be attracted to unique services, high levels of service or low pricing.

Vendors also have the assurance that they will be paid in full and on time, since each purchase through the registry can only take place with the appropriate funds available through the cybermediary. Vendors are thereby likely to encounter fewer payroll, legal or banking problems and fewer returns.

With respect to value for the couples, the registry offers value for couples by providing them with virtually unlimited product and vendor selection and several methods of comparative shopping, whether by price or other factors.

The process also gives the couples as much or as little involvement in the specifics of gift-selection as possible. Couples can choose to specify exact makes and models and oversee each purchase personally, or they can choose broad categories and have the registry's comparative system determine the best options from within those categories.

The registry also offers a centralized source for researching product and vendor-related information, including feedback and comments from earlier couples. This information and the product listings generated by the registry are independent and are not in partnership with the cybermediary in any way, save for commission fees on revenues generated. The cybermediary's impartiality to its vendors is essential in maintaining the trust of couples and guests.

The registry's operation greatly simplifies and streamlines the process of wedding planning by allowing one centralized mechanism for negotiating and comparing the products or services of many vendors. Rather than deal with dozens of vendors, a couple can now deal exclusively with the registry and the cybermediary. The registry acts as an impartial wedding consultant, helping to weave all the disparate pieces of wedding planning together.

The registry's operation will make the selection of wedding service providers from far away locations much easier, thus allowing the planning of "destination weddings" to be less time consuming and less costly to the couple.

The registry's operation will facilitate price comparison information. Pricing information regarding wedding gifts and services, currently difficult to obtain, will be made more transparent by the operation of the registry.

Couples also receive financial incentives for using the registry, not only by finding the lowest price on any given item, but also in commissions on goods purchased through the registry by guests. Couples therefore have the most to gain by using the cybermediary.

With respect to value for the guests, the registry offers value to guests by providing them with the maximum flexibility in gift giving. Guests can literally give anything they desire through the registry, including, but not limited to, an item on the couple's existing wish-list.

Guests can be assured through the registry process that there will be no duplicate gift giving in any category. Guests can choose to give monetary donations if they desire, or stipulated monetary donations targeted towards specific purchases, or even anonymous donations.

Other elements of the interactive registry system may or may not be subject to the same type of auction process or bot comparative-shopping process described above. The registry system may be used for any client (couple and guest)—vendor/retailer exchange in the realm of weddings, and as such the specific process of intermediation or 'Cybermediation' between parties may change as is most relevant for the service or product in question.

The auction or comparative shopping model might be the most appropriate method for negotiating between several vendors for common wedding gifts like blenders or toasters, especially if the model number and make are specified by the couple. However, the open-ended nature of the registry system allows for the guests to give unspecified items or pure cash gifts, and the registry system model can be applied to other purchases that the couple may need for their wedding aside from guest-related consumer goods. One of the unique characteristics of the registry business process is that it is not solely limited to 'gift registry' purchases as per traditional gift registries.

For example, imagine a guest chooses to give $1000.00 to the couple towards the cost of renting the wedding hall. Alternately, the couple supplies their own funds towards the hall rental. Either way, the process of seeking out a hall, comparing different options of various halls and deciding upon a hall can still be done through the registry process. However, since the process of choosing a hall is much more subjective, with many more variables involved in the decision process than simple price-shopping, the process employed by the registry to list and comparison shop between the hall options must thereby also change. Perhaps in such a case, simple, unranked directory-style listings of the different halls and their best available rental rates will be made available through the registry to the couple, and it will be at their discretion to choose between the listings, regardless of price or other variables.

The application of the interactive registry system to the services sector will provide the greatest value for couples, as services have the most discretionary pricing methods and are also the hardest to negotiate because of the many variables involved in each case. Using the interactive registry system, the terms of negotiation for the service in question will be clearly stipulated within the vendor's listing or bid, which will benefit both the vendor and the client.

No matter what the purchase, whether it is a product or a service, or who is paying for the purchase, whether it is the guest or the couple, or the method of intermediation between vendor and buyer used, whether it is auction, comparative price-shopping or a simple directory listing, the interactive registry business process will still be the method whereby the transaction between the vendor and the client (the couple and the guests) was initiated and fulfilled. The invention can thus be applied as an intermediary between any wedding-related product or service and any user or client.

In view of the foregoing, the interactive registry system in accordance with the invention provides significant advantages. The registry is both necessary and useful because it is based on the principles of flexibility, scalability, simplification, and user-based rewards. As a proposed one-stop vertical shopping source for weddings, the registry allows all parties involved in the wedding process maximum flexibility and options in the commerce-related decision-making process, whether it is the couple deciding upon the gifts to be given or services solicited, the guests giving the gifts, or the vendors deciding their terms of service or consumer sales. Guests can give monetary gifts through the registry, for example, for the first time. It also allows maximum flexibility in choosing the appropriate intermediary process between couples and vendors, whether it is an auction, directory listings or automated price-based comparative shopping.

The registry is scalable to meet the changing dynamic of each wedding party and the global wedding industry. The registry system can easily accommodate as many couples, guests, vendors and comparative shopping or listing methodologies within the registry format itself as there is a demand for. The registry can also be applied to the purchase of other wedding-related products or services not associated with a traditional wedding gift registry, such as hall rental or mortgage-shopping.

Further, the registry greatly simplifies the process of planning and negotiating the elements a wedding for all parties involved: the couples, the vendors and even the guests. Couples no longer have to hunt out each supplier in the wedding equation independently and negotiate individually with these vendors. Similarly, wedding vendors no longer have to continually solicit new couples for new business, except to the extent they have a listing through the registry. Guests can be almost guaranteed that, if they use the registry, no matter what product or service they buy for the couple, it is not duplicated by another guest.

Yet another advantage provided by the registry is that it offers tangible economic rewards, potentially to all users. The couple receives monetary commissions on all gifts purchased through the registry, as well as the benefit of the lowest price on any item purchased. The vendor increases its volume of business and is also able to stipulate the terms of his or her own sale as per the going market rate in that sector. The guest is never charged more than the going retail rate in the wedding registry business for any consumer item, and could conceivably be charged less.

The interactive registry system described above differs from existing registry, systems, e.g., the traditional bridal registry system described above, in that it is essentially the reverse of the traditional registry process. The traditional wedding registry is vendor-based: one vendor's modus operandi serves as the central wedding source and process for all guests and the couple. The registry system in accordance with the invention inverts that relationship such that the couple's desires, via the cybermediary, serves as the central driver and source for all guests and vendors.

As a result, the registry gives tangible economic benefits back to the couple. A traditional wedding registry funnels all economic surplus back to the vendor.

In light of the reversal of the traditional registry process, the registry in accordance with the invention allows multiple vendors to compete for each couple or purchase. A traditional registry has couples and guests vying for the products or services of one vendor.

Furthermore, the registry in accordance with the invention allows for total scalability. The traditional wedding registry is limited by the capacity and abilities of a single vendor. The registry in accordance with the invention can also be applied to traditionally non-registry related purchases, such as mortgages or wedding hall rental. A traditional registry cannot.

It is recognized that the Internet is currently used in bridal registries. Indeed, there are several online bridal registries and bridal service groups operating in the domain of e-commerce. Some of the most major examples include (some are listed by their websites):

WeddingChannel.com
The Knot.com
Wedding411.com
ModernBride.com
1800Wedding.com

However, none of the existing sites are attempting to create an interactive, reverse bridal registry system as described above.

WeddingChannel.com, theKnot.com, and ModernBride.com serve essentially as traditional gift, registries that function through strategic partnerships with specific wedding vendors. They do not comparative price-shop or offer vender-impartial listings. As in a traditional registry system, all economic benefits are retained by the vendors themselves. They are neither flexible nor scaleable.

Wedding411.com attempts to provide vendor listings to couples, but operates through existing database listings rather than the constantly refreshed listings generated by a comparative shopper or auction process. These listings are also product or service-specific, and Wedding411.com does not attempt any level of cybermediation or economic rewards system. Essentially, the online registry process is not scaleable and does not attempt the same process of cybermediation.

1800Wedding.com attempts a similar limited process of cybermediation, but does not utilize the same flexibility of listings, vendor-solicitation or couple-based user rewards. Essentially, their online registry process is not scaleable and reflects traditional vendor-based processes.

A primary difference between other online registry processes and the invention lies in the scaleable economics of the business process itself The invention generates a commission for its operator, in this case the cybermediary, through vendor-purchaser intermediation that can be effected through any number of means: through auction, through comparative price-shopping or through directory-style listings, or other as-yet unknown comparative listings methods. The registry system in accordance with the invention also channels commissions back to the user, e.g. the couple, though its use.

By contrast, traditional bridal registries generate revenue through partnerships with a limited number of vendors and through advertising from a limited number of vendors. That renders them biased and partial, whereas the cybermediary used in accordance with the invention will list vendors as an impartial intermediary, possibly for free.

Essentially, traditional registries are vendor-based and not couple or user-based in their economic structure. They are also not scaleable beyond the gift giving element of weddings. The invention is a scalable business process that is flexible, customizable and user-driven.

It is recognized that selected industries use Internet-based intermediation between vendors and users that is commission-based rather than vendor-partnership or advertising-based. An existing example of such a system can be found in non-wedding related industries such as construction with the website ImproveNet.com. However, this process has yet to be applied to the complex and highly fragmented wedding-industry marketplace. As well, the commission-based revenue model is not what makes the business process novel and unique. It is only one facet of the registry system in accordance with the invention.

The registry in accordance with the invention is thus novel and unique through its unique application of several existing business processes into the wedding marketplace and its inversion of the traditional wedding registry business process.

Among other important aspects, the registry system in accordance with the invention is couple or user-based in its methodology. A traditional registry is vendor-based. This user-based functionality has never been attempted in the wedding marketplace before.

The registry system in accordance with the invention is based on the principle of vender-impartial listings that are meant to most benefit the couple, or user. A traditional registry cannot be vendor-impartial.

The registry system in accordance with the invention generates scaleable monetary commissions, or user-based rewards, for its users. This user-based reward system has never been attempted in the wedding marketplace before.

The registry system in accordance with the invention allows for monetary contributions by guests for later gift-purchase by the user. This is an inversion of the traditional registry process, whereby the guests are only allowed to purchase gifts already stipulated by the user.

The registry system in accordance with the invention is dynamic and constantly updateable. Its listings are generated 'on the fly' using either a bot for comparative shopping or listings or an auction process. This type of dynamic and updateable listing has never been attempted in the wedding marketplace before.

The registry system in accordance with the invention is scaleable and flexible. It can be applied outside the sphere of the traditional registry, towards purchases of other wedding-related products or services. Also, it can encompass virtually unlimited numbers of gifts, vendors, or products and can accommodate virtually unlimited numbers of couples, vendors or guests. This type of scalability and flexibility has never been attempted in the wedding marketplace before.

Finally, the registry system in accordance with the invention is customizable and reflects the preferences of the user. Items available for purchase by the guests or the types of products listed through the registry are solely based on the user's wishes. A traditional registry reflects primarily the preferences of the vendor.

Reference is made above to a General Fund account (steps 50, 62, 72, 90 and 100). The creation of a General Fund account can be used for applications other than in conjunction with the organization of the receipt of monetary gifts and payment for services for a wedding.

As described above, the financing system in accordance with the invention allows event planners, in general, and brides and grooms, in particular, to focus on the event planning process without becoming intimately involved in the mechanics of collecting cash gifts and paying vendors. In addition, the financing system allows for new forms of revenue generating products and services, such as advertising and broadcast rights, to help finance such events. Using the financing system, these additional sources of revenue are integrated seamlessly into the event planning process.

However, the financing system can be used is a much broader manner in the planning of an event, including events in which gifts are not usually given by guests. Using the financing system in accordance with the invention, it is possible to simplify the event planning by providing an intermediary with predetermined objectives and functions between service and good providers and the event organizer.

Generally, the financing system in accordance with the invention transforms the financial aspects of the event or party planning process by creating an on-line clearinghouse linking event organizers (corporate event planners, brides and grooms), gift givers (guests, employers), and vendors (financial institutions, advertisers and service vendors) through a novel on-line marketplace concept that offers unique benefits and incentives to all involved parties. Essentially, the financing system allows for a wide range of financial flexibility for event organizers, allows a greater diversity of giving options for gift givers, and opens novel advertising venues for vendors.

Figure 9:
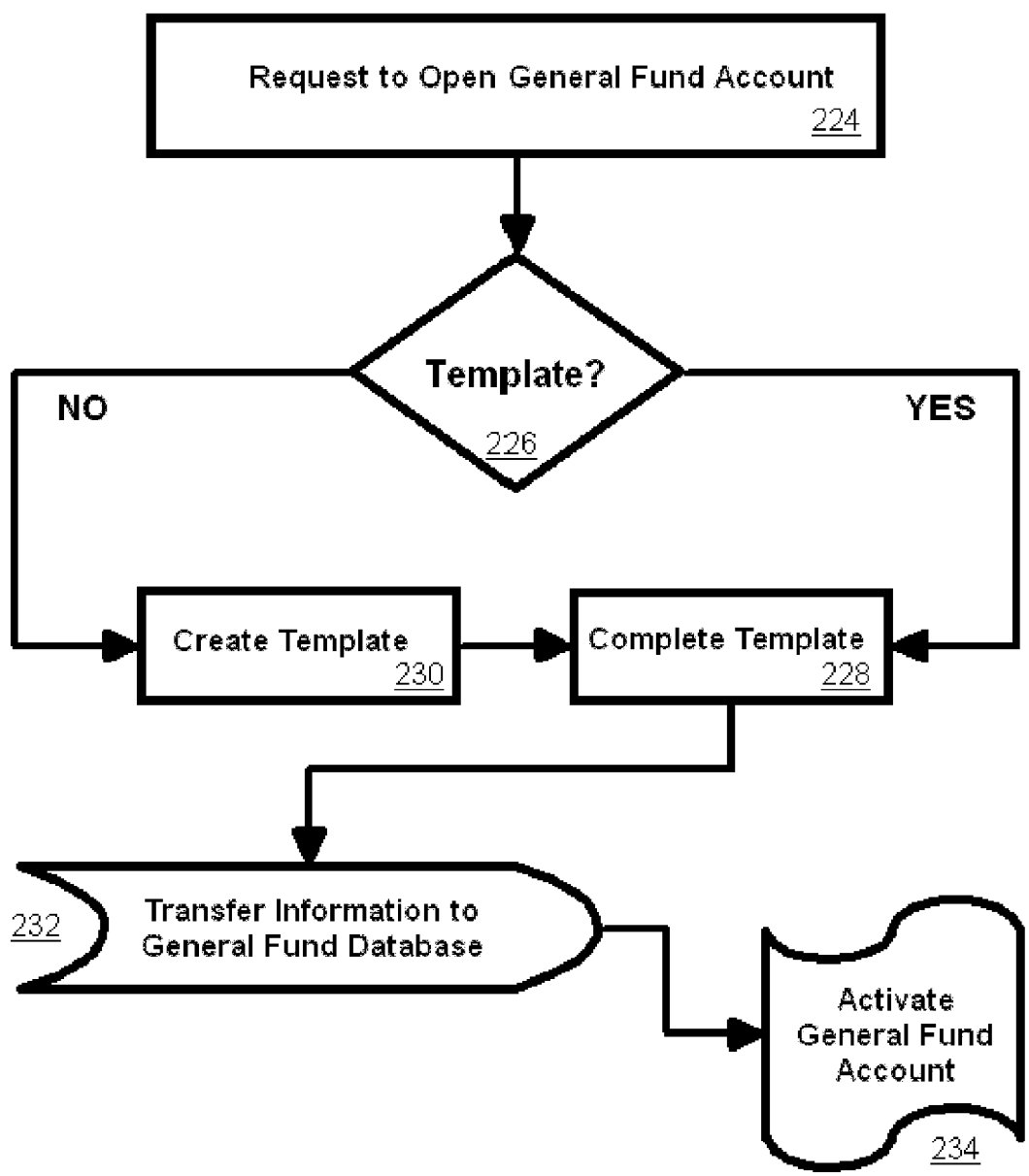
FIG. 9 is a flow chart of the manner in which the General Fund, a database of event-related incomes and expenditures, is created in a financing system in accordance with the invention.

Referring to the accompanying FIGS. 9-13 wherein like reference numerals refer to the same or similar elements, FIG. 9 shows a flow chart of the manner in which the General Fund, a database of event-related income, cash gifts and expenditures, is created in accordance with the invention.

Initially, event organizers (couples) will visit the cybermediary (a website), sometimes referred to herein as the "WWWed" website for the purpose of opening a general fund account (step 224). The site will allow planners a choice (step 226) of selecting and modifying and completing a pre-existing template (step 228) consisting of common choices for the general fund, or, alternatively creating a completely new template (step 230). The new template will describe the types of cash gifts and payment options that the event planner will accept as well as preferred and desired income options elected by the event planner. A display of existing potential categories of options will be listed. These categories include, but are not limited to acceptable types of cash gifts, vendors who will be given guaranteed payments from the general fund, types of advertising and broadcast rights options, as well as corporate gifts and corporate matching funds, if available. The information, once completed, will be transferred to the general fund database (step 232). The general fund account will then be available to collect gifts, savings and income as well as to pay expenses (step 234) at that point in time.

Figure 10:
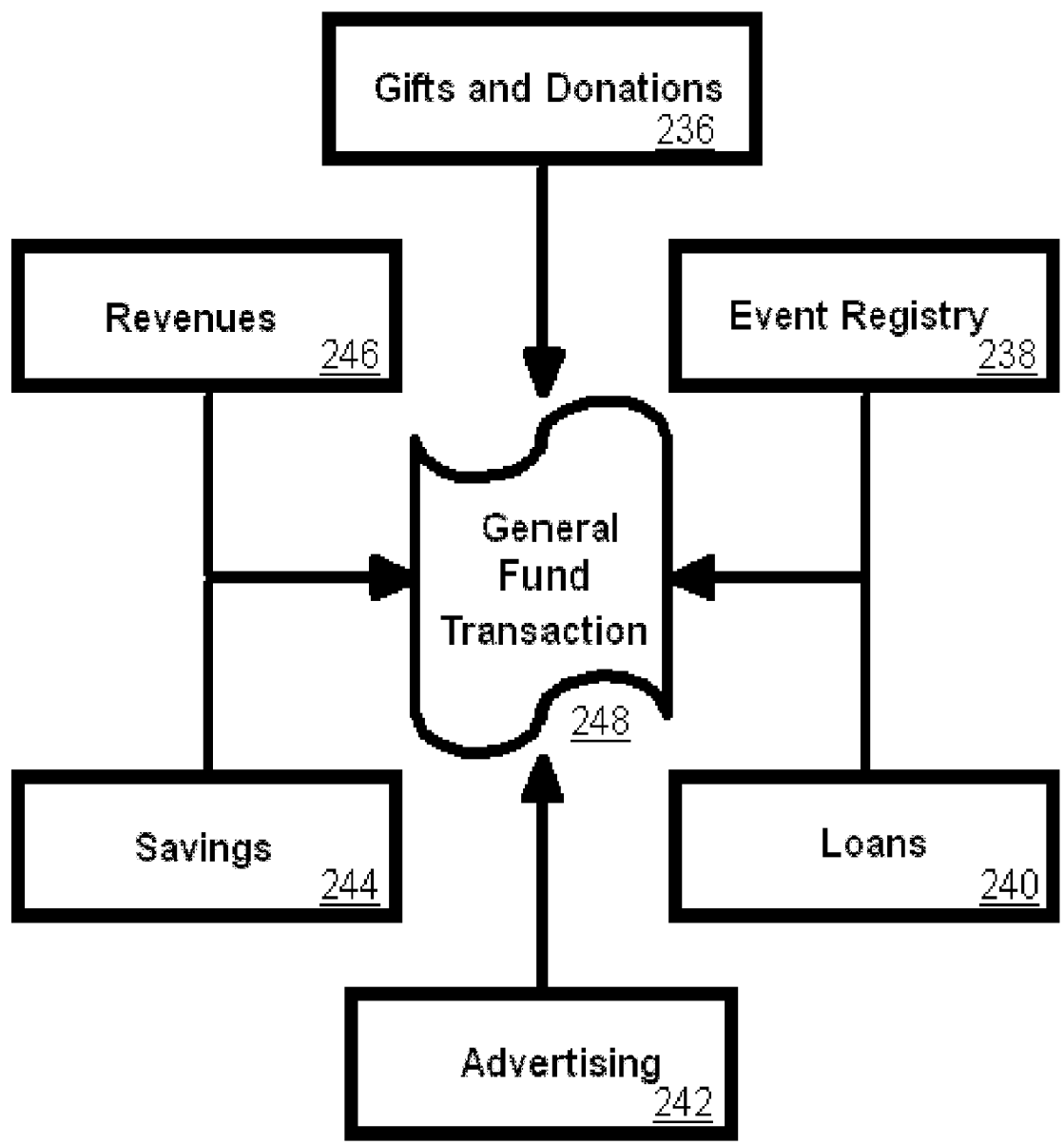
FIG. 10 is a flow chart of the manner in which income is accrued to the General Fund created in the financing system in accordance with the invention.

FIG. 10 shows a flow chart of the manner in which income is accrued to the financing system in accordance with the invention. Income from multiple sources such as gifts and donations (step 236), an event registry (step 238), loans (step 240), advertising revenue (step 242), personal savings (step 244) and other forms of event-related revenues such as from the sale of broadcast rights to the event (step 246) are collected and processed by the general fund (step 248). The event registry may be as described above with reference to FIGS. 3-8.

Figure 11:
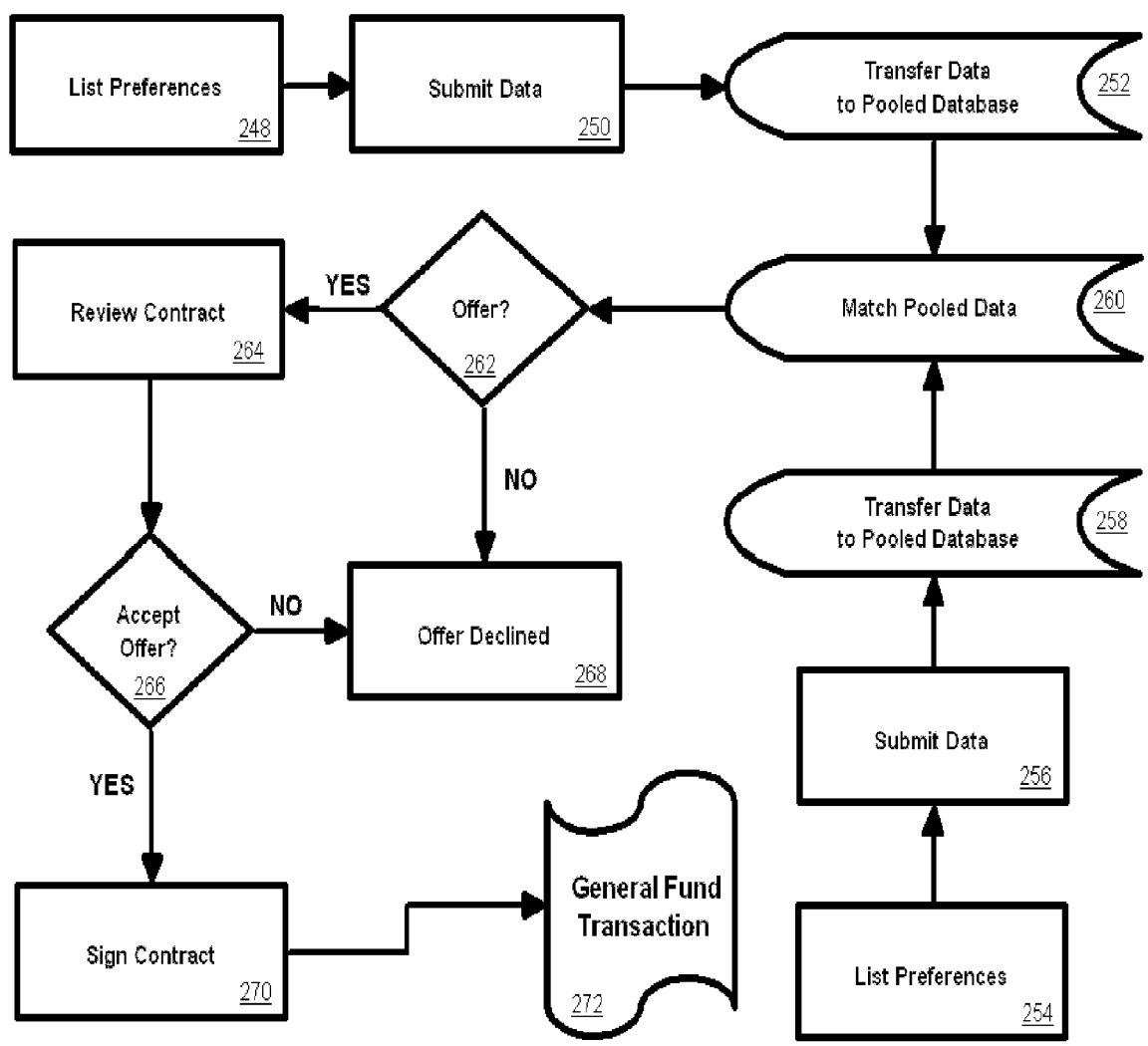
FIG. 11 is a flow chart of the manner in which the financing system in accordance with the invention matches advertisers with targeted event organizers.

FIG. 11 shows a flow chart of the manner in which the financing system matches advertisers (or other service providers) with targeted event organizers in accordance with the invention. The event organizer lists her preferences with regard to the amount and type of advertising that is acceptable at a particular event (step 248). The event organizer also preferably submits data concerning the guests, e.g., the demographic makeup of her guests (step 250). This information is then transferred to a database (step 252). The advertiser (or other service provider) also submits a list of preferences (step 254) and target demographics (step 256) to a common database (step 258). The information from both the advertiser (or service provider) and the event organizer is then pooled and matched in a central database (step 260). If a match is found the advertiser may prepare a contract (step 262) to present to the event organizer (step 264) to accept (step 266) and sign (step 270). Both the advertiser as well as the event organizer may decline (step 268) prior to signing of the contract. The contract may be a standard form contract used by the financing system. Once the contract is signed the general fund (step 272) is set to collect income from the fees generated by advertising, broadcast rights or other services.

Figure 12:
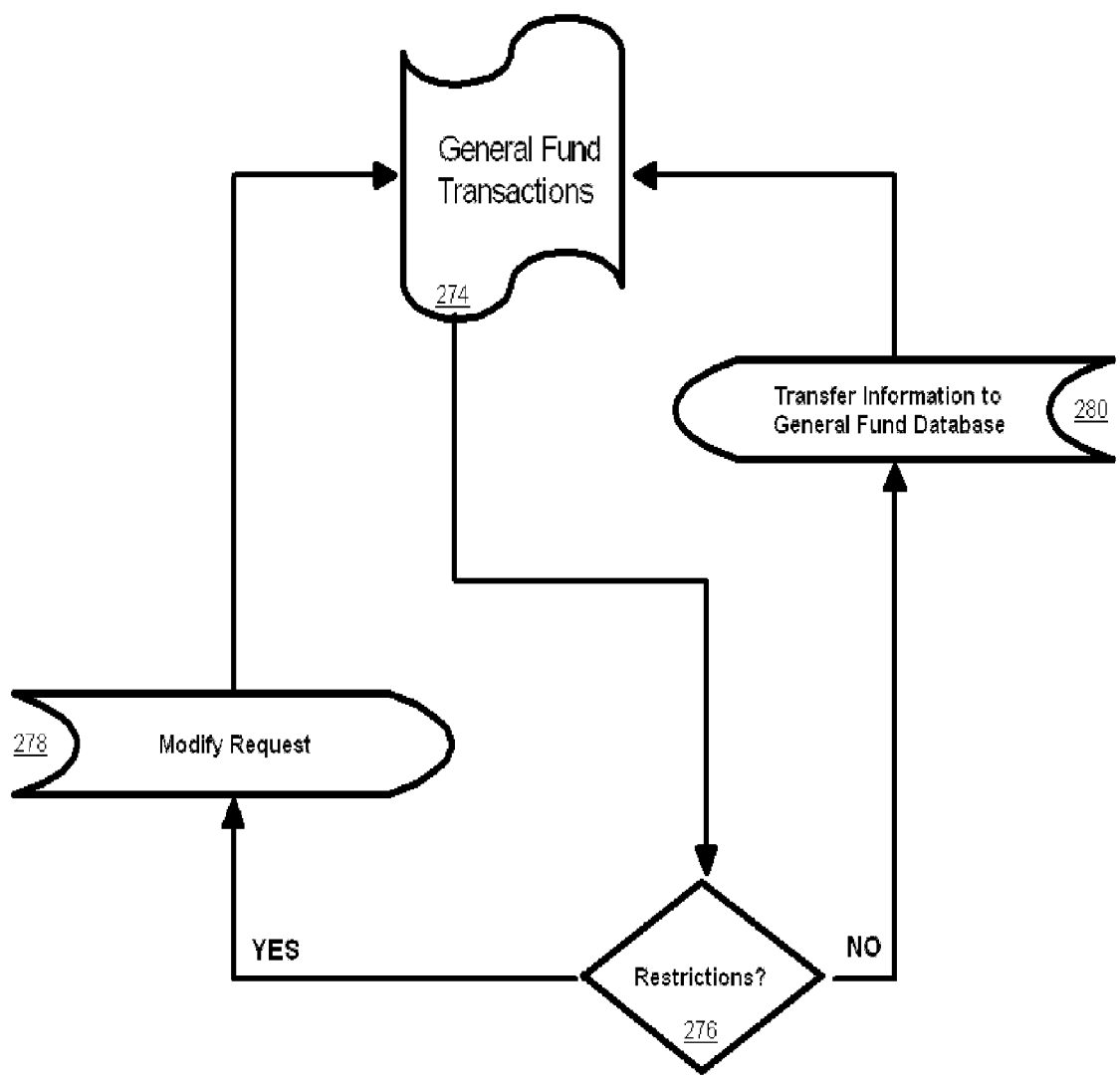
FIG. 12 is a flow chart displaying the manner in which an event organizer submits payment requests to the General Fund in accordance with the invention.

FIG. 12 shows a flow chart displaying the manner in which an event organizer submits payment requests to the general fund account in accordance with the invention. When the event organizer or other approved agent requests payment from the general fund account (step 274), the payment request is first screened for possible restrictions (step 276). If restrictions have been set up for a particular account, then the general fund will request the event organizer to modify the request to meet restriction requirements (step 278). If no restrictions have been set up or if the restrictions have been met for a particular request, then the request is passed to the general fund database (step 278) and payments will be processed for event-related expenses (steps 280 and 274), such as payments for services, loans, or other event-related expenses. The event organizer may continue to use the general fund for financial management as long as the general fund account holds a positive numeric monetary value.

Figure 13:
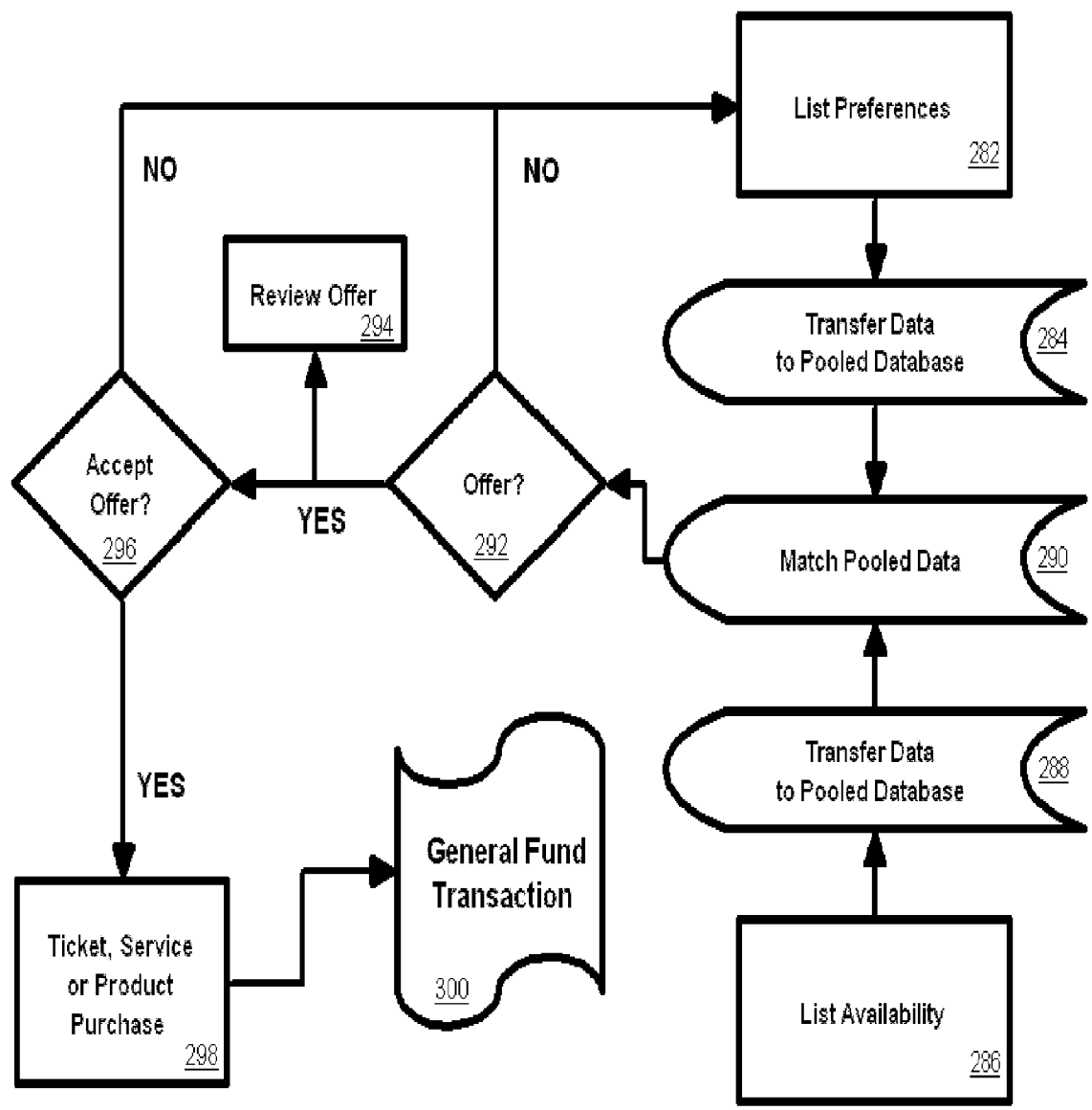
FIG. 13 is a flow chart displaying the manner in which the financing system matches buyers of event related tickets, services and supplies with providers of event related tickets, services and supplies in accordance with the invention.

FIG. 13 shows a flow chart displaying the manner in which the buyers of event-related tickets, services and supplies are matched with providers of event-related tickets, services and supplies in accordance with the invention. The buyer lists preferences such as the desired date, time, acceptable price range and type of event (step 282). This information is then transferred to a database (step 284). The provider also submits data concerning the availability of tickets, services or supplies with regard to date, time and location (steps 286 and 288). The information submitted in steps 284 and 288 is then pooled in a common database for comparison and matching (step 290). If a match between the buyer and provider is not found (step 292), the buyer is allowed to revise the list of preferences in order to get a match (step 282). The provider may revise their submitted data at any time prior to acceptance of a contract based on proffered tickets, services or supplies. If a match between the buyer and provider is found (step 292) an offer is presented to the buyer to review (step 294). If the buyer declines the offer, the buyer is allowed to revise her list of preferences (step 282). If the buyer accepts the offer (step 296), payment is made (steps 298 and 300). All payments are processed by means of the administration of the general fund account (step 300).

The financing system utilizing a General Fund account offers unlimited options to all parties: the event organizer, the guests, and the vendors. The invention will allow WWWed to function as a 'cybermediary' between all parties, providing convenient access to all bills as well as new sources of income for the event organizer, an efficient means of giving cash gifts and payments to guests, and guaranteed payment options for vendors. More specifically, event organizers will benefit from access to all event related bills and services in one convenient location. Guests will benefit from the expanded options and convenience when giving cash gifts.

Vendors will benefit from increased confidence that bills will be paid in a timely fashion. Furthermore, another advantage is that the invention is scaleable such that it can encompass new processes and potentialities. Such options include new methods for developing event related income, new sources of event related financing as well as the permission marketing related benefits that become available to extend the life and usability of the financing system to other post-event financing such as mortgages and home loans. All are described below.

The financing system thus would fulfill a specific need existing in the current wedding marketplace in a new and non-obvious way. The current wedding marketplace is highly fragmented. It is also often a very geographically regionalized marketplace. Many industries also converge during the wedding process. For example, such industries as reception venues, florists, photography, musicians, transportation, printers and designers, jewelry, travel, hospitality, clothing, and more are all relevant to this space. This fragmentation by industry, vendor, region and a host of other factors creates a major headache for the negotiation and payment procedures that are involved in coordinating such a complicated endeavor. It also creates problems for vendors who must negotiate, service and bill multiple parties. The General Fund is an invention with the express purpose to simplify this complex process for all involved parties.

Use of the financing system will also provide new income sources to couples, such as selling advertising and broadcast rights to their wedding. This provides brides and grooms with additional sources of income to pay for their wedding.

For advertisers, this provides a new and convenient means of access to a much sought after demographic group—newlyweds, their friends and their family. Newlyweds between 20-40 account for a great deal of purchasing power before, during and after their wedding. This group accounts for a significant share of purchases, for example of new furniture and housing. Certainly advertisers would jump at the chance to reach this market.

For vendors, the financing system provides for direct payment to the vendors on behalf of interested and willing customers. This saves vendors time and money in other operational areas, such as delayed payments and bill collection procedures. The financing system also saves vendors time, money and frustration in contract negotiations, particularly for services-related vendors. A pre-arranged contract and its clauses can be arranged for any event service supplier, such as a musician or a rented hall, such that these additional clauses do not have to be renegotiated or explained to each new client. A standard contract and arrangement will apply for each client solicited through the existence of the financing system, e.g., through registrants at the website. The website also effectively acts as a means for financial institutions to gain the trust of a demographic group that can be expected to yield a large lifetime value to the institution as well as providing advertising for these institutions within their niche product area. Through the financing system and its associated website and operation in connection with events, advertisers gain access to an easy, economical and effective means of reaching a demographically desirable population such as newly married couples, their friends and families. This is all done with the expressed permission of the event organizers (brides and grooms). Advertising has traditionally been an expensive and problematic area of operations for most wedding vendors because of the lack of any centralized wedding-related directory. The financing system solves many of wedding vendors' most common problems, namely, how to easily and inexpensively find new customers, how to easily and inexpensively promote the products or services in question; and how to easily and inexpensively promote the products or services and find new customers in new markets As to providing value to the event organizer or the couple in the event of their wedding, the financing system offers value for couples by providing them with a central account that effortlessly coordinates and reconciles all event related cash gifts, income, expenses and finance vehicles such as loans. This saves countless hours and reduces potential event related stress since the event organizer (couple) will have a clear and concise picture of event related finances at all times. The implementation of the financing system also offers a centralized source for researching account status and practicing "what if" scenarios with their event and post event financing. The event financing process greatly simplifies and streamlines the process of event planning by allowing one centralized mechanism for negotiating contracts and paying for the products or services of many vendors. Rather than deal with dozens of vendors, a couple can now deal solely with the website created in accordance with the financing system of the invention. The administration of the financing system provides for an efficient and impartial bill payment service, helping to weave all the disparate pieces of event planning together. Couples also receive financial incentives for using the financing system, by allowing new and innovative means, for example, of revenue generated by fees from the sale of event related advertising and broadcast rights.

As to providing value for guests, the implementation of the financing system offers value to guests by providing them with an easy to use and highly flexible means of providing cash gifts. Also, guests have the security of knowing that despite the potential chaos at the event there is no need to be concerned that checks or cash would be lost or misplaced since the money is transferred directly to the general fund account for the event organizer or event beneficiary. Guests can choose to give monetary donations on installments, or even anonymous donations if they so desire.

In view of the foregoing, the financing system in accordance with the invention is both necessary and useful because it is based on the principles of flexibility, scalability, simplification, and user-based rewards. As a one-stop integrated financial vehicle for all event-related gifts, income, financing and contract negotiation as well as bill payment the implementation of the financing system allows all parties maximum flexibility and options in the commerce-related decision-making process, be it the couple, the guests, or the venders. It is also scalable to meet the changing dynamic of each event and the global event industry. The financing system can easily accommodate as many event organizers (couples), guests, vendors and advertisers or other interested parties for which there is a demand. It also greatly simplifies the process of planning, negotiating and financing the elements an event such as a wedding for all parties involved: the couples, the vendors and even the guests. Couples no longer have to hunt out each supplier in the wedding equation independently and negotiate and individually pay each of these vendors separately. Use of the financing system also offers tangible economic rewards to all users. For example, the couple may receive loans which utilizes expected cash gifts as collateral. In addition, the couple receives monetary commissions for all advertising and other event related revenues generated by their event. This added income could be utilized by the couple to pay for the event or for other post-event expenses.

Figure 17:
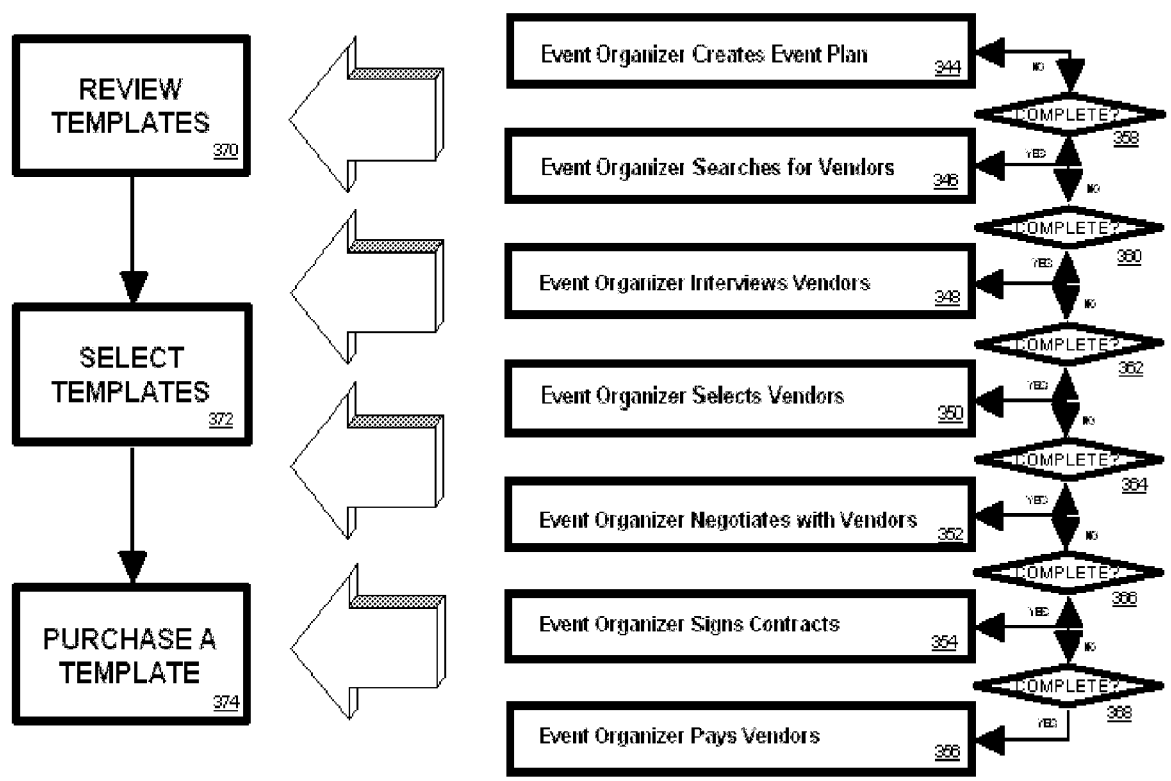
FIG. 17 is a dynamic flow chart of the manner in which the event organizer plans and organizes an event shown in parallel with a flow chart of the manner in which an event organizer plans and organizes an event utilizing the event engine, in accordance with the invention.

Further processes designed to improve the ease and efficiency of the event planning process in accordance with the invention are demonstrated in FIG. 17. Referring to the accompanying drawings wherein like reference numerals refer to the same or similar elements, FIG. 17 shows a dynamic flow chart, with feedback pathways, of the steps described in FIG. 15.

The event organizer creates an event plan (wedding) in accordance with her objectives (step 344). If the step is completed she proceeds to search for appropriate vendors (step 346). If this step is completed she proceeds to interview potential vendors (step 348). If the step is completed she proceeds to select the best vendors that meet her needs (step 350). If the step is completed she proceeds to negotiate with each vendor to arrange for performance, pricing and payment requirements (step 352). If the step is completed she proceeds to sign contract(s) with vendor(s) (step 354). If the step is completed she proceeds to pay vendor(s) (step 356). In reality, any one of the subsequent steps can send the event organizer back several steps (steps 358, 360, 362, 364, 366 and 368). For example, if an event organizer finds out during the negotiation stage with a particular vendor (step 352) that he is unable to deliver the service that she requires within a suitable time frame, quality or price, she may be required to proceed back to search for another vendor (step 346).

This pathway is similar in this regard to a biochemical system in which an enzyme pathway consists of several independent enzymes or steps. When viewed as individual steps the pathway appears to be linear. When viewed as an integrated process, however, the pathway is seen to contain complex feedback loops in which subsequent actions exert feedback control on prior actions.

For example, in the case given above, the event organizer might decide to stay with the vendor in question. Yet, in order to do so, she may have to modify her original event plan (step 344).

Seen in this light, the event engine may be viewed as a catalyst, a social catalyst. Just as enzymes lower the activation energy for chemical reactions, so too does the event engine reduces the amount of time and mental energy required to plan and create a social event. Just as an enzyme reduces the energy needed to create a chemical reaction, the event engine reduces the amount of steps necessary to create a social event from many (as indicated in FIGS. 1D, 1E and 16) to few (as shown in FIG. 17).

This is demonstrated in FIG. 17 that shows a dynamic flow chart of the manner in which the event organizer plans and organizes an event shown in parallel with a flow chart of the manner in which an event organizer plans and organizes an event utilizing the event engine, in accordance with the invention.

Figure 16:
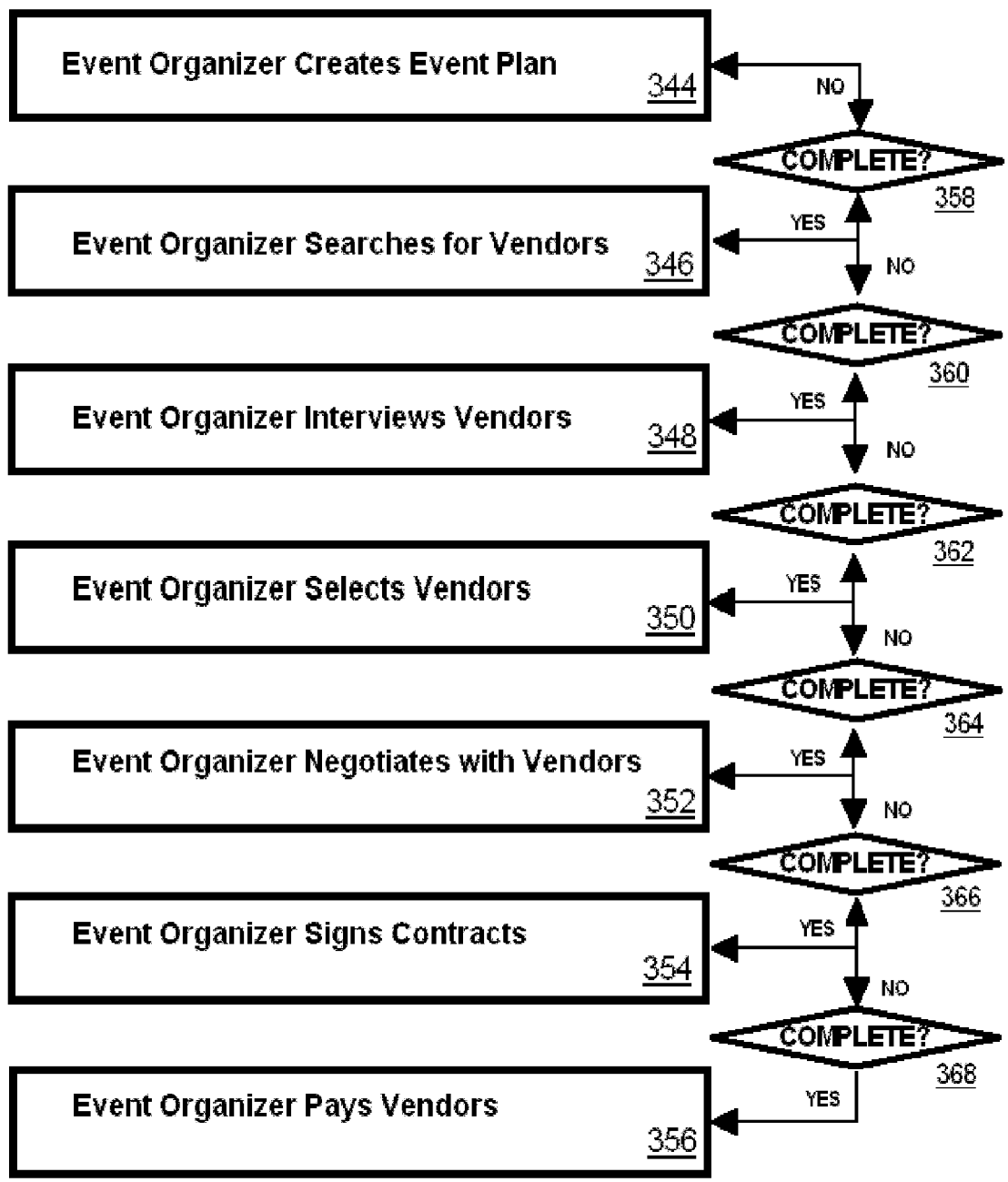
FIG. 16 is a dynamic flow chart, with feedback pathways, of the manner in which the event organizer plans and organizes an event.

In place of the complex series of interlinking steps required in the traditional event planning process described in FIG. 16, the event engine process described in FIG. 17 requires three basic steps. In the first step (step 370) the event planner searches relevant event engines. In the second step (step 372) the event planner selects an unmodified or partially modified event engine (which would typically be grouped or classified together and shown to the event organizer together). In the third step (step 374) the event planner purchases an event engine.

Figure 18:
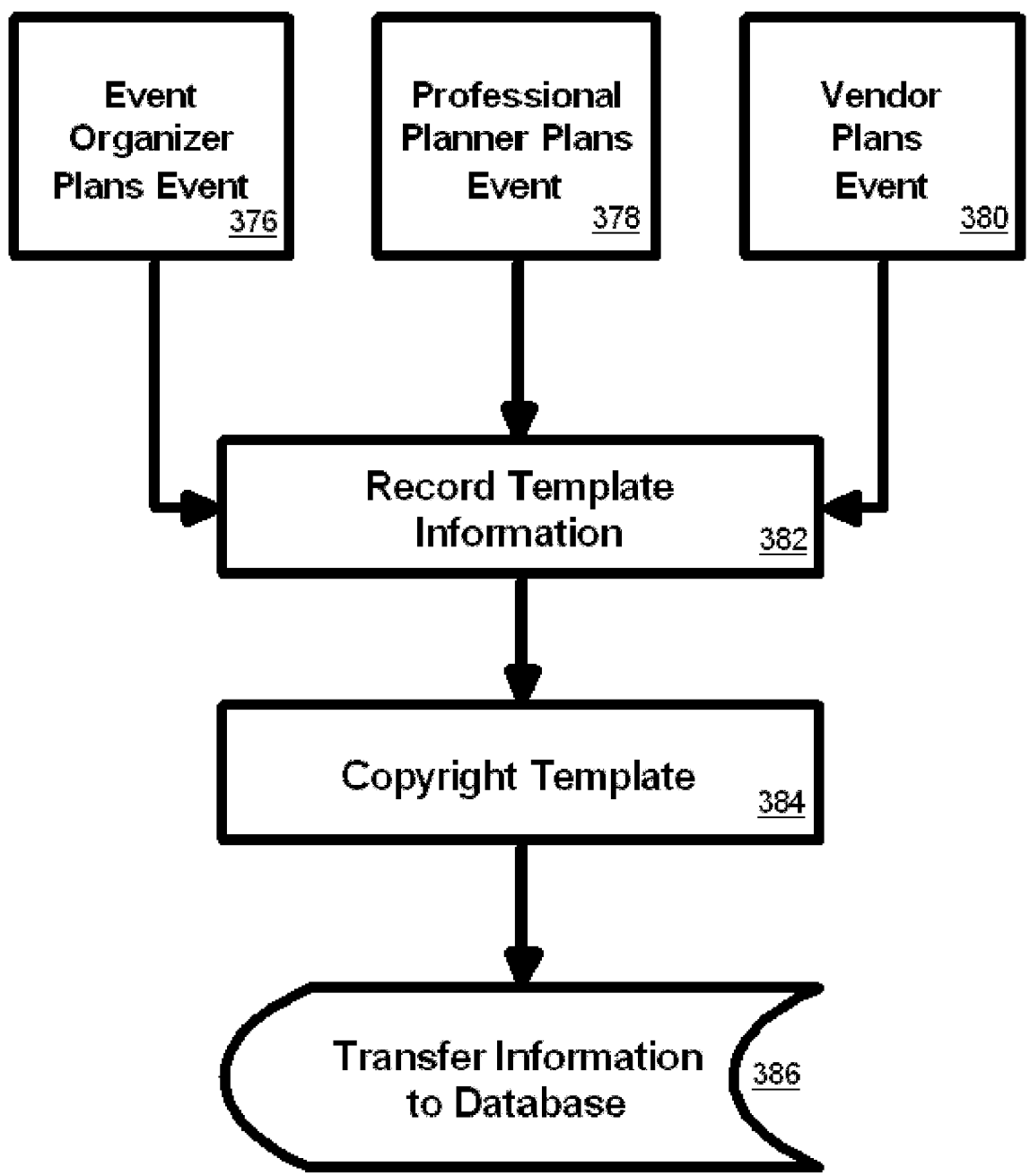
FIG. 18 is a flow chart displaying the manner in which the event organizer submits the event engine for copyrighting and storage in an online a database in accordance with the invention.

FIG. 18 shows a flow chart displaying the manner in which the event organizer submits the event engine for copyrighting and storage in an online a database in accordance with the invention. Instead of actual copyrighting, an ownership interest can be vested in the compilation of the template or event engine.

In instances when an event planner successfully plans and organizes an event (step 376), when a professional event planner successfully plans and organizes an event (step 378) or when a service provider successfully plans and organizes an event (step 380) all relevant information necessary to accurately copy the event for future use is recorded (step 382). A copyright form for the knowledge template or event engine is completed and submitted (step 384). All event engine information is sent to a central database for storage (step 386).

Figure 19:
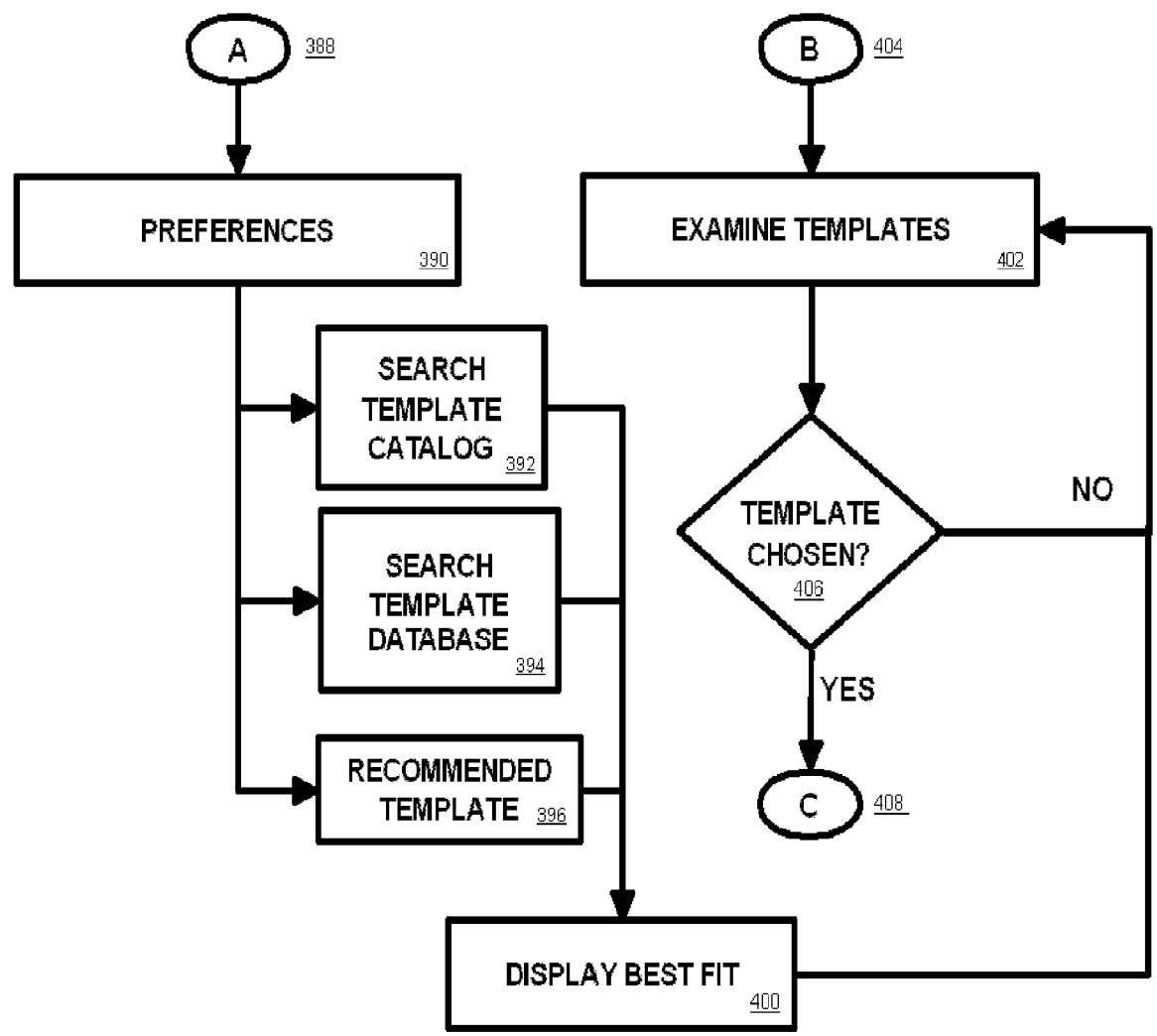
FIG. 19 is a flow chart displaying the manner in which the event organizer searches the online template database for a suitable event engine in accordance with the invention.

FIG. 19 shows a flow chart displaying the manner in which the event organizer searches the online knowledge template database for a suitable event engine or knowledge template in accordance with the invention.

An event organizer registers her preferences (steps 388 and 390) and searches an online database containing knowledge templates or event engines (step 394) that displays the best fit between her request and the available knowledge templates or event engines (step 400). The event organizer then examines the knowledge templates or event engines (step 402). Alternatively, the event organizer may search an online catalog, an email notification or printed catalog containing event engines or information templates (step 392) or request a recommended event engine or information template based on an email or other means of personal recommendation (step 396). The event organizer examines all relevant event knowledge templates produced by all sources (step 402) and picks an appropriate knowledge template or event engine (steps 406 and 408).

Figure 20:
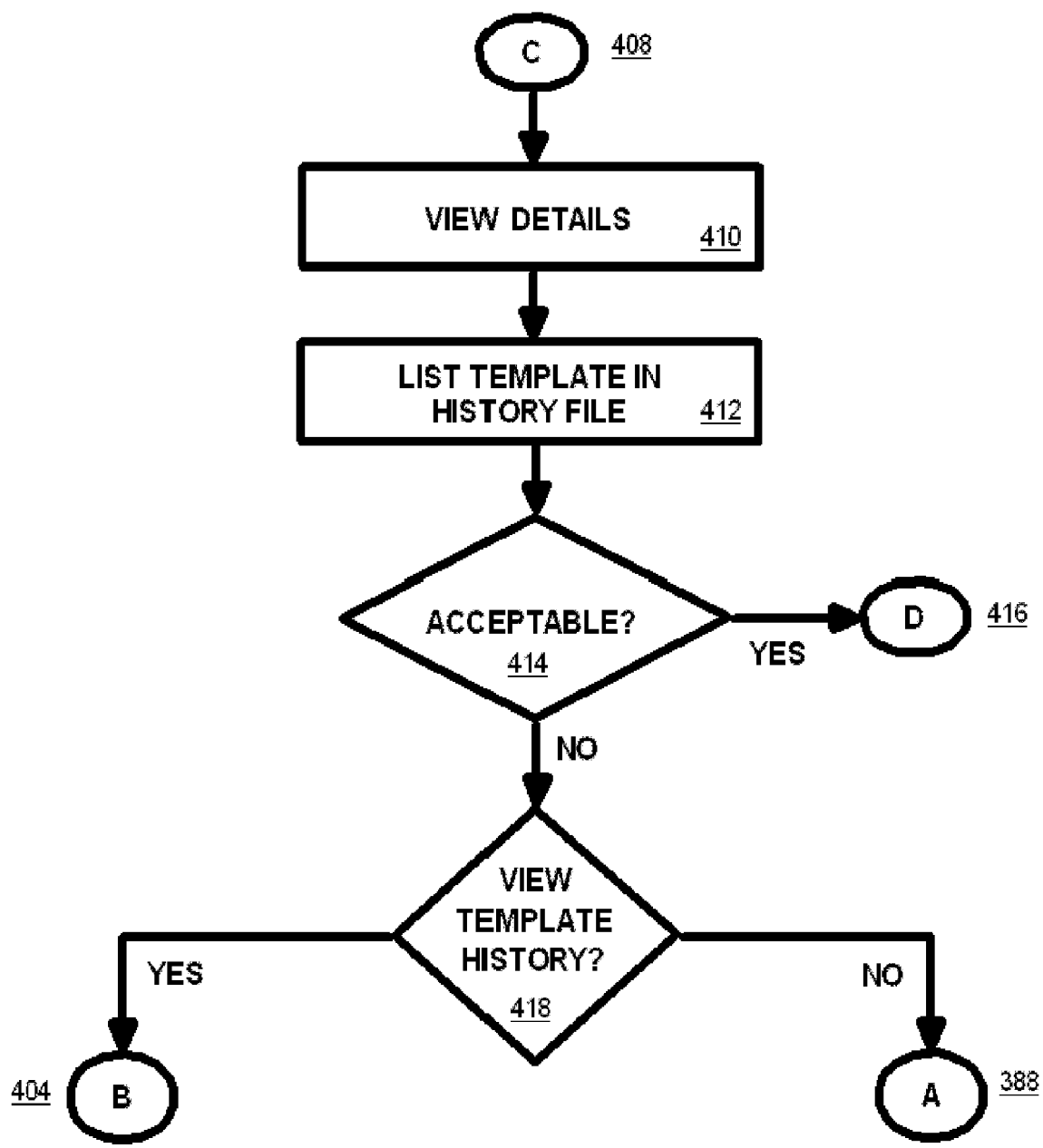
FIG. 20 is a flow chart displaying the manner in which the event organizer selects event engine(s) from the online template database and records her choice(s) in a history file in accordance with the invention.

FIG. 20 shows a flow chart displaying the manner in which the event organizer selects event engine(s) from the online template database and records her choice(s) in a history file in accordance with the invention.

After choosing a knowledge template or event engine (step 408) the event organizer then views the details of the event engine (step 410) that is stored in a personal event engine history file for later review (step 412). If the event engine does not appear to meet her needs (step 414), the event organizer proceeds to either review her personal event engine history file (step 418) or to start the process over again in the hope of finding a more appropriate Event engine (step 388). If the event engine meets her needs (steps 414 and 416) the event organizer proceeds to further steps indicated in FIG. 21 (step 416).

Figure 21:
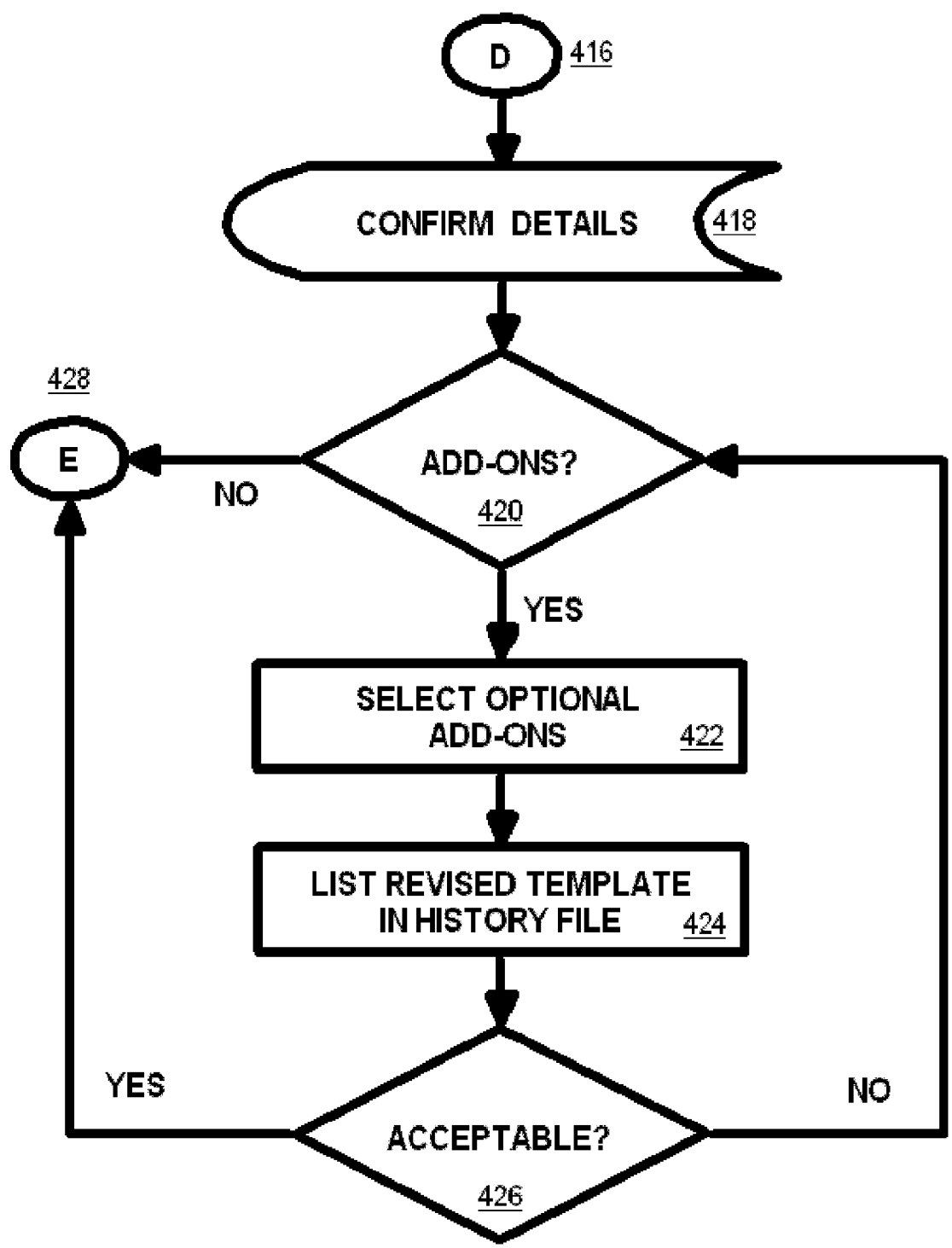
FIG. 21 is a flow chart displaying the manner in which the event organizer selects optional add-ons to her event engine(s) and confirms her template selection(s) in accordance with the invention.

FIG. 21 shows a flow chart displaying the manner in which the event organizer selects optional add-ons to her knowledge template(s) or event engine(s) previously selected (step 416) and confirms her selection(s) in accordance with the invention. The event organizer confirms the details of her selection (steps 404 and 418) and, depending on the knowledge template or event engine involved, may be offered add-ons (step 420). If no add-ons are available or if the event organizer does not require add-ons, the event organizer proceeds to payment (step 428). If add-ons are available for a particular knowledge template or event engine and if the event organizer wishes to select one or more add-ons, appropriate add-ons are selected (step 422) and stored in the personal event engine or knowledge template history file (step 424). If the resulting modified knowledge template or event engine is not acceptable, the event organizer returns to remove or add add-ons for her event engine or knowledge template (step 420). If the resulting modified event engine or knowledge template is acceptable (step 426), the event organizer proceeds to payment (step 428).

Figure 22:
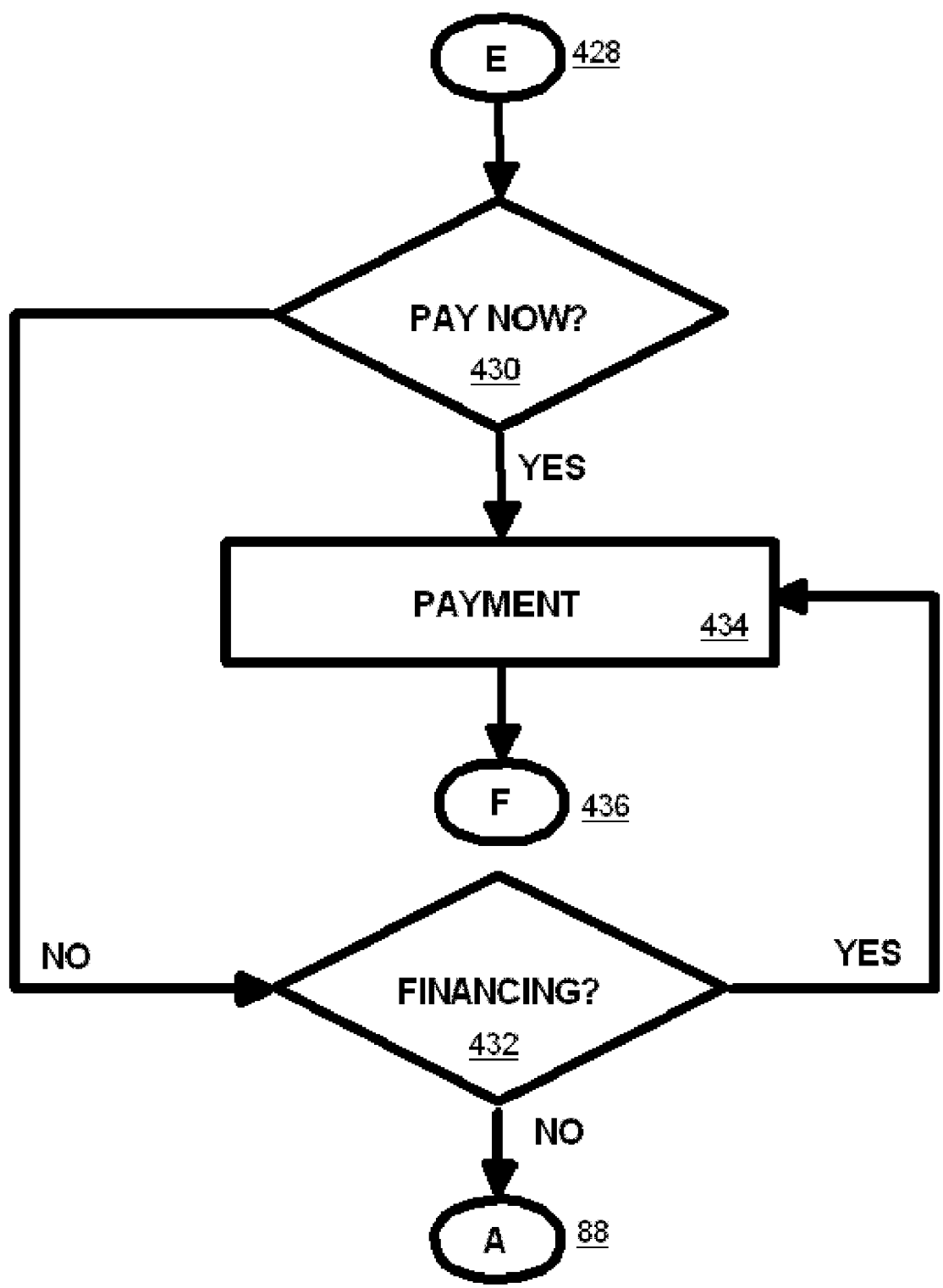
FIG. 22 is a flow chart displaying the manner in which the event organizer pays for the event engine selected in FIG. 21, in accordance with the invention.

FIG. 22 shows a flow chart displaying the manner in which the event organizer pays for the event engine selected in FIG. 21, in accordance with the invention.

The event organizer may pay immediately (steps 428, 430 and 434) or by means of deferred or credit payments (steps 432 and 434). The event organizer may also decide to return to review other event engines prior to final payment (step 388).

Figure 23:
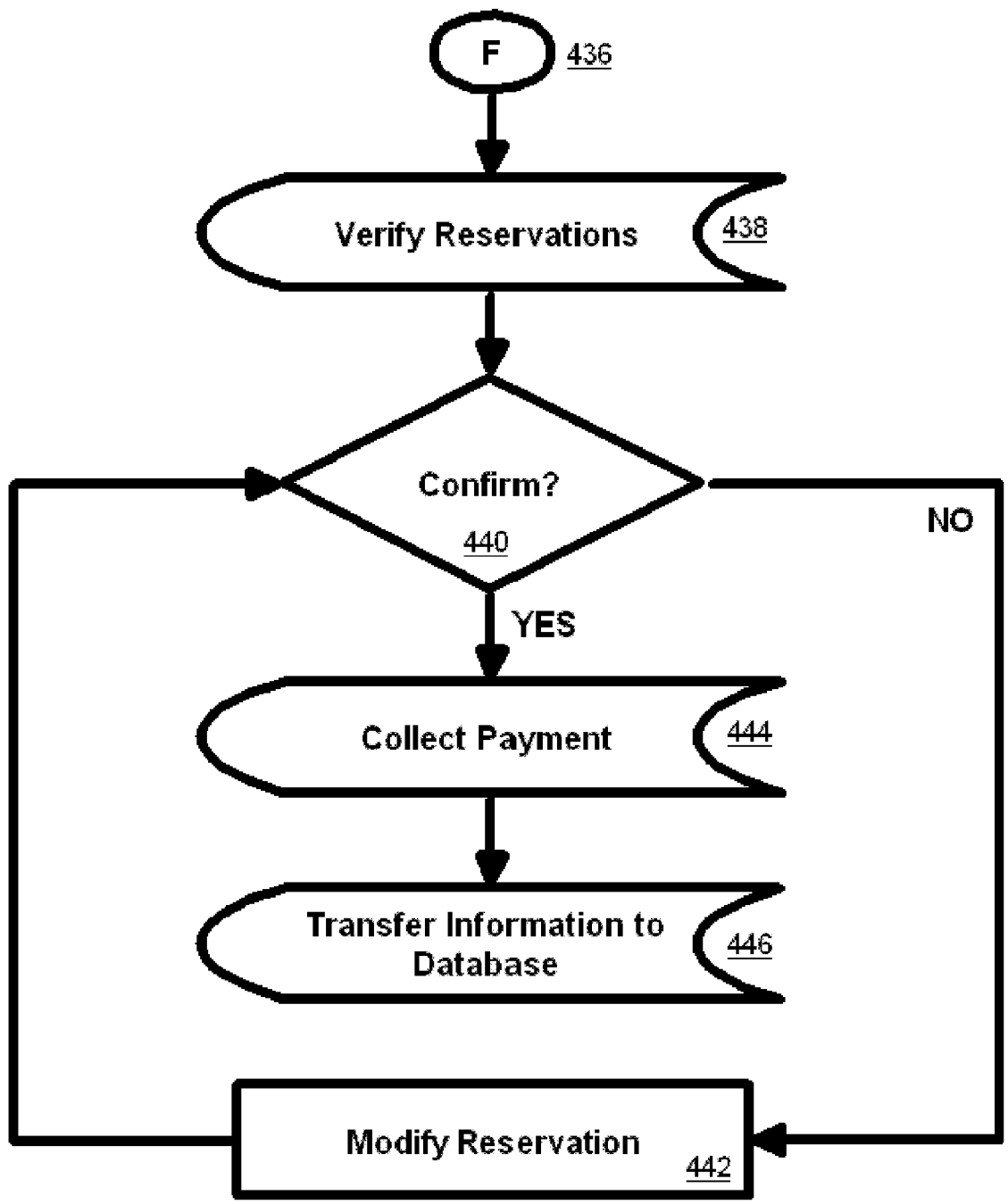
FIG. 23 is a flow chart displaying the manner in which event reservations are entered into the online template database, in accordance with the invention.

FIG. 23 shows a flow chart displaying the manner in which reservations for the event engine are entered into the online template database, in accordance with the invention.

Once a method of payment is decided upon (step 436) the database containing the event organizer's choice(s) then confirms event related reservations. Since the original event engine may be stored in the personal history file for a period of time before payment is arranged, the availability of the event engine must be verified (step 438), confirmed (step 440) and edited, if necessary (step 442) prior to payment. Upon verification (step 438) and confirmation (step 440) of the availability of the event engine, payments or, alternatively, a deposit is collected (step 444) and finally transferred to the online event engine database or knowledge template database (step 446). The cybermediary will collect a processing and referral fee for each transaction. In another embodiment, the event engine or knowledge template owner receives a referral fee for each event engine purchase.

Figure 24:
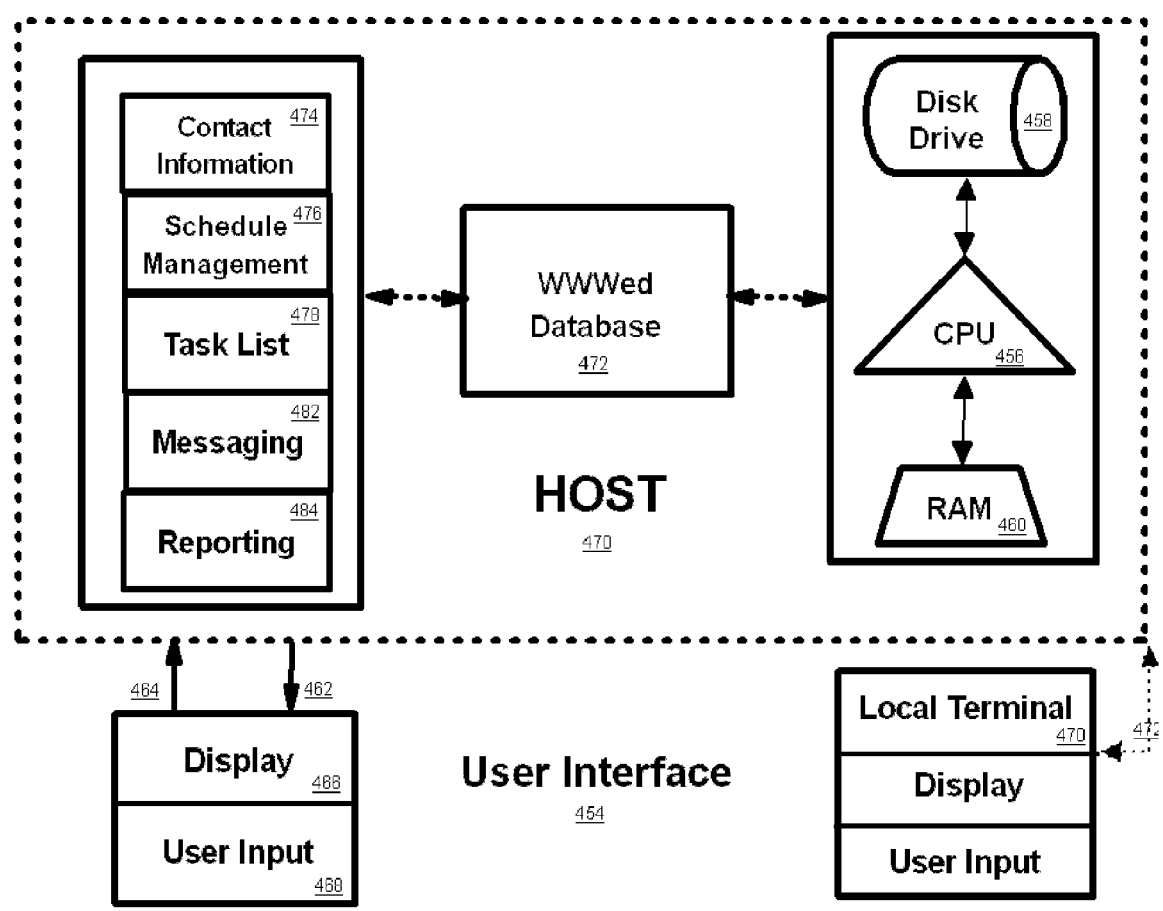
FIG. 24 shows a computer system for use in the invention, composed of both hardware and software elements, that provides a graphical user interface.

FIG. 24 shows a computer system, composed of both hardware and software elements, that provides a graphical user interface (GUI). This system may be implemented, in one embodiment, by the computer hardware and software environment shown by the system in FIG. 24.

Host Computer

The system includes a host computer 452, which may comprise a server, personal computer, computer workstation, supercomputer, mainframe computer, or another suitable digital data processing apparatus. For ease of description, the computer 452 is described as a server.

The host computer 452 includes a CPU 456 in communication with at least one digital data storage unit. In the illustrated example, the storage is embodied by a non-volatile disk drive storage 458 and a temporary memory 460, such as random-access-memory (RAM).

User Interface

The host computer 452 is coupled to a user interface 454. Communications between the host computer 452 and user interface 454 are conducted by an input channel 462 and by an output channel 464. The channels 462/464 may comprise wires, busses, computer backplanes, fiber optic channels, satellite or other wireless connection, telephone lines, computer networks (e.g., local or wide area networks, Internet, Intranet, etc.), or any other suitable communications links.

The user interface 454 presents data in human-readable form to the user (not shown), and receives input from the user for submittal to the host computer 452. To achieve these purposes, the user interface 454 may include a visual display 466 and a user input device 468, as shown. The display 466 may comprise a computer cathode ray tube (CRT) monitor, light-emitting diode array, flat-panel display, liquid crystal diode (LCD) display, projection system, or any other suitable mechanism for visually conveying data to a human user. The user input device 468 may comprise a push-button mouse, keypad, touch-sensitive computer display screen, digitizing pad, voice recognition system, foot pedal, brainwave sensing device, or any other mechanism to receive human input.

Local Terminal

In one embodiment, the invention may be implemented directly by the host computer 452 and user interface 454, without participation by any other processors. In this embodiment, the host computer 452 executes machine-readable code to provide the GUI of the invention; this involves presenting text and/or graphics at the display 466, and receiving human input via the user input device 468.

A different arrangement is possible where the host computer 452 operates with an (optional) independent processing device such as the local terminal 470. The terminal 470 is coupled to the computer 452 by a communications link 472, such as fiber optics, satellite link, cables or wires, intelligent computer channel, telephone lines, the Internet, an intranet, a local or wide area network, or any suitable digital communications medium. The terminal 470 includes one or more user interfaces, such as a visual display and user input device as illustrated. In the local terminal embodiment, the host computer 452 transmits machine-executable code to the terminal 470, which is executed at the terminal 470 to provide the improved electronic form GUI of the invention at the local computer's user interface. Using input obtained with the GUI, the terminal 470 may "submit" the data by storing it locally and/or transmitting the data to the host computer 452.

Database Modules

Use of the knowledge template, in accordance with the invention, consolidates and streamlines the logistically complex event planning process. This streamlining allows event planners to focus more time and energy on the implementation aspects of event planning. The database (step 472) enables an event planner the ability to gain quick access (step 474) to key contact information on vendors or guests when needed from a contact module. When an event planner requires real time information about upcoming events a schedule management module (step 476) allows the event planner to gain access to the most current set of event details, thus' keeping updated on any last minute changes made by hosts, vendors or guests. A central task list module (step 478) permits the event planner to view all event tasks at once in a global overview or by calendar view, if desired, in order to help the event planner to build a successful event day-by-day, task-by-task. If an event planner, vendor, host or guest desire to communicate with each other, a wireless messaging system module (step 482) keeps all the parties involved within quick and easy reach. Furthermore, if a planner, vendor or potential advertising sponsor requires specific reporting requirements such as guest demographic information or multiple and cross-event reporting on a series of events, a reporting module (step 484) allows event planners to track demographic data for vendors and guests as well as expenses across different events.

Advantages of the invention to the event organizers include:

Creates a worldwide market for event planning templates.

Enables a evolutionary improvement and upgrading of event planning information as event templates are improved with each use. Things that work will succeed. Things that do not work will fall to the wayside.

Allows streamlined on-line access to contact information, schedule management, task list, messaging and reporting database modules, making event template easier to implement.

Empowers event planner with valuable real time budget analysis through General Fund account information.

Provides the ability to collaborate in the development of event planning templates and to share event planning information on a family-wide, company-wide or worldwide basis.

Advantages for vendors include:

Opens new revenue sources.

Allows more standardization in normal work routine; "event engine" or template-driven events will require less pre-event preparation.

Enables mass production as well as mass customization of parties and other event-related activities.

Database driven modules increase efficiency. A messaging module, for example, enables faster and more reliable communication with event planner and other vendors, when necessary.

Promotes positive feedback and reward for good work—which is rewarded by favorable on line reviews and additional business.

In sum, event organizers spend lots of time putting together the perfect event. Typically, the event organizer will spend many hours interviewing with potential vendors and subsequently negotiating with them in order to arrange the perfect event. However, once the event is over all of that work involved in finding just the right set of vendors and negotiating the deal with each individual service provider is literally thrown out. By saving this information in order to be put to use at a later time for another event organizer, significant simplification of the event planning process is obtained. Since the event template has required a large investment in time and energy by the initial event organizer, it is only fair to compensate them for their work. In this manner, event organizers, such as wedding couples, could, if they create a successful template, recoup the cost of their wedding many times over as their template is used and reused many times over by subsequent couples for their own weddings.

As discussed above, the interactive registry system in accordance with the invention transforms the traditional bridal registry process into an online clearinghouse linking buyers (brides, grooms and guests) and sellers (bridal gift and service vendors) through a novel online marketplace concept that offers unique incentives to both parties. Unlike the constraints of a traditional registry where the gifts, the vendor and the donor are all expressly limited in the available options, the registry system in accordance with the invention allows for virtually unlimited diversity of gift items for brides and grooms, greater diversity of giving options for wedding guests, and the involvement of several competing vendors.

The interactive registry system in accordance with the invention is primarily an invention in the arena of business methods or processes as applied to the realm of e-commerce, or Internet commerce. The registry system works in the domain of e-commerce as a so-called 'vertical marketplace' or 'cybermediary', meaning that it links a variety of buyers and sellers in novel ways as the middleman within a specific market niche, in the case of a bridal registry, wedding gifts and services.

As yet, there is a total lack of wholesaling or discount merchandising options in the current wedding market, either in the domain of e-commerce or in the vein of traditional commerce. The domain of e-commerce is the perfect arena for such a marketplace to function because it contains virtually unlimited resources of information, a large variety of vendors, guests, clients and gifts, and great potential for creating and charting the requisite databases of registries and donors. The Internet also offers efficiency and ease in organizing and coordinating the potentially very complex and multifaceted intermediation process.

The interactive registry system in accordance with the invention offers unlimited options to all parties involved in, e.g., the wedding process: the bride and groom, the guests, and the vendors. The registry system involves the existence of a website which functions as a 'cybermediary' between all parties, negotiating the best terms for all involved.

The brides and grooms will benefit from unlimited choice in gifts, pricing and an economic rewards system, described below.

Guests will benefit from the unlimited gift choices and gift giving customization options, described below.

Vendors will benefit from increased volume of sales, 'free' advertising and a steady stream of new clients and revenue.

Furthermore, the present invention provides a system and method for enabling an event planner to possibly obtain, by means of a copyright application, ownership of the intellectual property called an "event engine" or "knowledge template." By constructing and copyrighting the event engine or knowledge template, the event organizer becomes a "knowledge template owner." The knowledge template owner may subsequently re-package, re-market and re-sell goods and services that she has purchased for an event into new and useful forms suitable for purchase and use by others referred to herein as "knowledge template buyers".

The system and method are implemented in part by software that runs on a central Web site, although the system could easily run just as well by software that runs on the knowledge template owner's computer and knowledge template buyer's computer utilizing a conventional peer-to-peer service.

Through this site, a consumer can peruse and browse knowledge templates in search of desired services and view those services in useful forms. The services can be classified by the type of event, the number of people expected for the event, the nature of the event, the theme of the event and/or the geographic location. In the case of a wedding, for example, the couple will not merely view the work of an individual caterer, band or dj (disc jockey). Rather, they will be able to view, in digital or analog form, the entire wedding. Thus, if a bride that wants a vegetarian, Scottish-style wedding for 150 guests within a 250 mile radius of her given zip code will be able to find, for example, the results of a sample knowledge template search indicated in FIG. 1E.

The results of individual service providers such as photographers and videographers will also be available for view if desired. The type of views will vary from event to event. For extremely popular events, streaming media webcasts or even cable broadcasts may be available.

The business method outlined in the invention is scaleable so that it can encompass new processes and potentialities. Such options include listing wedding services as well as consumer goods, allowing for direct cash donations and utilizing new or changing methods of vendor-shopping, be it through an online auction or an online personal shopper. All are described below.

When the interactive registry system is used as a bridal registry, it fulfills a specific need existing in the current wedding marketplace in a new and innovate way. The current wedding marketplace is highly fragmented. Some merchants are small family-owned businesses; others are large multinational chains. It is also often a very geographically regionalized marketplace. Hundreds of industries also converge during the wedding process. For example, in the U.S. alone, there are more than a half a million vendors that could be considered relevant to wedding planning in such industries as reception venues, florists, photography, musicians, transportation, printers and designers, jewelry, travel, hospitality, clothing, and more. This fragmentation of the industry by industry, vendor, region and a host of other factors has limited the existing options available to couples and limited the range of potential customers available to wedding vendors and retailers.

This fragmentation has also created huge inefficiencies and frustration for both vendors and couples, because for each wedding, the process of vendor-solicitation must be re-created. The average couple negotiates with between ten and fifteen separate vendors, services and retailers for an average wedding. Meanwhile, the average vendor is constantly striving to differentiate himself or herself in the marketplace to attract the next generation of wedding couples, as product and vendor loyalty is less relevant in a market that caters to once-in-a-lifetime events. With approximately 2.5 million weddings in the US each year, these processes of vendor hunting and couple searching are re-enacted several millions of times every year. This amounts to a lot of woman-years.

The bridal registry process in accordance with the invention provides a solution to these problems by effectively creating an online wedding marketplace that links all the various parties and offers a constantly updated catalog of all the potential transaction options to both the client and the vendor. This will give the bride and groom the maximum choice and value, the vendors a central source and framework in which to target new couples, and the guests the maximum flexibility in gift giving.

The bridal registry in accordance with the invention will function as both a directory listing service and a clearinghouse between the vendors, e.g., wedding product and service vendors, and the users, e.g., the bride, groom and guests.

From the Couple's Perspective

Through the interactive bridal registry system in accordance with the invention, potential items for a bride's registry will be ranked in specific categories such as according to the lowest currently advertised price, by brand name or by product popularity or, alternatively, by means of an online auction whereby the merchants compete to offer the couple the lowest price. Either way, the couple will have a virtually unlimited range of options for potential registry gifts and the guarantee of the lowest price on these items. Couples can also request cash donations, either open-ended or targeted to specific forthcoming expenses, e.g., for a mortgage on a new home or for the cost of renting the wedding hall or for honeymoon expenses.

The consumer products that couples specify as desired gifts can come from an almost unlimited number of individual vendors. The cybermediary or website will list the items by acting as an impartial wedding directory or listing service, but will ideally collect a commission from the selected final vendor in each category.

Through the bridal registry system, the couple will peruse the options available and make a tentative list of items desired, e.g., a toaster, a microwave, and a car. Depending on what they prefer, the couple can either be specific in their wish list, e.g., a Kitchenaid X-100 Model Multi-Blade Blender, or list in general terms, e.g., a blender. These specifications will then determine the scope of the later product bidding or price-comparison among the vendors.

The bridal registry system will also have links to copious sources of information and references for each potential gift or purchase. Links may be to other areas of the website, such as previous couples' feedback on their product or vendor purchases, or to other sources of information on the Internet, such as product or vendor web sites.

The couple's choices determine what listings become available to them and what options are open to the guests. For example, couples can bar non-wish-list related guest purchases if they so choose, or they can stipulate only cash contributions.

The couple then distributes the Internet address of the cybermediary to their guests. The guests then visit the cybermediary, obtain the data for the couple and purchase from the selected gift options as specified by the couple. However, the guests do not view the same information about the products being purchased in terms of price as the couple.

The couple will ideally receive an additional bonus through using the cybermediary. For example, the registry will credit a percentage commission of each purchase made through the registry to the couple. This commission is calculated to be a percentage of the difference between the advertised product price, or the price advertised to the guests purchasing the product, and the actual price of the item as solicited through the registry vendor-buyer intermediary process. This differential and the couple's commission are made possible because the registry always searches for or solicits the lowest prices in any given product line. This commission credit can then be used by the couple to purchase additional items as they choose through the registry process. The cybermediary will also ideally receive a commission from each purchase based on the same process.

In alternative embodiments of the invention, the bride and groom have access to three other methods for reducing their wedding costs. In one embodiment, the couple may opt to allow vendors to advertise their services either at their wedding or at the couples' registry and in turn receive monetary compensation or a discount on services rendered by the vendor in return for the advertising. In another embodiment, the registry will facilitate the sharing of wedding plans and desired services among registry users with the intent to allow shared access and payment obligations to the same service (and possible negotiations for a reduced cost). If, for example, two brides desire the same wedding hall or church or tent rental at different times on the same day, then the use and expense involved in the rental fees, decorating expenses and other fees may be shared. It is conceivable that two couples may even share a facility at the same time in order to obtain a level of service that they could not afford individually, as would occur in obtaining an exclusive wedding hall, or, alternatively, in order to save money. Another embodiment would allow vendors to modify the price of services or rentals, such as the fee for a wedding hall with time if it became apparent that demand for such usage was going up or down. In a case, for example, where no usage is anticipated a month prior to a given date, the vendor may allow significant discounts. This last embodiment would apply The Revenue Management Systems (RMS), commonly utilized in the airline industry to optimize their revenue per flight to the wedding industry. RMS, applied to the wedding industry will result in potentially greater usage of resources for vendors as well as potentially increased savings for couples.

From the Guest's Perspective

Guests will first be notified by the couple of the Internet address of the interactive registry system. The guests will then view a customized couple 'wish list' and a listing of suggested retail prices for each item on the list that corresponds to the couple's customizations, stipulations and desires. The retail prices listed for the guest under the couple's consumer product 'wish-list' will correspond to the average advertised market prices for items in other, traditional bridal registries.

If a guest chooses to purchase one of these items, once an item in a specific gift category is purchased by the guests, such as a blender, that category listing is removed from future Registry listings for later guests. This ensures that there is no duplicate gift giving.

At the time of gift purchase through the registry system, i.e., the cybermediary, the guest must pay the amount of the gift in full. Alternatively, several guests may combine to purchase an expensive gift or service in which case each guest will pay their share of the amount in full. This amount is then held by the cybermediary to be divided between the vendor, the cybermediary, and the couple.

Guests also have additional options through the registry system. For example, they may choose to give something not on the list. The registry system will have recorded whether this item was already given or not, just as traditional registries do. If the item was never listed by the couple, then the Guest may search a modified view of the complete registry system product listings that are similar to what the couple views, but with the price information modified to include a suggested retail price. In this way, the registry system ensures that the couple will receive a commission off any item that any guest chooses through the registry process.

A guest may also simply specify a cash donation through the registry system, i.e., the cybermediary, which is credited to the couple's account in the same way as purchase commissions. These funds can be stipulated by the guest to be used only for specific purchases, or they can be open-ended. The couple may then shop accordingly through the registry system for the appropriate items using this cash donation. If the guest so stipulates, they can then be notified of exactly how their cash gift was utilized.

From the Vendor's Perspective

Couples will first post their gift preferences with the registry system, which will be organized into specific product categories e.g., toaster, blender, phone, etc. The specificity of the gift preferences will determine which vendors are able to compete for the product in question, i.e., whether a model number or brand name are specified for the product or not.

Vendors may compete through an auction process for each product listed on each couple's wish list. In the auction process, each vendor will post the lowest price they will be willing to accept for the product listed. If the category is vague, any product within the category listed will be acceptable for posting, but it will be up to the couple to determine which product they prefer from the products listed, even if the product they prefer in that category is listed at a higher price than another lower-priced product.

Alternately, the registry system may automatically price-shop among several vendors in any category through a computer comparison-shopping system called a 'bot'. These bots are sometimes called 'personal shoppers', or 'online shopping assistants'. They are computer programs that search the Internet for the product listed and the price listed using certain computer language protocols. In the case of the registry system, these bots can then create comparative lists for the couple of different retailers on the Internet that are all selling the same product.

Depending on the final revenue model of the cybermediary, the registry system's hot may only search selected retailers affiliated with the cybermediary, or it may search the entire Internet for each product listing. However, the registry intermediary process will remain impartial throughout. Vendor listings will always be free and open to as diverse a selection of vendors as is rational and feasible in each category. Certain vendors may be excluded from the registry system search if, for example, they have consistently delivered inferior products to past users of the registry system.

Once a final listing of a product's lowest price is found or is awarded through the auction process, as soon as a guest registers to buy that item, the vendor will receive a partial payment and the item will be held by the vendor until the wedding and shipped to the wedding couple. Upon receipt of the item by the couple, the cybermediary will release the remaining payment for the item to the vendor.

Alternatively, the vendor will be paid in accordance with a contract agreed upon by the registry and the vendor.

The reverse registry process always guarantees payment to the vendor because payment is already held by the cybermediary before the transaction with the vendor is completed. This makes using the registry system, despite lower vendor margins of sales, attractive to the vendors.

The event coordinated financing system in accordance with the invention transforms the money collection and spending process into an integrated on-line clearinghouse linking consumers of event related products and services (brides and grooms and event organizers), sellers of event related products and services (vendors) and revenue generators (gift givers, ticket buyers, Reverse Registry users, advertisers and others) through a novel online marketplace concept that offers unique incentives to all of the involved parties. In traditional collection and payment processes, cash gifts are collected and held in multiple locations and have no direct connection to the account used to pay the bills. This creates unnecessary complications in the planning, the payment and the accounting processes associated with these events. Using the financing system in accordance with the invention, all accumulated funds may be held in the same account from which the bills will eventually be paid. This allows the innovative financing system, for example, to utilize existing collateral in order to offer a loan against anticipated gifts and other event related revenues. Alternatively, the financing system can offer a standing line of credit to the event organizer which can be utilized by the event organizer to pay event-related bills in anticipation of event-related gifts and revenues. In this manner, payment for event-related services becomes similar to a mortgage or bridge loan with a short and fixed time span.

The financing system in accordance with the invention, also sometimes referred to as the "General Fund" herein, may be designed to allow vendors to receive payment guarantees with the consent of the event organizer. Under this agreement, event organizer's access to the money available in an account will be restricted until contractual event-related goods and services have been fully paid, thus guaranteeing vendor payment, subject to contract fulfillment.

The financing system in accordance with the invention is primarily an invention in the arena of business methods or processes as applied to the realm of e-commerce, or Internet commerce. The financing system works in the domain of e-commerce as a so-called 'vertical marketplace' or 'cybermediary', meaning that it links a variety of buyers and sellers in novel ways as the middleman within a specific market niche, in this case for example, providing financial services for event organizers. The financing system links event-related gifts, income, loans and payments into a unique, single and restricted account.

The domain of e-commerce is a very suitable arena for such a financial system to function because it contains virtually unlimited resources of information, a large variety of vendors, gifts, event-related income options and great potential for creating and charting the requisite databases of vendor contracts and loan obligations. The Internet also offers efficiency and ease in organizing and coordinating the potentially very complex and multifaceted coordination process.

As yet, there is a perceived lack of financial service options in the current event management market, either in the domain of e-commerce or in the vein of traditional commerce. While wedding loans, for example, are available, there is currently no way for a bride and groom to link their loan to gifts and other sources of income so that payment for wedding related goods and services is executed in an organized and efficient manner. They may get a loan, but they still have to sort out all of their bill payment obligations. Since their obligations may be quite complex, both in terms of arranging for timely payments as well as in terms of finding the available funds, the loan does little to help the couple in an area where they still need much help-time.

The financing system in accordance with the invention is designed to allow couples and event planners to save time by putting all of their event-related income and expenditure in a single account with several payment options that include automated payments to selected vendors.

Further, the financing system in accordance with the invention, offers a wide range of savings, payment and financing options to all parties involved in event planning (e.g., in the wedding process: the bride and groom, the guests and the vendors). The financing system utilizes the existence of a central website connected to a central database which functions as a financial 'cybermediary' between all parties.

The event organizers (brides and grooms) will benefit from wide range of financing, savings and payment options for their event. They will also have access to an optional and novel income generating system, described below.

Gift givers (attending guests or non-attending invited guests) will benefit from easy access to safe and secure methods of giving cash gifts or donations with a wide range of customization options. For example, guests may pay at any time they find convenient either before or after the event or, alternatively pay in installments.

Vendors will benefit from increased payment security (since the money is "in the bank"), 'free' advertising and a steady stream of new clients and revenue.

Another advantage is that the business method involved in the invention is scaleable, such that it can encompass new processes and potentialities. Such options include extending financial to post-event services such as, in the case of weddings, home finance and mortgage financing, allowing funds left over from event financing to be directly applied, for example, to home purchase or rental.

When the General Fund financing system is used as a means of wedding financing, it fulfills a specific need existing in the current wedding marketplace in a new and innovative way. The current wedding process is highly fragmented requiring multiple payments and negotiations with vendors as well as cash gifts and presents from possibly hundreds of family friends and guests. There is thus a great need for a centralized fund, such as would be created using the General Fund, to help the couple keep an accurate and convenient track of event-related income and expenses. In addition, the financing system may be designed to aid the couple by providing easy access to event financing that is linked to their account as well as novel means for generating income as described below This fragmentation has, as mentioned above, created huge inefficiencies and frustration for both vendors and couples, because for each wedding, the process of vendor-solicitation must be re-created over and over again. The average couple typically negotiates with between ten and fifteen separate vendors, services and retailers for an average wedding. Meanwhile, the average vendor is constantly striving to differentiate themselves in the marketplace to attract the next generation of wedding couples, as product and vendor loyalty is less relevant in a market that caters to generally once-in-a-lifetime events. With approximately 2.5 million weddings in the US each year, these processes of vendor negotiations and couple searching are re-enacted several millions of times every year. This amounts to a lot of man-hours or labor.

The financing process in accordance with the invention provides a solution to these problems by creating and presenting optional pre-negotiated terms and contracts to both couples and vendors alike. This option is intended to save both the couple and the vendors much time. In addition, the financing system will present an optional service that will guarantee vendor payment subject to complete contract fulfillment. The financing system will, in this case, ideally provide on-site personnel to monitor contract fulfillment and pay vendors only after all parties are satisfied. In this manner, the couples stress level and frustration will be reduced, since the task of monitoring the vendors' performance will be in professional and qualified hands. The vendors will also be relieved in the knowledge that payment will be forthcoming without question once their hard work is successfully completed. In this manner, the financing system offers solace to both the client and the vendor. This will give the bride and groom a simple solution to financing and paying for their wedding, the vendors a central source and framework for payments and contract fulfillment, and the guests the maximum flexibility and ease in giving cash gifts.

In operation, once a General Fund account is open, the event organizer will distribute the Internet address of the cybermediary to their guests and vendors, along with a password necessary to access the relevant areas of the site. The guests who wish to give a cash gift then visit the website of the cybermediary, and select the amount and date of their gift. Other options may include, but are not limited to payment by installments or payments linked or, alternatively, to life events (such as the purchase of a home). However, the guests do not view the same account information about the event as the couple.

As mentioned above, the financing system is designed to provide the event organizer (bride and groom) access to other methods for reducing their event (wedding) costs. In one option, the couple may opt to allow vendors to advertise their services at their event (wedding) and receive monetary compensation or a discount on services rendered by the vendor in return for the advertising. In another option, the couple may opt to sell or lease broadcast rights of their event. Family and friends and other guests who could not make it to the wedding will pay a fee for viewing the affair in video or streaming media format as broadcast over the Internet. Recordings and photos may be transmitted and paid for as well. Other sources of event-related funding may come from, for example, income generated by the reverse registry or, alternatively, by means of corporate benefits or corporate matching funds that the General Fund has negotiated with specific employers. In all cases, the General Fund will collect the appropriate revenues for the event organizer. It is also conceivable that the event could be a "pay-per-view" type of event in which the main stream of income would be from people wanting to see the event at sites remote from the event, e.g., a boxing match.

In another embodiment, the financing system may be designed to facilitate the sharing of wedding plans and desired services among registered users with the intent to allow shared access and payment obligations to the same service (and possible negotiations for a reduced cost). If, for example, two brides desire the same wedding hall or church or tent rental at different times on the same day, then the use and expense involved in the rental fees, decorating expenses and other fees may be shared. It is conceivable that two couples may even share a facility at the same time in order to obtain a level of service that they could not afford individually, as would occur in obtaining an exclusive wedding hall, or, alternatively, in order to save money. Another embodiment would allow vendors to modify the price of services or rentals, such as the fee for a wedding hall with time if it became apparent that demand for such usage was going up or down. This last embodiment would apply for example, in a case where no usage is anticipated a month prior to a given event, the vendor or supplier may allow significant discounts.

This would in operation be similar to the Revenue Management Systems (RMS), commonly utilized in the airline industry to optimize their revenue per flight, but would be applicable to the wedding industry. RMS has not yet been applied to the event planning industry, in general, or to the wedding industry, in particular. RMS, applied to the event planning and wedding industries will result in potentially greater usage of resources for vendors as well as potentially increased savings for couples.

The financing system process guarantees payment to the vendor because payment is already held by the cybermediary before the transaction with the vendor is completed. This renders the financing system attractive to the vendors.

With respect to the operation of the invention, the financing system is designed to enable couples will visit the WWWed website and peruse existing potential categories of products and services listed through the general fund listings. Products will be divided into three general areas:

1. Financial Services such as loans for event expenses.
2. Payment Services for event expenses.
3. Revenue Generating Services for event expenses.

Couples will determine which services they will require and will create an electronic listing with WWWed that reflects their choices. This listing can be updated by the couple at any time and can be as specific or as general in each category as the couple desire and are customizable by the couple, or user, in several ways. There is flexibility in revenue generating services. The process for opting for advertising revenues begins when the event organizer (couple) submits basic demographic data concerning the place and time of their wedding, the number of expected guests as well as the guests' home zip code and age range. The event organizer also submits preferences regarding the type of advertising that they would accept for their wedding. Advertising may take the form of (but is not limited to):

1. advertising listed on the personal wedding invitation;
2. advertising listed on an XML or HTML based document, e-mail or other online form of wedding invitation;
3. advertising listed on an XML or HTML based document, e-mail or other online form of communication with friends, family and other potential guests;
4. advertising banners listed on a personal wedding website;
5. advertising on a webcast or video or digital reproduction of an engagement party;
6. advertising on a webcast or video or digital reproduction of the wedding ceremony;
7. advertising on a webcast or video or digital reproduction of the wedding reception;
8. advertising on a webcast or video or digital reproduction of the honeymoon;
9. advertising with placards placed next to the products at the wedding ceremony or the wedding reception;
10. brochures placed at guests' tables prior to or during the wedding reception;
11. Promotional CD's or other material in digital format that may be used to promote a band or other wedding related business or businesses given to guests' prior to or during the wedding reception;
12. free samples of products with attached advertising distributed to guests prior to or during the wedding reception or prior to or during the wedding ceremony.

This data is pooled with the data of other event organizers. The advertising requirements of potential advertisers is also pooled and correlated with the list of available events. Suitable events are submitted to potential advertisers to review. If the potential advertiser finds a suitable selection of event(s) (wedding(s)) that meet their requirements, the advertiser may offer the event organizer a contract for services.

In order to verify attendance of the expected demographic sample at the event, the administrator of the financing system would appoint a representative to verify attendance and other aspects of contract fulfillment.

Similarly, the event organizer may sell broadcast rights to their event (wedding). Individuals who wish to view a live streaming media presentation (webcast), video, photos or other digital representations of the event (wedding) will pay a fee to the administrator of the financing system, or its representative who will, in turn, give a percentage of all payments to the event organizer.

The effective use of an online central database for event planning and implementation in accordance with the invention, streamlines the entire event planning process making complex tasks and events painless to plan, to implement and to duplicate at a later time.

Typical lists for wedding planning, for example, are quite complex. Consider a typical agenda, described in outline form in FIG. 14 and listed in greater detail in FIGS. 1D and 1E.

Figure 14:
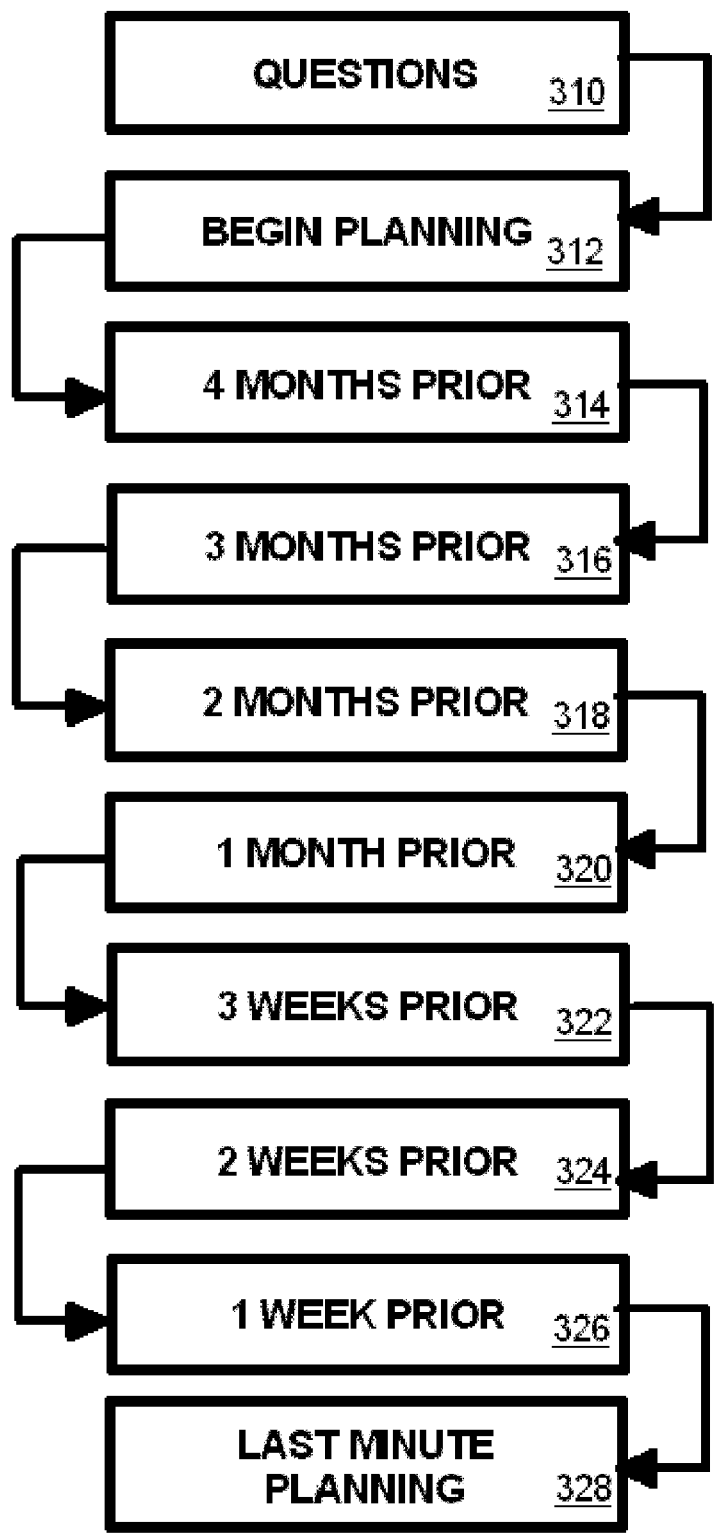
FIG. 14 is a flow chart of a traditional wedding planning process.

Utilizing the event planning method and system in accordance with the invention, the processes involved in planning for and implementing the various agenda items listed in FIG. 14 can be made simpler, leaving the bride and groom and their respective family and friends with more time and energy available for things more important than worrying about who exactly has to do what at a specific time.

Utilizing the event planning method and system as illustrated in FIG. 17, the number of processes, and therefore the amount of time, that the couple has to spend on wedding planning and preparation as described in FIGS. 1D and 1E, is greatly reduced. Utilizing a "Six Sigma" approach to the processes involved in event planning, significant time savings are provided to event organizers. Beyond the application of Six Sigma methodology to a new area-event planning, the event planning method and system also involves the creation of a new form of "bit engine."

A method is thus proposed for sharing event-planning information so that other interested parties who would be willing to pay for such planning information may use it over again. Although wedding planning is mentioned as a preferred embodiment, it is not desired that the present invention be limited to the exact construction and operation illustrated and described herein. Accordingly, all suitable modifications and equivalents which may be resorted to are intended to fall within the scope of the claims, since numerous modifications and variations will readily occur to those skilled in the art.

With respect to the weddings, a wide variety of businesses cater to this large and highly fragmented market. Merchants range from small family-owned stores to national chains. Affiliated businesses from other industries such as travel agencies, home furnishing stores, department stores, and hotels are also included. As a result of this highly heterogeneous mix of large and small as well as local and national businesses, the wedding industry has become a highly fragmented industry. This translates into a highly complex and fragmented wedding planning process for the typical bride and groom that must deal with as many as ten to fifteen vendors for a typical wedding. This is further complicated by the fact that these ten to fifteen vendors are the finalists in a selection process that can easily involve many prospective candidates for each vendor category. Therefore the ten to fifteen vendors who actually perform the wedding represent a mere tip of the iceberg in this regard.

Figure 15:
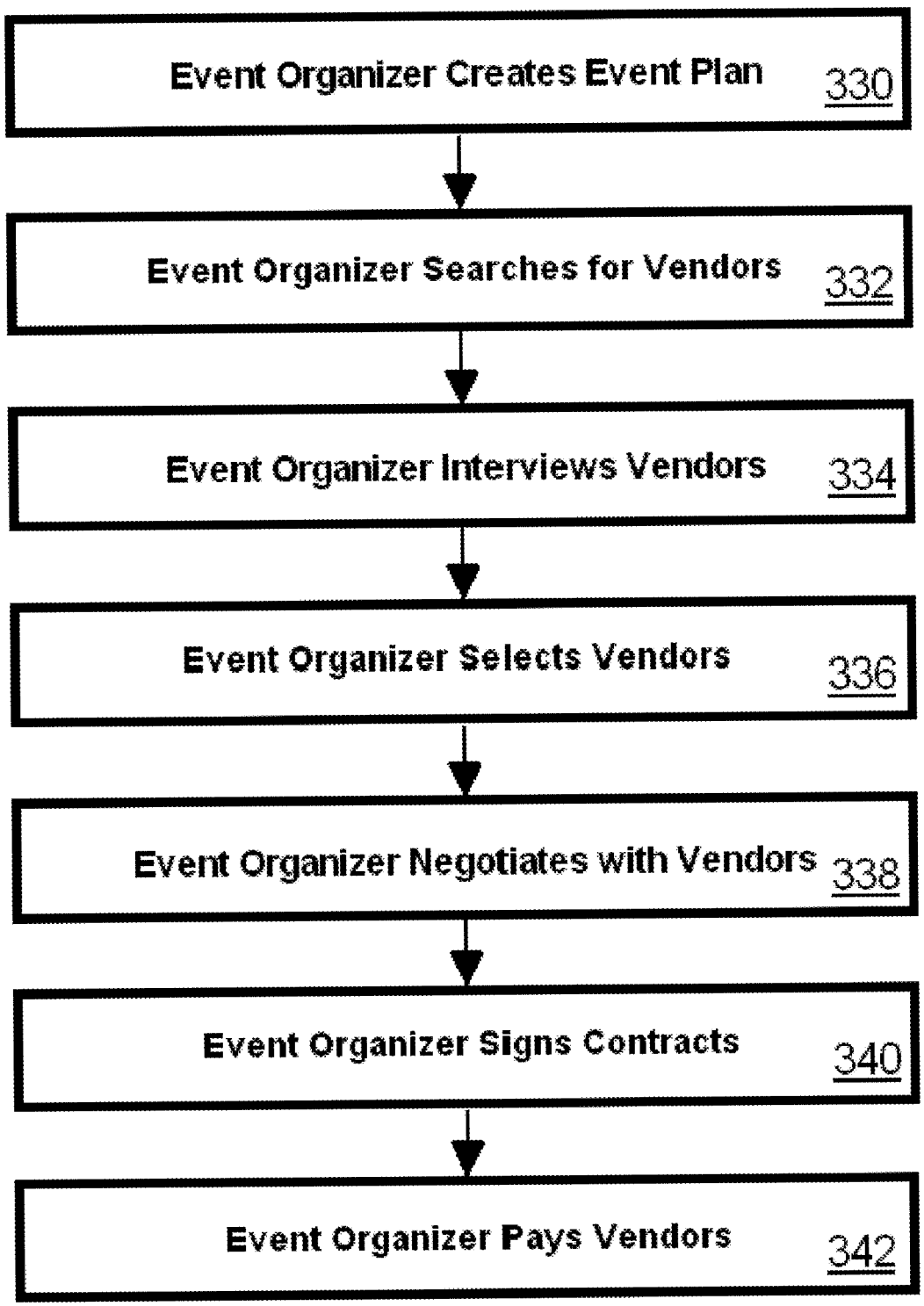
FIG. 15 is a linear flow chart of the manner in which the event organizer plans and organizes an event.

This complexity is outlined in FIGS. 15 and 16.

FIG. 15 represents the typical stages involved in wedding planning in schematic form while FIG. 16 shows the same scheme in a more realistic format in which each subsequent step has a potential impact on previous steps. In a typical case, for example in which a bride and groom have settled on a photographer only to find out much later that the photographer's contract is not acceptable for whatever reason. This places the couple back four steps in what seems, on the surface, to be a linear and orderly process.

Utilizing an event engine, as shown in FIG. 17, the couple eliminates much of the complexity associated with traditional planning processes by reducing the amount of steps necessary to plan a wedding by one to two orders of magnitude. This is especially significant since, while the traditional process as outlined in FIG. 16 applies to each and every individual vendor and supplier, the event engine process takes into account all of the necessary vendors and suppliers in a simplified linear manner outlined in FIG. 17.

One of the most difficult parts of planning a wedding is the process of finding one's local vendors. Using an event engine to prepare a wedding will make this process easier by supplying much of the details that an offline wedding consultant would supply. This simplifies the process of finding reliable vendors in one place.

Another difficult aspect of the planning process is the bride's anxiety about whether the vendor will deliver its services as promised. In fact, it is anticipated that the buyer of the event engine or knowledge template may contact the owner and seller of the knowledge template, and, for a fee, obtain additional details and advice regarding the use of the knowledge template in order to gain feedback regarding the vendors' reliability and performance. The bride and groom can then read reviews and ratings from previous customers and get a sense of the vendor's service. In addition, for a possible additional fee, the bride and groom can view photographs and videos or other digital or analog reproductions from the event engine and judge the effectiveness of the venders' performance for themselves.

This effectively converts every event engine or knowledge template owner into a potential wedding consultant regarding the details of her own wedding. (An event engine or knowledge template owner will be anyone capable of creating an event engine or knowledge template—whether that entity is private or commercial.) This solves some additional problems for the wedding service providers.

An additional problem commonly encountered by wedding service providers is the difficulty to effectively market goods via the Web or via their Web sites. Because the customer cannot physically inspect their products and services via the Web it is desirable that the bride and groom have access to product and service reviews, product and service ratings, and other information that can be relied on by the customer to make an informed decision regarding their wedding plans. In many cases, however, wedding service providers are small businesses and lack the resources needed to generate or disseminate their services.

The present invention allows brides and grooms, guests, vendors and other event organizers to post reviews, comments, advice and other forms of feedback regarding the efficacy of any individual knowledge template for other event organizers to see. Since the knowledge templates will contain direct links to the vendors associated with a given knowledge template, this will allow further means of encouraging as well as disseminating good service.

Positive reviews that would be included with each event engine or knowledge template would be a source of essentially free advertising for such small businesses. In addition, phone consultation or by a personal consultation with the knowledge template owner who lives in the same geographical area will be another cost effective source for referrals and new business. Since the reviews associated with each event engine will be available online and categorized according to zip codes and other means of classification such as style, cost and physical location (beach, hotel, chapel), it becomes much easier for the bride and groom to obtain relevant information regarding the large and diverse selection of wedding service providers available to them. This information is especially valuable if the bride and groom have chosen to plan a wedding in an area where they do not live. For example, it may not be very easy for a bride and groom who are away at college to prepare to interview and review all, or even a significant portion of, the many wedding service providers available to them if they want to get married in the geographical location of the bride's parents, who may be located thousands of miles away, or, perhaps, in another country.

Another problem commonly faced by wedding services is an inability to efficiently attract potential consumers to their Web sites. One way of attracting consumers has been to market the site through television (for the larger venders), radio, newspaper and Internet advertisements or listings at major wedding-related Internet sites such as ModernBride.com. However, advertising a site using conventional methods can be expensive, and can consume significant human resources. In addition, it is often difficult or impossible to evaluate the effectiveness of a given advertisement. By connecting wedding service provider's site to the bride and groom by means of an event engine or knowledge template, the vender has a quick, inexpensive and effective access to potential customers.

The present invention addresses these and other problems.

Since online events handling benefits event planners the most, WWWed database design, in accordance with the invention, focuses on helping event administrators. These tasks include:

Make it easy to offer repeated events;

Make it easy to collect, aggregate, and view registrations by event participants;

Provide convenient means for communicating with event participants and contractors;

Provide means for coordinating the activities of event participants and contractors.

In order to achieve maximum efficiency data within the WWWed database is divided into activities and events.

An activity is a kind of event; it is the type of thing for which people register. Activities might be weddings or kitchen remodeling or home improvement projects. An event is an instance of an activity. An event might be a wedding taking place at the New York Hilton Hotel at 6 PM on Jun. 5, 2001 in New York City or a kitchen remodeling that was completed on Oct. 28, 1999 in San Francisco. This distinction between activities and events can help event planners avoid repeated work. For example, the planning for a specific type of wedding or kitchen needs to be performed only once. A knowledge template can be used in accordance with the invention to create all subsequent instances of the original event. In this manner, major planning needs only to be performed once. From then on, whenever they want to create a new wedding or kitchen based on a prior template, they do not need to repeat planning and entering the same information. Instead, they may simply make relatively minor modifications to the original template in accordance with a particular event. These modifications could include, for example, where and when a specific event takes place. This process makes it quite convenient to offer similar events on a repeated basis based on a common knowledge template.

Use of the knowledge template, in accordance with the invention, will both centralize and streamline the logistically complex event planning process. This streamlining will allow event planners to focus more time and energy on the implementation aspects of event planning. In order to support the implementation aspect of event planning, key information on event planners, vendors, staff, and other contacts is stored in WWWed database, offering quick access to contact information when and where it s needed. Schedule management will allow real time handling of event details, while a central task list will allow planners to view all event tasks either all at once or by calendar view, if desired in order to build a successful event day-by-day, task-by-task. Other functionalities to be incorporated are the inclusion of a wireless messaging system to keep planners and vendors in touch with each other, the ability to allocate individuals to demographic groups for potential target marketing as well as multiple and cross-event reporting, thereby allowing event planners to track vendors, guests and expenses across different events.

The invention therefore operates both as a novel means of organizing, storing and retrieving event planning information related to specific events as well as a unique venue collecting income from the intellectual property that is generated as a result of the event planning process.

The event planning method and system in accordance with the invention is primarily an invention in the arena of business methods or processes as applied to the realm of e-commerce, or Internet commerce. The invention works in the domain of e-commerce as a so-called 'vertical marketplace' or 'cybermediary', meaning that it links a variety of buyers and sellers in novel ways as the middleman within a specific market niche, in this case, providing event planning knowledge templates in a unique package called "event engines" to event organizers. The event engine, as described in the invention, links event-related concepts, plans, products and services into a unique, integrated and unified knowledge template.

The domain of e-commerce is the perfect arena for such an event planning service to function because it contains virtually unlimited resources of information, a large variety of vendors, and event related services and products. The Internet also offers efficiency and ease in organizing, coordinating, and streamlining the highly complex and multifaceted event planning process.

As yet, there is a lack of totally integrated service options in the current event planning market, either in the domain of e-commerce or in the vein of traditional commerce. While wedding packages, for example, are available, they are invariably limited to a single vendor or a small group of vendors with limited planning options. That is fine, for example, if a working bride has her heart set on a wedding at a particular establishment. What should she do, however, if she wants to put together a very special wedding of her own? The invention offers a quick and easy route to plan and arrange a custom wedding without spending an inordinate amount of time in the process.

The present invention greatly reduces the complexity of event planning by dramatically reducing the number of individual processes required to complete the entire event planning process.

In an expanded context, the invention is designed to facilitate an integrated service package that includes, in the case of weddings other related services beyond integrated wedding planning services. These additional services include pre-marriage services, screening and counseling as well as post-marriage counseling on a voluntary basis. The premise of the services will be to serve the needs of the couple as well those of a society that have a common interest in furthering and preserving a stable and fruitful marriage. This is the broad vision that the invention serves to further.

In a sense, the invention is seeking to integrate an unevenly applied marriage sector with a fragmented wedding industry.

The event engine or knowledge template process in accordance with the invention provides a solution to the problems posed by a fragmented wedding industry by creating and presenting mass customized wedding packages in the form of the event engine or knowledge template. These packages may include pre-negotiated terms and contracts presented to both couples and vendors. In addition, the event engine or knowledge template will present an optional service that will guarantee vendor payment subject to complete contract fulfillment.

In order to maintain the highest possible levels of service, the cybermediary utilizing the event engine or knowledge template may hire onsite personnel to monitor contract fulfillment and pay vendors only after all parties are fully satisfied. In this manner the couples stress level will be reduced, since the task of monitoring the vendors' performance will be in professional and qualified hands. The vendors will also be relieved in the knowledge that payment will be forthcoming without question once their hard work is successfully completed thus offering solace to both vendor as well as client.

Much as mass customization has enabled consumers to purchase custom made goods at mass produced prices, the invention will enable event planners in general, and brides, in particular, to arrange custom weddings (with minor modifications to an existing knowledge template or event engine) at relatively low prices and, more importantly, at greatly reduced time cost for the bride and groom and their respective families.

The use of a knowledge template allows couples and event planners to save time by putting their entire event related activities and obligations in one place. Utilizing the existence of a central website connected to a central database which functions as a 'cybermediary' between all parties, the event engine coordinates all event planning functions. Essentially, the event engine helps the event planner in an area where she needs much help-time.

Another advantage is that the business method involved in the invention is scaleable, such that it can encompass new processes and potentialities. Such options include extending the event engine or knowledge template to include other complex business and social activities that can be published copyrighted and shared such as plans for:

1. home improvement projects
2. new kitchen design projects
3. kitchen renovation projects
4. birthday parties
5. engagement parties
6. confirmations
7. sweet sixteen parties
8. graduation parties
9. corporate affairs
10. fund raising events
11. anniversary parties
12. custom vacations
13. local advertising campaigns for products
14. local advertising campaigns for services
15. local marketing campaigns for products
16. local marketing campaigns for services
17. local election campaign coordination
18. weddings and wedding-related celebrations In addition to the above, homes have an increasing variety of options in the area of electronic services and entertainment. Even with the current limitations in bandwidth, cable companies such as Time Warner, satellite companies such as Direct TV and Internet Service Providers such as AOL offer consumers a myriad of products and services. With the building of a new multi-million dollar home for their CEO, Microsoft showcased the concept of the electronic home or "e-home." Clearly, the intention in building this home is to showcase what may become available, sooner or later, to the general public.

Therefore, imagine the complexity of services that will become available within the next 5-10 years when e-Home services, ranging from new types and forms of entertainment to new and improved personal services become available to the general public. The current list of options in the area of electronic services and entertainment will multiply as new vendors enter the market. At that point, faced with a myriad of multiple product, service, and vendor options the consumer of these services will be inundated with an overwhelming array of choices.

Using the service planning method described herein, the consumer will submit a confidential list of preferences to the cybermediary which will return a list of service templates to the consumer that match the submitted criteria. An example of such a service template is described in FIG. 1G with regard to e-services and in FIG. 1H with regard to the selection of multiple charitable organizations. In choosing a service template, as opposed to researching, contacting and contracting with individual vendors, the consumer saves time and money while, at the same time, choosing templates tailor made to suit their own individual preferences and lifestyles.

Utilizing the existence of a central website connected to a central database which functions as a 'cybermediary' between all parties, the invention serves to coordinate all event planning functions. Event organizers will benefit from access to all event related services, goods and payments in one convenient location.

Briefly, the knowledge template or event engine contains much or all of the information and knowledge of processes necessary to reconstruct an event. In a representative operation, event organizers will proceed as usual to plan their weddings. Once they have put together a wedding package that includes the photographer, the caterer, the florist, the musician, band, and all the rest, a database file or datamart is created on-line which will list all their preferences and all their vendors.

New event organizers will search the database and try to find a (wedding) knowledge template (or "wedding template") that meets their needs based on specified parameters, for example, location, budget and other factors. The database will allow access not only to wedding planning information, but to actual views and reviews of the affair as well. If the couple sees exactly the type of wedding that they have in mind, they further examine the photographs, recordings, comments and other online mementos from that particular wedding template. If they decide that is the type of wedding template that meets the needs of their own intended wedding, then, for a fee, that template information will be released to them, and with their approval, the cybermediary will arrange for the date and time to replay that wedding template with all of the required vendors.

In this manner the existing wedding template will successfully propagate itself over and over again utilizing, with minimal variations, the same vendors the same people who did the previous wedding using the same wedding template.

In addition, the present invention allows several classes of participants, including, event planners, guests and vendors to give feedback and comments regarding a particular event. This will allow future users more options with more useful and relevant information. In addition, each individual information or knowledge template can be linked with similar events as well as with vendor sites for additional information and feedback.

In its basic form, the event engine or knowledge template should contain, at a minimum, several or all or the following information elements:

Time, place and number of guests at the event;
List of vendors that performed work at the event;
Breakdown of total costs for the event listed by vendor— including price per guest;
Breakdown of total costs for the event listed by category— including price per guest;
Minimum and maximum number of guests—including price per additional guest beyond minimum;
Photographic, audio, or video recordings of the event, whether in digital or analog form;
Comments by the consumer regarding the quality or nature of the services performed;
Religion and/or culture;
Wedding colors
Wedding Style (formal or informal).

A list of vendors will include, but will not be limited to, several or all of the following service providers:
1. Reception Sites
2. Florists
3. Photographers
4. Videographers
5. Entertainment
6. Musicians
7. Transportation
8. Invitation/Calligraphers
9. Jewelry Stores
10. Travel Agencies In the case of a kitchen renovation project the knowledge template should contain, at a minimum, several or all or the following information elements:

A diagram or photograph of the original kitchen;
A diagram or photograph of the new kitchen;
List of contractors that performed work project;
Total cost of project;
Breakdown of total costs for the project materials;
Breakdown of total costs for the project listed by contractor;
Comments by the consumer regarding the quality or nature of the work and services performed.

Figure 25:
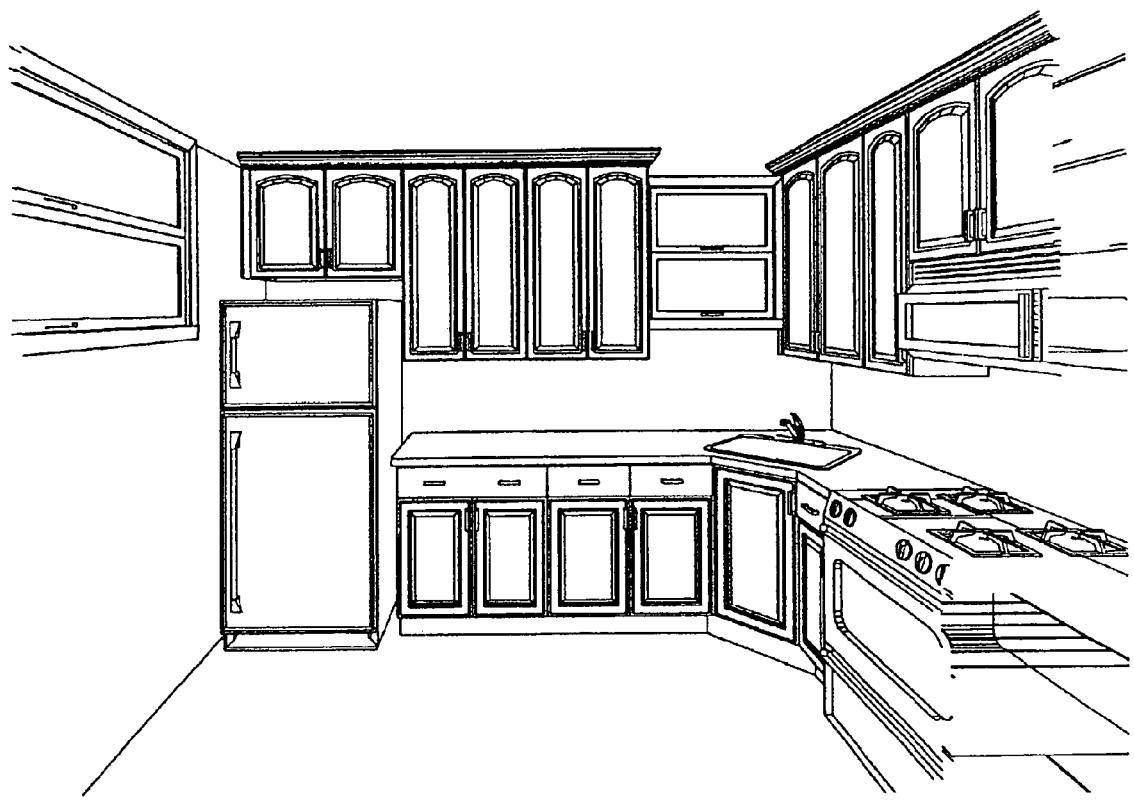
FIG. 25 is a 3-dimensional representation of an eastern wall of a kitchen renovation template in accordance with one embodiment of the invention.
Figure 26:
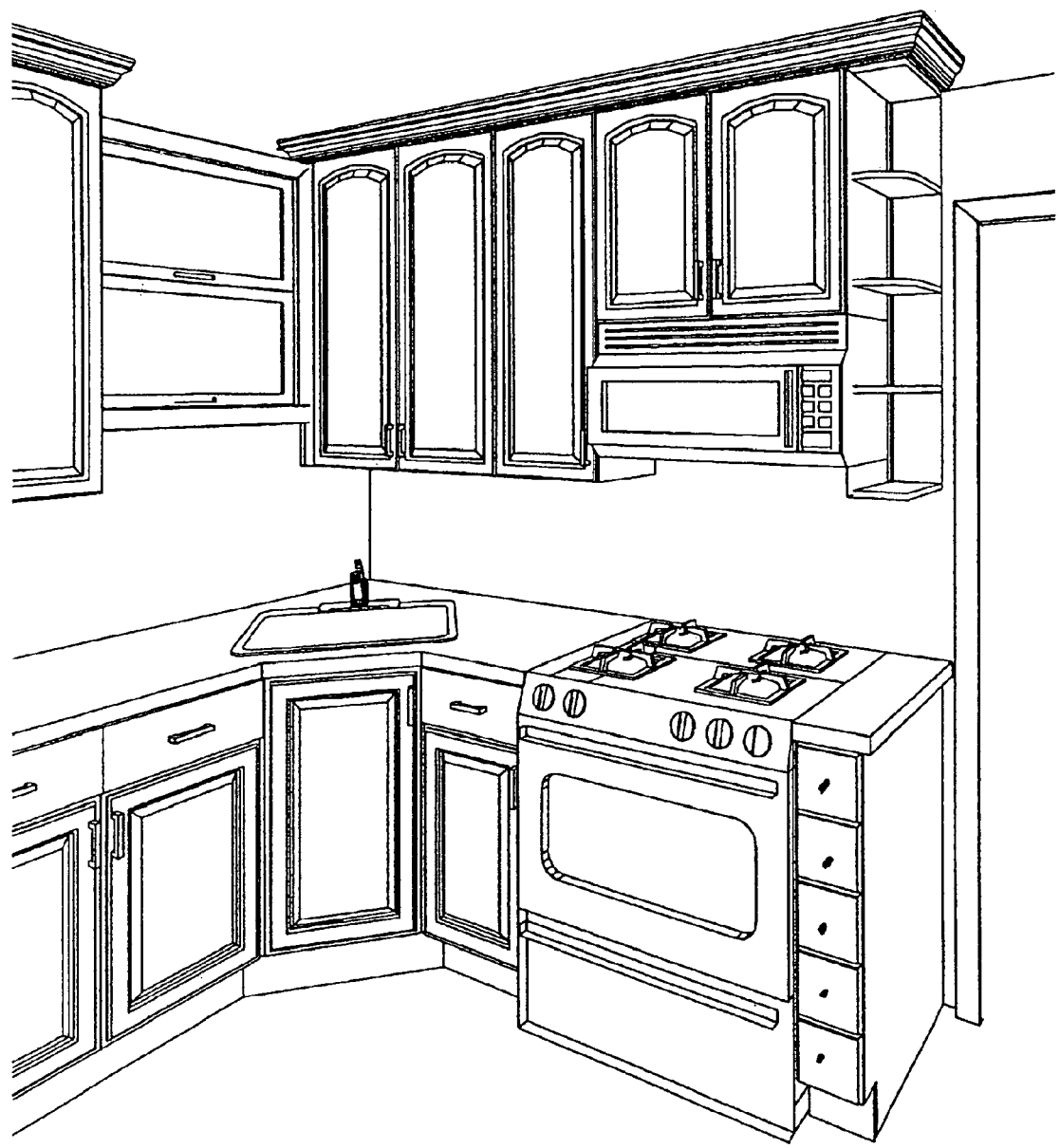
FIG. 26 is a 3-dimensional representation of a southern wall of a kitchen renovation template in accordance with one embodiment of the invention.
Figure 27:
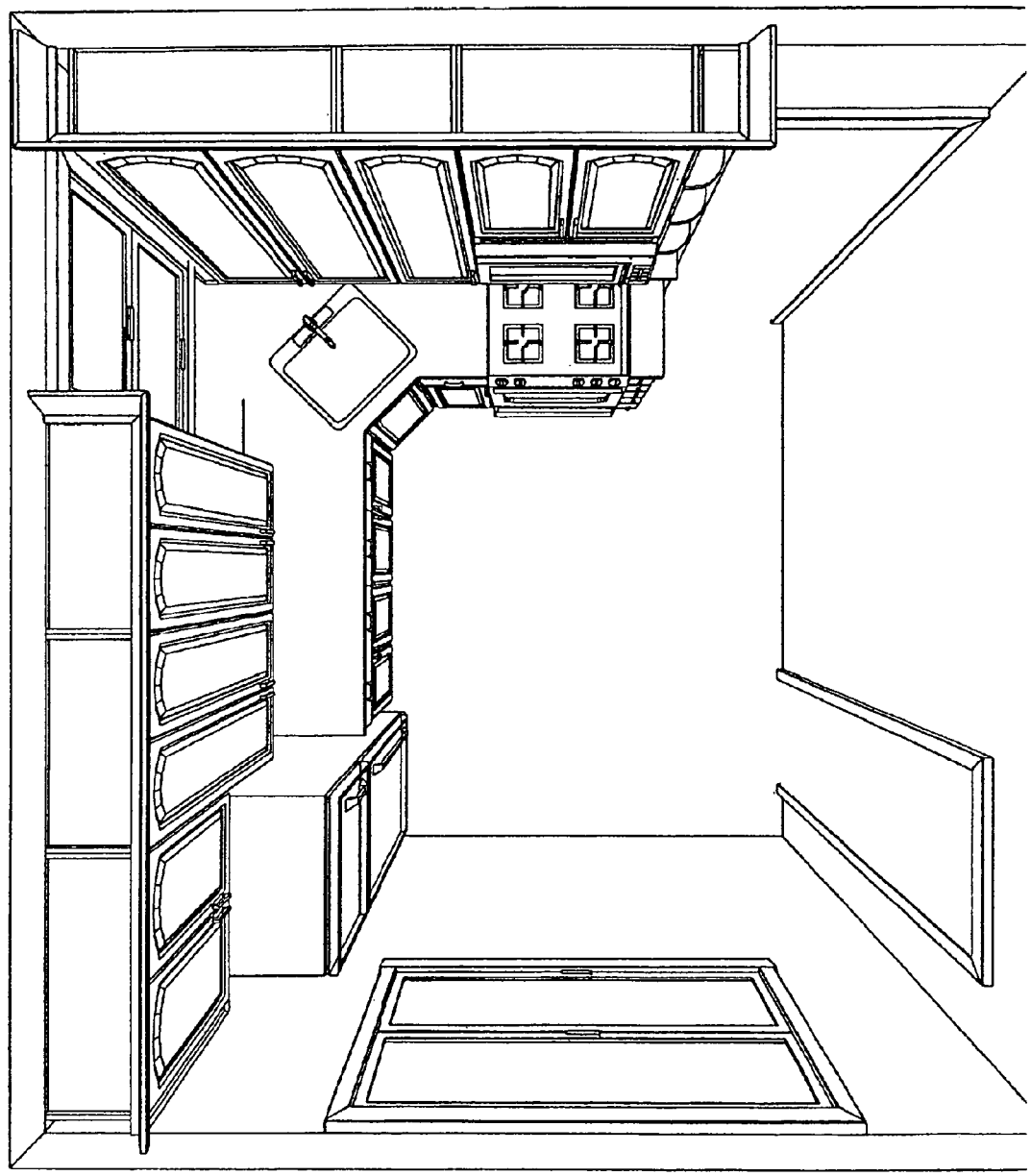
FIG. 27 is a 3-dimensional representation of a top down view of a kitchen renovation template in accordance with one embodiment of the invention.

An example of a kitchen renovation template is shown in the combination of FIGS. 1I and 1J and FIGS. 25-27. FIG. 1I describes and evaluates vendors who performed specific services. FIG. 1J lists pricing information for merchandise purchased. FIGS. 25-27 show different views of a kitchen renovation design.

In another embodiment, the event planning method and system in accordance with the invention will be designed to facilitate the sharing of wedding plans and desired services among registered users with the intent to allow shared access and payment obligations to the same service (and a possible basis for negotiating a reduced rate). If, for example, two brides desire the same wedding hall or church or tent rental at different times on the same day, then the use and expense involved in the rental fees, decorating expenses and other fees may be shared. It is conceivable that two couples may even share a facility at the same time in order to obtain a level of service that they could not afford individually, as would occur in obtaining an exclusive wedding hall, or, alternatively, in order to save money. Another embodiment would allow vendors to modify the price of services or rentals, such as the fee for a wedding hall with time if it became apparent that demand for such usage was going up or down. This last embodiment would apply for example, in a case where no usage is anticipated a month prior to a given event, the vendor or supplier may allow significant discounts.

This would in operation apply the Revenue Management Systems (RMS), commonly utilized in the airline industry to optimize their revenue per flight, to the event planning and wedding industry. RMS has not yet been applied to the event planning industry, in general, or to the wedding industry, in particular. RMS, applied to the event planning and wedding industries will result in potentially greater usage of resources for vendors as well as potentially increased savings for couples.

The event planning process guarantees payment to the vendor because payment, either partial or full, is already held by the cybermediary before the transaction with the vendor is completed. Provisions would be made to prevent refunding of this payment upon commitment by the vendor to deliver the goods and/or perform the services. This renders the event engine system attractive to the vendors.

An important benefit of the invention is that it allows the consumer of services to benefit from the time and energy previously expended by another consumer or bride in finding the best possible service. The consumer may search for the highest quality, lowest price, most convenient location or whatever quality or qualities that the consumer finds attractive in a vendor. After the services have been successfully performed, the consumer may sell the information that she has acquired as a knowledge template. Others may use this knowledge template, either as is or in a modified form, to purchase the same or similar service for their own needs.

The use of an event engine or knowledge template fulfills a specific need existing in the current wedding marketplace in a new and non-obvious way. The current wedding marketplace is highly fragmented. It is also often a very geographically regionalized marketplace. Many industries also converge during the wedding process. For example such industries as reception venues, florists, photography, musicians, transportation, printers and designers, jewelry, travel, hospitality, clothing, and more are all relevant to this space.

This fragmentation by industry, vendor, region and a host of other factors creates a major headache for the negotiation and payment procedures that are involved in coordinating such a complicated endeavor. It also creates problems for vendors who must negotiate, service and bill multiple parties. The invention thus has an express purpose to simplify this complex process for all involved parties.

This fragmentation also creates frustration for both vendors and couples since for each wedding the process of vendor solicitation must be created over and over again. Typically, a couple negotiates with between ten and fifteen separate vendors, services and retailers for their wedding. Meanwhile, vendors are continually striving to differentiate themselves in the marketplace to attract the next generation of wedding couples. This is due to the fact that product and vendor loyalty is less relevant in a market that caters to once-in-a-lifetime event. These processes of vendor hunting and couple searching are constantly being reenacted.

The invention simplifies this situation by streamlining the entire process. It also provides vendors with a straightforward means of differentiating their products or services to the bride and groom (the event organizers).

The invention is also designed to provide new income sources to couples, such as selling and consulting revolving around the use and application of a particular knowledge template or event engine to recreate their wedding. This may also provide newly wed couples and other event planners with additional sources of revenue.

As mentioned above, the service planning method and system as applied to the searching for and acquiring of e-services (such as an electronic home or "e-home" services), takes the concepts of recommendation engines and choiceboards and applies them in a novel way to the realm of electronic services planning.

In view of the foregoing, a method for planning an event in accordance with the invention comprises the steps of providing memory media having data encoded thereon in computer useable form, the data comprising a plurality of different templates and associated prices, each template including information about goods and services for an event, enabling event organizers to interface with the memory media and peruse the templates; enabling the event organizers to select one of the templates, and upon selection of a template and after at least partial payment by the event organizer for the selected template, informing providers of the goods and services associated with the selected template of a request to provide the goods and services listed in the template to the event organizer. Instead of requiring partial payment by the event organizer, a commitment for payment, i.e., by a credit card, would suffice to inform the providers of the request for their goods and services. Each template could include information about catering facilities, caterers, space accommodations and cost.

A system for planning an event in accordance with the invention comprises memory media having data encoded thereon in computer useable form, the data comprising a plurality of different templates and associated prices, each template including information about goods and services for an event, an input and display device for enabling an event organizer to interface with the memory media, peruse the templates and select one a template, a communication device coupled to the input and display device and a processor coupled to the memory media, the input and display device and the communication device. The processor, which may be resident at a web site operated by a cybermediary, informs providers of the goods and services associated with the selected template of a request to provide the goods and services listed in the template to the event organizer via the communication device upon selection of a template via the input and display device. Use of the templates constitutes an information catalyst for simplifying event planning.

With respect to the use of the invention for general services, a method for enabling a user to obtain a service comprises the steps of providing memory media having data encoded thereon in computer useable form, the data comprising a plurality of different templates and associated prices, each template including information about a particular service, enabling the user to interface with the memory media, peruse the templates and select one or more of the templates and upon selection of a template, and preferably after a commitment for payment by the user for the selected template, informing the provider of the service associated with the selected template of a request to provide the service according to the template to the user. Each template could include information about services relating to a home, i.e., the e-home concept discussed above.

A related system for enabling a user to obtain a service comprises memory media having data encoded thereon in computer useable form, the data comprising a plurality of different templates and associated prices, each template including information about a particular service, an input and display device for enabling a user to interface with the memory media, peruse the templates and select one of the templates, a communication device coupled to the input and display device and a processor coupled to the memory media, the input and display device and the communication device. The processor is arranged to inform a provider of the service associated with the selected template of a request to provide the service listed in the template to the user via the communication device upon selection of one of the templates via the input and display device.

Also disclosed herein is an event management system comprising a database containing event related knowledge items and an activity record associated with the knowledge items, an event organizer that accesses the knowledge item contained in the database and in response, communicates feedback information concerning the content of the knowledge item, and an event organizer that communicates feedback information in response to questions concerning the content of the knowledge item. The event organizer, the same or a different one than above, can optionally communicate the knowledge item to the database. The feedback information may comprise an impact value associated with the content of the knowledge item. As an inducement, payment may be provided for submitting the knowledge item, accessing the knowledge item, providing feedback information concerning the knowledge item or answering questions concerning the knowledge item.

A computer-based event knowledge system, which is coupled to a database containing event related knowledge items and activity records associated with the knowledge items, in accordance with an exemplifying embodiment of the invention comprises a control module that receives feedback information concerning the content of the knowledge item from an event organizer and communicates at least a portion of the feedback information, a scoring module coupled to the control module, the scoring module receiving the feedback information from the control module and generating a value for the knowledge item according to the content of the feedback information, and a payment module coupled to the control module. The payment module receives the feedback information from the control module and generates a payment in response to the feedback information for storage in the activity record. The feedback information includes an impact value associated with the knowledge item.

A computer-based method for managing knowledge in accordance with the invention comprises receiving feedback information concerning the content of an event related knowledge item from an event organizer, the knowledge item being stored in a database, generating a value for the knowledge item according to the content of the feedback information, storing the value in a first activity record in the database, the first activity record being associated with the knowledge item, generating a payment incentive in response to the feedback information, and storing the payment incentive in a second activity record in the database, the second activity record being associated with the knowledge item. Optionally, the knowledge item is received from a submitter; stored in the database and the first activity record is thus established. The feedback information may comprise an impact value associated with the knowledge item. The payment incentive can be a payment incentive to an event organizer for submitting the knowledge item, a payment assessment from an event organizer for accessing the knowledge item and/or a payment incentive to an event organizer, guest, or vendor for providing the feedback information concerning the knowledge item.

Although several preferred embodiments are illustrated and described above, there are other possible combinations to accomplish the same or similar goals as those described herein. There are also numerous additional applications in addition to those described above. This invention is not limited to the above embodiments and should be determined by the following claims.

The invention claimed is:

1. A method for an event organizer to arrange the receipt of gifts for an event and services rendered in conjunction with the event via an online interactive registry on a host computer, comprising:
    creating an on-line database of gifts desired by the organizer and services desired by the organizer to be performed at the event,
    obtaining a first price for the gifts and services in the database,
    enabling access by gift givers to the database,
    displaying to the gift givers, the gifts and services in the database and a second price for the gifts and services, the second price being greater than the first price,
    enabling the gift givers to select one or more of the gifts and services for purchase on behalf of the organizer,
    upon purchase by each gift giver of the selected one or more of the gifts and services, a processor on the host computer providing the organizer with funds from each gift giver equal to the second price for the selected one or more of the gifts and services, and
    upon receipt by the organizer of funds from each gift giver equal to the second price for the selected one or more of the gifts and services,
    enabling the organizer to direct one of the gift and service providers to forward the selected gift to the organizer or perform the selected service for the organizer at the event,
    the processor determining a difference between the first and second prices upon receipt by the organizer of funds from the gift giver equal to the second price, and
    enabling the organizer to use the at least part of the difference in price to purchase gifts and services in the database prior to the event.

2. The method of claim 1, wherein the step of creating the database comprises:
    displaying different categories of gifts and services to the organizer,
    enabling the selection of each of the categories of gifts and services, and
    for each category, displaying different gifts or services and enabling the selection of each of the gifts and services,
    whereby the organizer is able to select either categories of gift and services for entry into the database, specific gifts and services within each category for entry into the database or a combination thereof.

3. The method of claim 1, wherein the step of obtaining a first price for the gifts and services comprises contacting gift and service providers to solicit bids from the gift and service providers.

4. The method of claim 3, further comprising:
    enlisting providers of gifts and services to submit bids for gifts and services listed in the database, and
    electronically notifying the providers when one of the gifts and services provided by the gift and service provider is included in the database.

5. The method of claim 1, wherein the step of obtaining a first price for the gifts and services comprises conducting an auction among possible providers to obtain a lowest price for the gifts and services.

6. The method of claim 1, wherein the step of obtaining a first price for the gifts and services comprises obtaining a price from several gift and service providers for each gift and service, further comprising:
    enabling access to the database by the organizer,
    displaying the gifts and services and the prices provided by the gift and service providers, and
    enabling the organizer to select from the displayed gifts and services and prices provided by the gift and service providers, the gift and services from any of the gift and service providers that submitted a price for the gift and services to include in the database to be displayed to the gift givers.

7. The method of claim 1, wherein the step of creating the database comprises:
    providing a website to enable creation of the database,
    displaying options of different gifts and services to the organizer at the website, and
    displaying advertising of providers of gifts and services at the website.

8. The method of claim 1, further comprising when the organizer directs one of the gift and service providers to forward the selected gift to the organizer or perform the selected service for the organizer at the event, providing funds equal to the first price which were received by the organizer from the gift giver to the provider.

9. The method of claim 1, further comprising limiting access to the database only to invitees to the event.

10. The method of claim 1, further comprising:

upon access of the gift givers to the database, presenting the gift givers with an option to give a monetary gift to the organizer; and enabling the organizer to apply the monetary gift to purchase gifts and services in the database or receive cash.

11. The method of claim 1, further comprising limiting the gift givers to friends and family of the organizer.

12. The method of claim 1, further comprising removing the selected one or more of the gifts and services from the database after purchase by each gift giver on behalf of the organizer such that the selected one or more of the gifts and services are not displayed to subsequent gift givers.

13. The method of claim 1, wherein the organizer notifies the gift givers how to access the database.

14. The method of claim 1, further comprising enabling the organizer, after receiving funds from the gift giver equal to the second price, to confirm the desirability of the selected one of the gifts or services prior to being forwarded the gift from the provider or the performance of the services at the event.

15. The method of claim 1, further comprising enabling the organizer, after receiving funds from the gift giver equal to the second price, to exchange the gift or service selected prior to the event or prior to being forwarded the gift from the provider or the performance of the services at the event.

* * * * *